United States Patent [19]
Yoshida et al.

[11] Patent Number: 6,086,468
[45] Date of Patent: Jul. 11, 2000

[54] METHOD AND APPARATUS FOR PEELING-OFF BIVALVE, AS WELL AS BIVALVE BEFORE-SEPARATION HEATING DEVICE

[75] Inventors: Masanori Yoshida, Kushiro, Japan; Atsushi Sato, 9-4, Showakita 1-chome, Kushiro-shi, Hokkaido, Japan, 084; Nobuo Hukuoka, Kushiro, Japan

[73] Assignee: Atsushi Sato, Hokkaido, Japan

[21] Appl. No.: 08/681,249

[22] Filed: Jul. 22, 1996

[30] Foreign Application Priority Data

Apr. 12, 1996 [JP] Japan ..................................... 8-091414
Jul. 21, 1996 [JP] Japan ..................................... 8-185650

[51] Int. Cl.[7] .................................................. A22C 29/04
[52] U.S. Cl. .............................................. 452/14; 452/20
[58] Field of Search ................................. 452/14, 13, 15, 452/20

[56] References Cited

U.S. PATENT DOCUMENTS

| | | | |
|---|---|---|---|
| 3,473,191 | 10/1969 | Evans | 452/14 |
| 3,566,438 | 3/1971 | Snow | 452/14 |
| 3,594,860 | 7/1971 | Nelson et al. | 452/14 |
| 3,614,806 | 10/1971 | Henry | 452/14 |
| 4,691,412 | 9/1987 | Brown | 452/14 |
| 5,427,567 | 6/1995 | Adcock | 452/13 |

*Primary Examiner*—Willis Little
*Attorney, Agent, or Firm*—Charles N. Quinn

[57] ABSTRACT

A bivalve peeling-off method and apparatus and a before-separation heating device are disclosed. The bivalve peeling-off apparatus includes a heating means 6 for heating the surface of one of shells 2A of a starting bivalve 2, so that an edible part 2a in the starting bivalve 2 is maintained in a raw state. Thus, the edible part can be efficiently separated from the shell of the starting bivalve in a state in which a quality suitable for use in raw eating is maintained.

34 Claims, 55 Drawing Sheets

Fig. 36
(a)
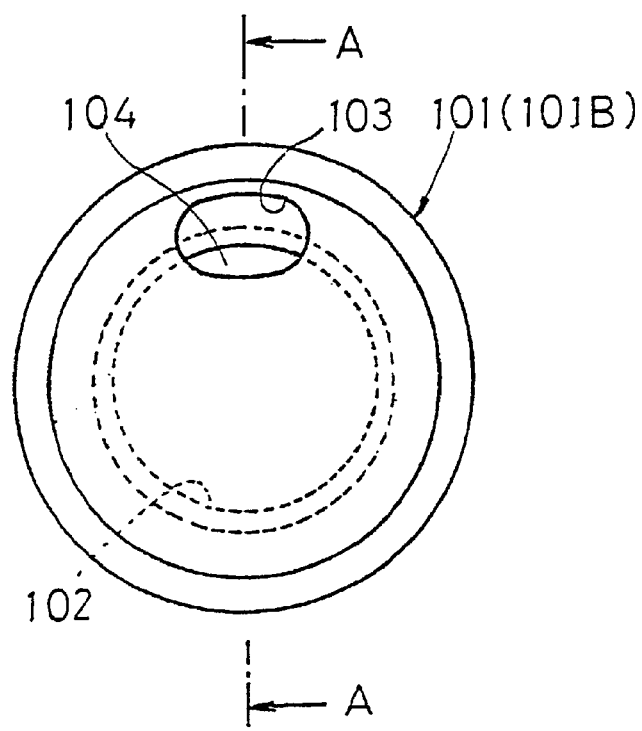
(b)
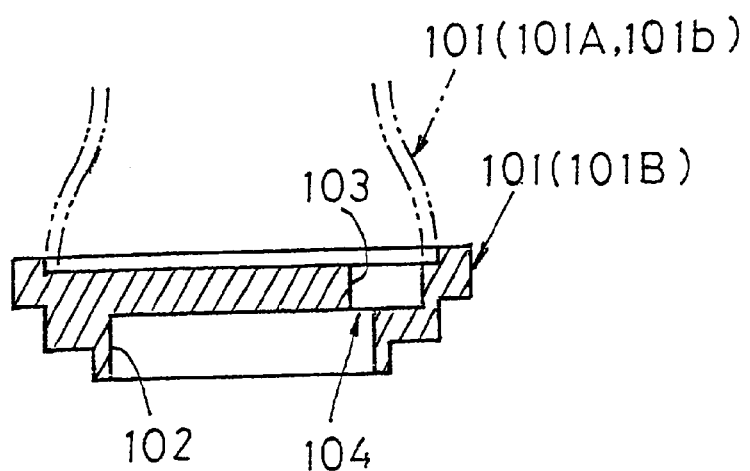

METHOD AND APPARATUS FOR PEELING-OFF BIVALVE, AS WELL AS BIVALVE BEFORE-SEPARATION HEATING DEVICE

BACKGROUND OF THE INVENTION

1. Field of the Invention

The present invention relates to a method and apparatus for peeling-off a bivalve, which is capable of effectively separating edible parts in a starting bivalve in a raw state from its shell, and to a before-separation heating device. More particularly, the present invention relates to a bivalve peeling-off method and apparatus suitable for effectively separating a ligamnent of a scallop in a raw state from its shell.

2. Description of the Related Art

In general, to remove an edible part from a starting bivalve, e.g., a ligament consisting of an adductor muscle and a shell hinge ligament of a scallop in a raw state from its shell, a thin knife-like tool referred to as a shell opener is used to manually cut the shell-connected part of the ligaments closing two shells of the scallop.

However, when the ligament of the scallop is manually cute and separated from the shell, the following problems are encountered: a problem of a lower efficiency; a problem that a great deal of labour and a lot of time are required; and a problem that when a large number of scallops was landed and in other cases, the freshness of the scallops is lowered, if the scallops are treated quickly by a large number of workers.

Thereupon, various proposals have conventionally been made for the purpose of effectively separating the edible parts of the startinbg bivalves.

These conventional proposals include techniques which comprise cutting the tip end of a scallop by a cutter or the like to creat an opening in the tip end of the scallop, and inserting an edged tool into the scallop through the opening, while allowing the edged tool to slide on an inner surface of one of shells of the scallop, thereby cutting the shell connected portion of the ligament closing the two shells to open the shells (i.e., open the shell mouth), for example, as described in Japenese Patent Application Laid-open No.87937/88 (which corresponds to Japanese Patent Publication No.14014/90).

There are also other conventionally know techniques which comprise opening the shell by heating a scallop by a heating means and then separting an adductor muscle from the other shell, for example, as disclosed in Japanese Patent Application Laid-open Nos.3899/75, 13900/77 and 3751/93.

In the above-described known technique which cuts the tip end of the scallop by the cutter, however, the ligament as the edible parts can be removed from the shell in the raw state used for raw eating, but this technique is accompanied by a problem that a great deal of labour and a lot of time are required in post-treatments for removing a ligament damaged due to the deposition of cuts on the ligament, and for removing the cuts from the ligament and the like. Further, the separation of the ligament from the shell is conducted by a manual operation for cutting a connected part of the ligament to the shell and the like, resulting in a problem that a great deal of labour is required for separting the adductor muscle from the shell, and it may be failed to effectively separate the ligament of the scallop in a raw state from the shell.

In the conventional technique which heats the shell by the heating means to open the shell, the shell mouth can be easily opened, but the surface of the ligament, particularly, the surface of the ligament located at the heated side is discolored into white to produce a so-called boiled state, resulting in a reduced quality in appearance. Thus, the quality suitable for raw eating cannot be maintained in many cases. In other words, the conventional technique using the heating means is accompanied by a problem that only a small amount of the ligament removed from the scallop can be supplied for raw eating. In addition, the separation of ligament from the shell after the opening of the shell is conducted by a manual operation and hence, is accompanied by a problem that a great deal of labour is required for separting from the ligament from the shell, and the ligament cannot be effectively separated from the shell.

Further, if the ligament is separated from the shall after being opened, using the knife-like tool referred to as the shell opener, the following problem is encountered: the connected portion of the ligament to the shell is cut even if any of the manual operation and a mechanical operation using an automatic machine is used. Therefore, the separated ligament has a jagged surface, resulting in a reduced quality in appearance. Even if the point of the knife-like tool is moved along the unevenness of the shell, the point cannot follow the unevenness of the shell and thus, a portion of the ligament remains on the unevenness of the shell, resulting in a reduced yield.

Further, the ligament separated from the shell by cutting the connected postion of the ligament to the shell is liable to absorb water through the cut surface. Therefore, the following problems: water used for trimming the ligament after being separated from the shell (as used herein, the term "trimming" means a scrubing for removing deposits such as fine internal organs dsepositied on the ligament to provide an edible food product) is absorbed into the ligament, resulting in a reduced taste; and when the ligament has been preserved in a frozen state, delicious components flow out together with the water referred to as a drip, when the frozen ligament is thawed.

Therefore, a technique has been required which is capable of efficiently separating the ligament from the shell in a state in which a quantity suitable for raw eating is maintained.

SUMMARY OF THE INVENTION

Accordingly, it is an object of the present invention to provide a bivalve peeling-off method and apparatus which is capable of efficiently separating an edible part from the shell of a starting bivalve in a state in which a quanlity suitable for use in raw eating is maintained, and to provide a before-separation heating device.

As a result of zealous studies made to provide a bivalve peeling-off method and apparatus which is capable of efficiently separating an edible part from the shell of a starting bivalve in a state in which a quantity suitable for use in raw eating is maintained, it has been found that with a scallop used as a starting bivalve, by applying hot steam or warm water to the surface of the shell of the scallop, the shell can be opened (i.e., the shell mouth can be easily opened) with the edible part maintained in a raw state, namely, the shell can be heated so that theedible part to the shell is gelled, as a result, the bonding force of the connected portion of the edible part to the shell can be reduced, thereby allowing the edible part to be peeled off from the shell. Thus, the present invention has been accomplished.

To achieve the above object, according to a first aspect and feature of the present invention, there is provided a bivalve peeling-off method, comprising the step of heating the surface of one of shells of a starting bivalve, so that an edible part is maintained in a raw state, and a connected portion of the edible part to the shell is gelled.

With such feature of the present invention, the bonding force of the connected portion of the edible part to the shell can be reduced in a state in which a quality suitable of use in raw eating is maintained. As used herein, the term "heating the surface of the shell so that the edible part of the starting shell is maintained in the raw state and the the connected portion of the edible part to the shell is gelled" means that the surface of the shell is heated so that the edible part is not disclored and the state of the shell mouth closed is maintained. Specifically, this can be achieved by a heating means for applying a heat energy of a heating source to the surface of one of the shells of the starting bivalve for a short period of time by use of hot steam or warmed water as the heating source. Further, by heating the surface of one of the shells of the starting bivalve by such heating means, the force of bonding between the shell located on the heated side and the edible part can be reduced and as a result, the shells of the starting bivalve can be forcibly opened, for example, by the force of a person's hand.

According to a second aspect and feature of the present invention, there is provided a bivalve peeling-off method comprising the steps of heating the surface of one of shells of a starting bivalve, so that an edible part is maintained in a raw state, and a connected portion of the edible part to the shell is gelled, forcibly opening each of shells of the heated bivalve, and separating the edible part from the shells of the bivalve.

With such second feature of the present invention, the shells of the starting bivalve can be easily, forcibly opened in the state in which the edible part of the starting bivalve is maintained in the raw state, and the edible part can be easily, forcibly peeled off and separated from the connected portion to the shell located on the heated side, so that any of the edible part does not remain on the shell, thus providing an increased yield (a recovery rate) of the edible part.

According to a third aspect and feature of the present invention, in addition to the first or second feature, the surface of the shell having the edible part adhered thereto is heated before separation of the edible part from the starting bivalve, so that the edible part of the starting bivalve is maintained in the raw state, and so that the connected portion of the edible part to the shell is gelled.

Thus, the bonding force of the edible part to the shell can be reduced in the state in which the quality suitable for use in raw eating is maintained. As a result, the edible part can be easily peeled off from the shell, for example, by the force of the person's hand. In other words, the edsible part can be separated from the location in which it is bonded to the shell located on the heated side, without remaining on the shell, leading to an enhanced yield of the edible part.

According to a fourth aspect and feature of the present invention, there is provided a bivalve peeling-off method comprising the steps of heating the surface of one of shells of a starting bivalve, so that an edible part is maintained in a raw state, and a connected portion of the edible part to the shell is gelled, forcibly opening each of shells of the heated bivalve, separating the one heated shell, separating a non-edible part other than the edible part from the other shell after separation of the one shell, thereby leaving the edible part in the other shell, heating the surface of the other shell, so that the edible part in the other shell is maintained in the raw state, and so that the connected portion of the edible part to the shell is gelled, and separating the edible part from the other heated shell.

With such feature of the present invention, the edible part can be efficiently separated from the shell in the state in which the quality suitable for raw eating is maintained, and the edible part does not remain in the shell, leading to an enhanced yield of the edible part.

According to a fifth aspect and feature of the present invention, there is provided a bivalve peeling-off apparatus, comprising a heating means for heating the surface of one of shells of a starting bivalve, so that an edible part in the starting bivalve is maintained in a raw state.

According to a sixth aspect and feature of the present invention, in addition to the fifth feature, the heating means heats the surface of the one shell of the starting bivalve, so that the mouth of the starting bivalve is maintained in the closed state.

According to a seventh aspect and feature of the present invention, in addition to the fifth or sixth feature, the heating means heats the surface of the one shell of the starting bivalve, so that the edible part in the starting bivalve is not discolored.

According to an eighth aspect and feature of the present invention, in addition to one of the fifth to seventh features, the heating means uses steam as a heating source.

According to a ninth aspect and feature of the present invention, in addition to one of the fifth to seventh features, the heating means uses warmed water as a heating source.

According to a tenth aspect and feature of the present invention, in addition to one of the fifth to ninth features, the heating means has a heating nozzle for heating the surface of the one shell of the starting bivalve.

According to an eleventh aspect and feature of the present invention, in addition to the tenth feature, the heating means has a plurality of nozzles for heating the surface of the one shell of the starting bivalve in a multi-stage manner.

According to an twelfth aspect and feature of the present invention, in addition to tenth or eleventh feature, the heating means is provided at its tip end with a cap which is capable of abutting against the surface of the one shell of the starting bivalve to surround such surface at a location in which the edible part is connected.

Thus, by operating the heating means of such construction according to the bivalve peeling-off method of the present invention, the bonding force of the connected portion of the edible part to the shell can be reduced in the state in which the quality suitable for raw eating is maintained. As used herein, the term "heating the surface so that the edible part in the starting bivalve is maintained in the raw state" means that the surface is heated so that the edible part in the starting bivalve is maintained in the raw state and the the mouth of the bivalve is maintained in the closed state in such a manner that the edible part is discolored. Specifically, this can be achieved by a heating means which is adapted to eject hot steam or warmed water onto the surface of the one shell of the starting bivalve as a heating source through the heating nozzle to apply a heat energy of the heating source to the surface of the one shell of the starting bivalve for a short period of time. Further, the heating of the surface of the one shell of the starting bivalve by such heating means enables a reduction in force of bonding between the the shell located on the heated side and the edible part. As a result, it is possioble to easily forcibly open the shells of the starting bivalve by the force of the person's hand. Yet further, the plurality of heating nozzles for heating the surface in the multi-stage manner are capable of efficiently heating the surface of the shell without prolonging the time for one run of heating. The cap of the heating nozzle is capable of more efficiently heating the surface of the shell.

According to a thirteenth aspect and feature of the present invention, in addition to one of fifth to thirteenth feature, the bivalve peeling-off apparatus further includes a transporting/handling means for transporting the starting bivalves in a supporting manner, and a bivalve positioning means for positioning the starting bivalves supported by the transporting/handling means.

With such feature of the present invention, the transporting/handling means can efficiently transport the starting bivalve, and the bivalve positioning means can position the starting bivalve supported on the transporting/handling means at a proper location. Thus, the processing of the starting bivalve can be efficiently carried out.

According to a fourteenth aspect and feature of the present invention, in addition to one of fifth to thirteenth feature, the bivalve peeling-off apparatus further includes a forcibly opening means for forcibly opening the shells of the bivalve.

According to a fifteenth aspect and feature of the present invention, in addition to fourteenth feature, the forcibly opening means includes a pair of suction pads formed to suck to the shells of the starting bivalve with a negative pressure, and a pad driving means for operating the pair of pads so that the mouth of the starting bivalve is opened.

According to a sixteenth aspect and feature of the present invention, in addition to the fifteenth feature, at least a portion of the suction pad which is adapted to abut against the shell is formed from a styrene-based thermoplastic resin.

According to a seventeenth aspect and feature of the present invention, in addition to one of the fourteenth to sixteenth feature, the forcibly opening means is provided with a water removing means.

According to an eighteenth aspect and feature of the present invention, in addition to the seventeenth feature, the water removing means includes a switching valve for selectively switching any one of the negative and positive pressures for the suction pads to apply the switched pressure to the suction pads, and an air filter having a discharge valve disposed between the switching valve and the suction pads to capture liquid flowing from the suction pads toward the switching valve, and to discharge the captured liquid to the outside, when positive pressure is applied.

With the above features of the present invention, the forcibly opening means can forcibly and easily open the shells of the starting bivalve, whereby the edible part can be easily peeled off and separated from the connected portion to ther shell located on the heated side, so that the edible part is not left in the shell located on the heated side, i.e., the yield of the edible part can be increased. Further, by the fact that at least a portion of the suction pad adatped to abut against the shell is formed from the styrene-based thermoplastic resin,. the close contact of the suction pad to the surface of the shell can be enhanced. Yet further, the water removing means is capable of performing the capturing of the liquid when liquid deposited to the surface of the shell has been drawn by the suction pads, and the discharging of the captured liquid. According to a ninteenth aspect and feature of the present invention, in addition to one of the fifth to eighteenth features, the bivalve peeling-off apparatus further includes a shell separating means for removing one of the shells from the opened bivalve in such a manner that the shell with the edible part bonded thereto is left.

With such construction, the shell separating means is capable of easily removing (separating) one of the shells from the opened bivalve. According to a twentieth aspect and feature of the present invention, in addition to one of the fifth to ninteenth features, the bivalve peeling-off apparatus further includes a water supply means for supplying water to the inner surface of the shell of the starting bivalve having the edible part bonded thereto.

With such construction, the water supply means can wet the edible and non-edible parts adhered to the shell and a foreign matter by water, thereby enhancing the separating efficiency when the non-edible part is separated from the shell.

According to a 21st aspect and feature of the present invention, in addition to one of the fifth to twentieth features, the bivalve peeling-off apparatus further includes a non-edible part separating means for separating a non-edible part other than the edible part from the shell of the opened bivalve.

With such construction, the non-edible part separating means can efficiently separate the non-edible part. The non-edible part separating means is applicable not only to the bivalve peeling-off apparatus according to the present invention, but also to the conventional bivalve peeling-off apparatus.

According to a 22nd aspect and feature of the present invention, in addition to the 21st feature, the non-edible part separating means includes a suction nozzle which has a suction bore having an inside diameter larger than the outside diameter of the edible part and to which a negative pressure can be applied, and a nozzle-moving means for moving the tip end of the suction nozzle to and from the inner surface of the shell having the edible part adhered thereto.

With such construction, the non-edible part separating means can efficiently separate the non-edible part from the shell. Further, the non-edible part separating means is applicable not only to the bivalve peeling-off apparatus according to the present invention, but also to the conventional bivalve peeling-off apparatus.

According to a 23rd aspect and feature of the present invention, in addition to the 22nd feature, the bivalve peeling-off apparatus further includes a nozzle-vibrating means for vibrating the suction nozzle, so that the suction nozzle is moved to and from the inner surface of the shell having the edible part adhered thereto With such construction, the nozzle-vibrating means of the non-edible part separating means can further efficiently separate the non-edible part from the shell. Further, the non-edible part separating means is applicable not only to the bivalve peeling-off apparatus according to the present invention, but also to the conventional bivalve peeling-off apparatus.

According to a 24th aspect and feature of the present invention, in addition to 21st feature, the non-edible part separating means includes a suction member that has a suction plate for separating the non-edible part, the suction plate being mounted to the tip end of the suction nozzle to which a negative pressure can be applied, a recess into which the edible part is loosely fitted, and a suction bore defined in a bottom wall of the recess adjacent its outer periphery for permitting the communication between the recess and the suction nozzle; and a rotating means for rotating at least one of the suction member and the shell having the edible part adhered thereto, so that the suction bore in the suction member is rotated in a circumferential direction of the edible part outside the outer periphery of the edible part adhered to the shell.

With such construction, the non-edible part separating means can efficiently separate the non-edible part from the whell without damaging the edible part. Further, the non-edible part separating means is applicable not only to the bivalve peeling-off apparatus according to the present invention, but also to the conventional bivalve peeling-off apparatus.

According to a 25th aspect and feature of the present invention, in addition to the 24th feature, the non-edible part separating means is constructed so that the bottom wall of the recess in the suction plate is capable of abutting against the upper surface of the edible part in separating the non-edible part.

With such construction, the non-edible part separating means can efficiently separate the non-edible part from the shell without damaging the edible part. Further, the non-edible part separating means is applicable not only to the bivalve peeling-off apparatus according to the present invention, but also to the conventional bivalve peeling-off apparatus.

According to a 26th aspect and feature of the present invention, in addition to the 21th feature, the non-edible part separating means includes a suction nozzle to which a negative pressure is applied; a suction member including a case secured to the tip end of the suction nozzle, a suction bore provided in the case to communicate with the inside of the suction nozzle for sucking a portion of the non-edible part other than the edible part in a direction to move the non-edible part from the inner surface of the shell having the edible part bonded thereto, when a negative pressure is applied to the inside of the suction nozzle, and a suction bore opening/closing means disposed within the case for opening and closing the suction bore, so as to selectively switch a passable state in which the sucked non-edible part can pass through the suction bore without damaging the negative pressure applied to the suction bore when the negative pressure is applied to the suction nozzle, and a non-passable state in which the sucked non-edible part is stopped at the suction bore; and a moving means for moving the suction nozzle and at least one of the suction member and the shell, so that the suction nozzle and the suction member are moved along the surface of the edible part.

With such construction, the non-edible part separating means can efficiently separate the non-edible part from the shell without damaging the edible part.

According to a 27th aspect and feature of the present invention, in addition to one of the 21st to 26th features, the non-edible part separating means is provided with a floatation preventing means for preventing the floatation of the shell when the non-edible part other than the edible part is separated from the shell of the starting bivalve.

With such construction, the floatation preventing means of the non-edible part separating means can reliably prevent the floatation of the shell when the edible part is separated from the shell, thereby preventing the misalignment of the shell.

According to a 28th aspect and feature of the present invention, there is provided a before-separation heating device comprising a heating means for heating the surface of the shell having an edible part bonded thereto, so that the edible part is maintained in a raw state, before the edible part is separated from the shell of a starting bivalve opened.

According to a 29th aspect and feature of the present invention, in addition to the 28th feature, the heating means heats the surface of the shell, so that the edible part in the starting bivalve is not discolored.

According to a 30th aspect and feature of the present invention, in addition to the 28th or 29th feature, the heating means uses steam as a heating source.

According to a 31st aspect and feature of the present invention, in addition to the 28th or 29th feature, the heating means uses warmed water as a heating source.

According to a 32nd aspect and feature of the present invention, in addition to one of the 28th or 31st features, the heating means includes a heating nozzle for heating the surface of the shell of the starting bivalve having the edible part adhered thereto.

According to a 33rd aspect and feature of the present invention, in addition to the 32nd feature, the heating means includes a plurality of heating nozzles for heating the surface of the shell of the starting bivalve having the edible part adhered thereto in a multi-stage manner.

According to a 34th aspect and feature of the present invention, in addition to one of the 32nd or 33rd feature, the heating means has a closed space which surrounds the surface of at least a portion of the shell to which the edible part is adhered, when heating the surface of the shell of the starting bivalve having the edible part adhered thereto.

With such constructions, the before-separation heating device is capable of reducing the bonding force of the connected portion of the edible part to the shell in a state in which the quality suitable for raw eating is maintained. As used herein, the term "heating the surface so that the edible part in the starting bivalve is maintained in a raw state" means that the surface is heated so that the connected portion of the edible part to the shell is gelled and the edible part is not discolored. Specifically, this can be achieved by the heating means for jetting hot steam or warmed water onto the surface of the shell to apply a heat energy of the heating source to the surface of the shell of the starting bivalve having the edible part bonded thereto for a short period of time. Further, by heating the surface of the shell having the edible part bonded thereto by such heating means, the force of bonding between the shell located on the heated side and the edible part can be reduced. As a result, it is possible to easily peel off and separate the edible part from the shell, for example, by the force of a person's hand. In addition, since the edible part can be peeled off and separated from a location in which it is bonded to the shell located on the heated side, the edible part is not left in the shell, leading to an enhanced yield of the edible part. Yet further, the plurality of heating nozzles for heating in the multi-stage manner can efficiently heat the surface of the shell without prolonging the time of one run of heating. The closed space ensures that the surface of the shell can be more efficiently heated. Further, the before-separation heating device is also applicable to the conventional bivalve peeling-off apparatus.

According to a 35th aspect and feature of the present invention, in addition to one of the 5th to 27th features, the bivalve peeling-off apparatus includes a before-separation heating means for heating the surface of the shell of the opened starting bivalve having the edible part bonded thereto, so that the edible part in the starting bivalve is maintained in a raw state.

According to a 36th aspect and feature of the present invention, in addition to one of the 35th feature, the before-separation heating means is the before-separation heating device according to one of the 28th to 34th features.

With such constructions, the before-separation heating means can reduce the bonding force of the connected portion of the edible part to the shell in a state in which the quality suitable raw eating. As used herein, the term "heating the surface so that the edible part in the starting bivalve is maintained in a raw state" means that the surface is heated so that the connected portion of the edible part to the shell is gelled and the edible part is not discolored. Specifically, this can be achieved by the heating means for jetting hot steam or warmed water onto the surface of the shell to apply a heat energy of the heating source to the surface of the shell of the starting bivalve having the edible part bonded thereto for a short period of time. Further, by heating the surface of the shell having the edible part bonded thereto by such heating means, the force of bonding between the shell located on the heated side and the edible part can be reduced. As a result, it is possible to easily peel off and separate the edible part from the shell, for example, by the force of a person's hand. In addition, since the edible part can be peeled off and separated from a location in which it is bonded to the shell located on the heated side, the edible part is not left in the shell, leading to an enhanced yield of the edible part. Yet further, the plurality of heating nozzles for heating in the multi-stage manner can efficiently heat the surface of the shell without prolonging the time of one run of heating. The closed space ensures that the surface of the shell can be more efficiently heated. Further, the before-separation heating device is applicable not only to the bivalve peeling-off aparatus according to the present invention but also to the conventional bivalve peeling-off apparatus.

According to a 37th aspect and feature of the present invention, in addition to one of the 5th to 27th, 35th and 36th features, the bivalve peeling-off apparatus includes an edible part separating means for separating an edible part from the shells of the starting bivalve opened. According to a 38th aspect and feature of the present invention, in addition to 37th feature, the edible part separating means includes a suction nozzle, to which a negative pressure can be applied, for sucking the edible part adhered to shells, and a peeling-off plate for forcibly peeling off at least a part of the edible part adhered to the shells. According to a 39th aspect and feature of the present invention, in addition to 37th or 38th feature, the edible part separating means includes a damage-preventing member for preventing the edible part separated from the shells from being damaged.

With such constructions, the edible part separating means can be efficiently separated without damaging the edible part from the shells. Further, the peeling-off plate ensures that the damage to the edible part in separating the edible part from the shells can be more reliably prevented. Yet further, the damage preventing member can prevent the edible part separated from the shells from being damaged.

According to a 40th aspect and feature of the present invention, there is provided a bivalve peeling-off apparatus comprising a heating means according to one of the 5th to 12th features, a shell cleansing means for cleansing the surface of the shell of the starting bivalve, a transporting/handling means and a starting bivalve positioning means according to the 13th feature, a forcibly shell-opening means according to one of the 14th to 18th features, a shell separating means according to the 19th feature, a water supplying means according to the 20th feature, a non-edible part separating means according to one of the 21st to 26th features, a floatation preventing means according to the 27th feature, a before-separation heating means according to the 35th or 36th feature, and an edible part separating means according to one of the 37th to 39th features.

Such features make it possible to further efficiently separate the edible part of the starting bivalve from the shells in a raw state.

With the bivalve peeling-off apparatus utilizing the bivalve peeling-off method according to the present invention, those two face areas (bond portions) of the edible part separated from the shells, which have been bonded to the shells theretofore, each have a film; is smooth and glossy; and have a luster, leading to an enhanced quality in apperance of the edible part. In addition, all the edible part can be peeled off from the shells (no edible part remains on the shells), leading to an enhanced yield in the separation of the edible part from the shells. The edge of the face area of the edible part separated from the shells, which has been bonded to the shell theretofore, has a crisp-felt portion (which could not be left in the conventional cutting or separation). Such crisp-felt portion is well crisp to teeth, leading to enhanced eat-feeling and taste.

urther, the face area of the edible part separated from the shells, which has been bonded to the shell theretofore, has the film to absorb no water and therefore, it is possible to reliably prevent disadvantages that water used for trimming of the edible part after being separated from the shells (for washing off deposits such as fine internal organs deposited to the edible part for use as a food product) is absorbed into the edible part through the bond face area to reduce the taste, and that when the frozen and presereved edible part is thawed, delicious components flow out along with absorbed water called a drip.

Therefore, it is possible to efficiently separate the edible part from the shells of the bivalve while reliably maintaining a quality suitable for use in raw eating, by operating the bivalve peeling-off apparatus according to the bivalve peeling-off method of the present invention.

BRIEF DESCRIPTION OF THE DRAWINGS

FIGS. 36(a) and (b) show the suction plate of the internal organ separation means in FIG. 32, (a) is an expanded top view and (b) is a sectional view along the A—A line in (a).

FIG. 52 is an expanded longitudinal section showing the fixed state of the internal organs in the suction member of the internal organ separation means in FIG. 42.

FIG. 53 is an expanded longitudinal section showing the maintaining state of the internal organs in the suction member of the internal organ separation means in FIG. 42.

DETAILED DESCRIPTION OF THE PREFERRED EMBODIMENTS

The present invention will now be described by way of embodiments with reference to the accompanying drawings.

Figure 1:
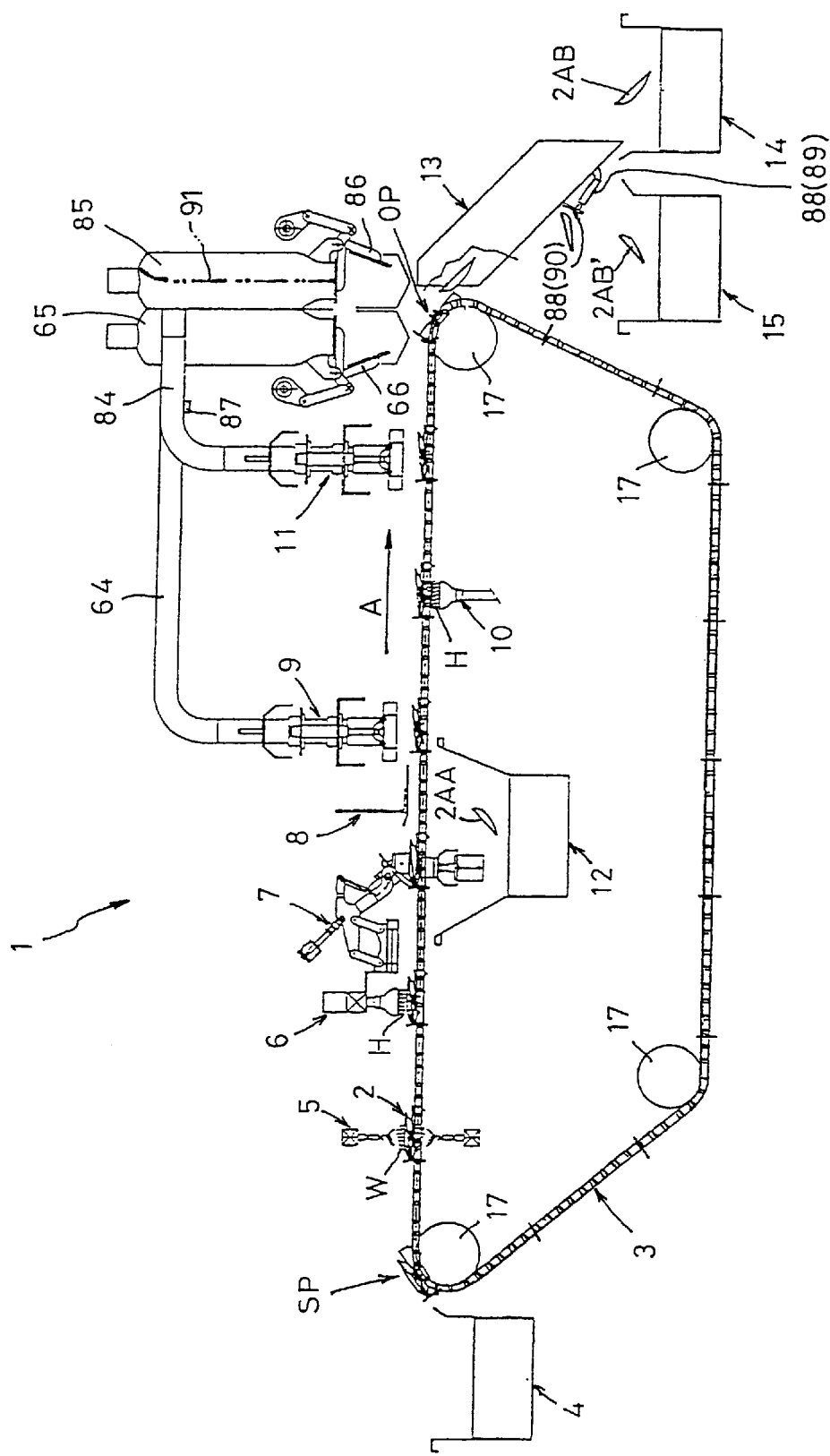
FIG. 1 is a front view showing a before-separation heating device in a first embodiment of a bivalve peeling-off apparatus of the present invention to which a bivalve peeling-off method of the present invention is applied.

Referring to FIG. 1, a bivalve peeling-off apparatus 1 according to a first embodiment of the present invention is designed to efficiently remove the ligaments 2*a* consisting of an adductor muscle 2*aa* and a shell hinge ligament 2*ab* as edible parts used for raw eating from a living bivalve such as a scallop 2.

As shown in FIG. 1, the raw bivalve peeling-off apparatus 1 includes a transporting/handling means 3 for transporting scallops 2 substantially horizontally from a left side toward a right side as shown by an arrow A in FIG. 1. The transporting/handling means 3 is disposed in a main frame (not shown) which includes a control section (not shown) for controlling the operations of various portions. The conveyer means 3 has a starting position SP which is established at an uppermost and leftmost place, and in which living scallops 2 sorted by sizes by a shell sorter (not shown) and supplied from a shell supply conveyer 4 are transferred manually or by a robot or the like, and a discharge position OP which is established at an uppermost and rightmost place and in which the scallop shell 2A after being depleted of the adductor muscle 2*aa* is discharged to the outside.

In the middle of transportation of the scallop 2 from the starting position SP toward the discharge position OP by the transporting/handling means 3, a shell cleansing means 5, a heating means 6, a shell forcibly-opening means 7, a shell separating means 8, an internal organ separating means 9 as a non-edible part separating means, a before-separation heating means 10 and an adductor muscle separating means 11 are disposed in the named order from the upstream side shown at the leftmost and uppermost place in FIG. 1 in a shell transporting direction. The shell separating means 8 is disposed between the shell forcibly-opening means 7 and the internal organ separating means 9.

A shell discharge conveyor 12 is disposed below the shell separating means 7 for discharging one of shells separated by the shell separating means 8, e.g., an upper shell 2AA in this embodiment.

A discharge chute 13 is disposed at the right of the discharge position OP of the transporting/handling means 3. A shell discharge conveyer 14 is disposed below and at the right of the discharge chute 13 for discharging the other shell 2A, e.g., the lower shell 2AB after being depleted of the ligaments 2*a* in this embodiment. Further, a recovery conveyor 15 is disposed below a substantially lengthwise central portion of the discharge chute 13 for recovering a lower shell 2AB' with an adductor muscle 2*a* left therein without being separated by the adductor muscle separating means 11.

The transporting/handling means 3 will be further described with reference to FIGS. 1 through 5.

Figure 2:
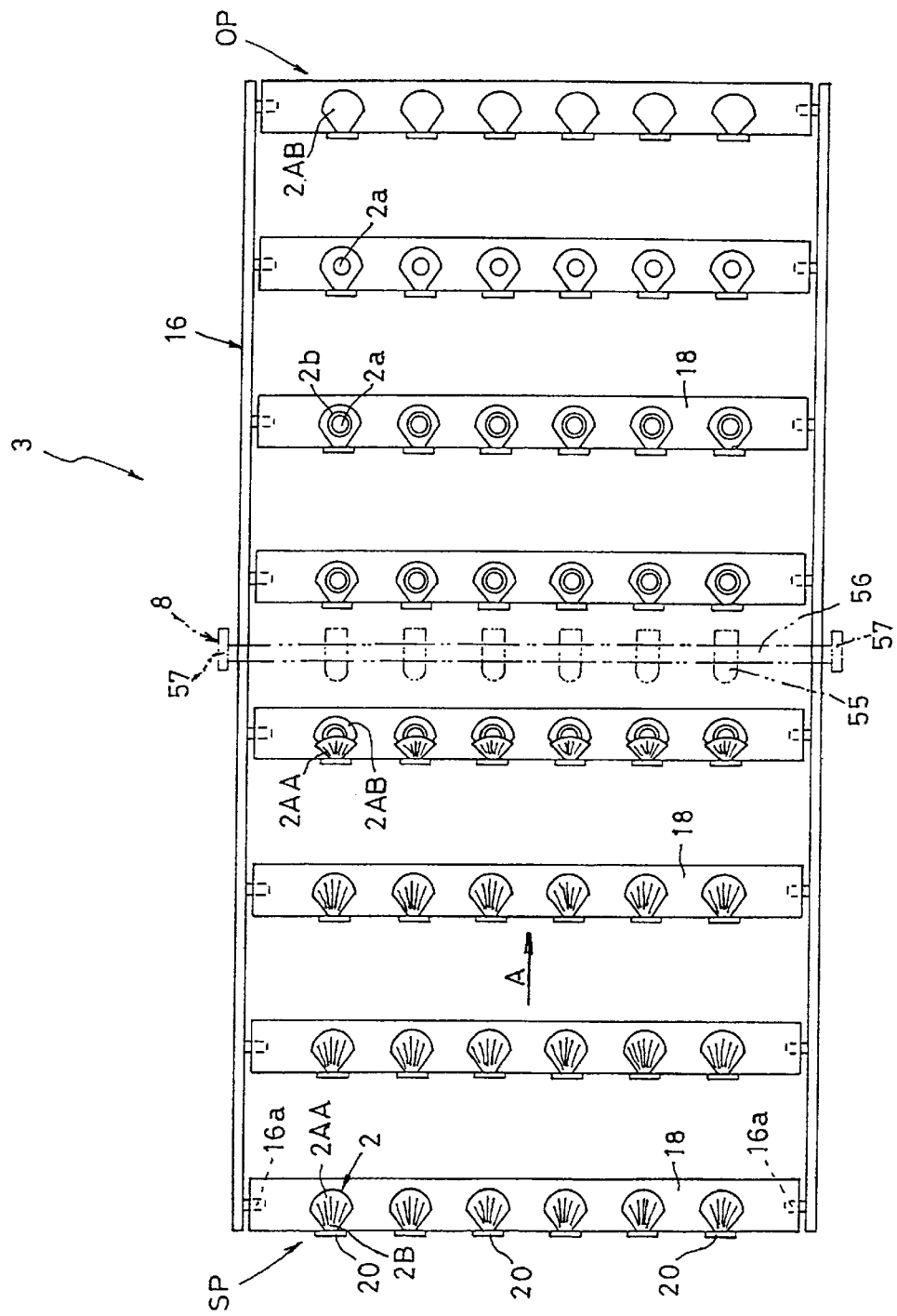
FIG. 2 is a plan view of a transporting/handling means shown in FIG. 1.

The transporting/handling means 3 has a chain conveyor 16 formed into an endless loop as shown in FIGS. 1 and 2 for transporting the scallops 2 in a transporting direction from the left to the right shown by the arrow A in FIG. 1. The chain conveyor 16 has a chain which is woven around outer peripheral surfaces of sprockets 17 disposed at two upper, left and right points and two lower, left and right points, i.e., at a total of 4 points, as shown in FIG. 1. Any one of the four sprockets 17 is rotatively drivable with a driving force of a drive motor (not shown). Namely, the chain conveyor 16 is rotatively drivable in a clockwise direction as viewed in FIG. 1 with the driving force of the drive motor. The chain conveyor 16 is guided by a chain guide (not shown) disposed at a suitable place of a main frame (also not shown) to travel through a predetermined path.

As shown in FIG. 2, a plurality of shell loading plates 18 each formed into a substantially flat shape are mounted at proper distances on the chain conveyor 16 and arranged parallel to one another, so that the lengthwise direction thereof is perpendicular to the shell transporting direction shown by the arrow A in FIG. 2. The shell loading plates 18 are secured at their portions in the vicinity of the longitudinally opposite ends to the chain conveyor through a mounting member 16*a*.

Figure 3:
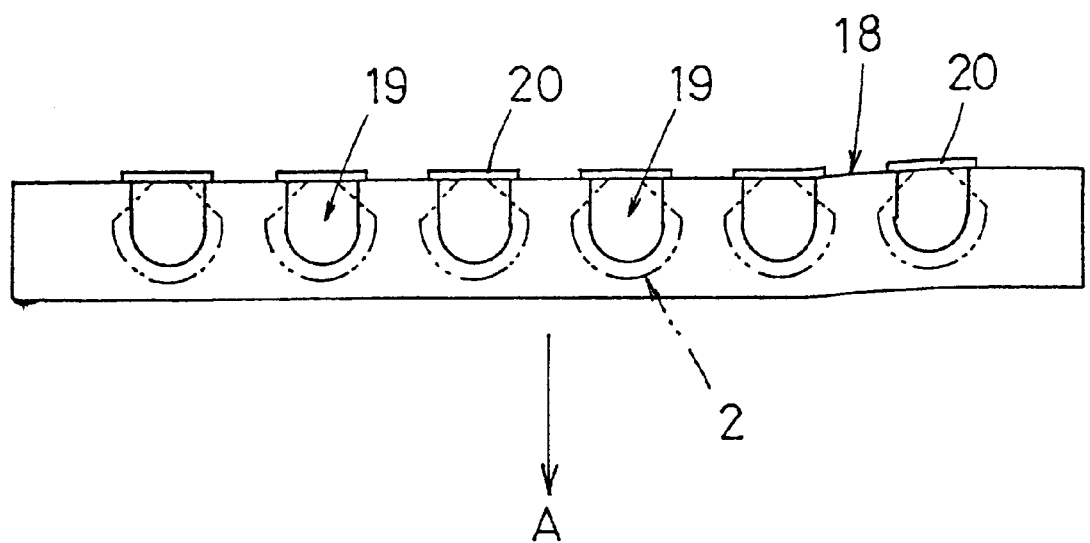
FIG. 3 is a plan view of a starting bivalve loading plate shown in FIG. 2.
Figure 4:
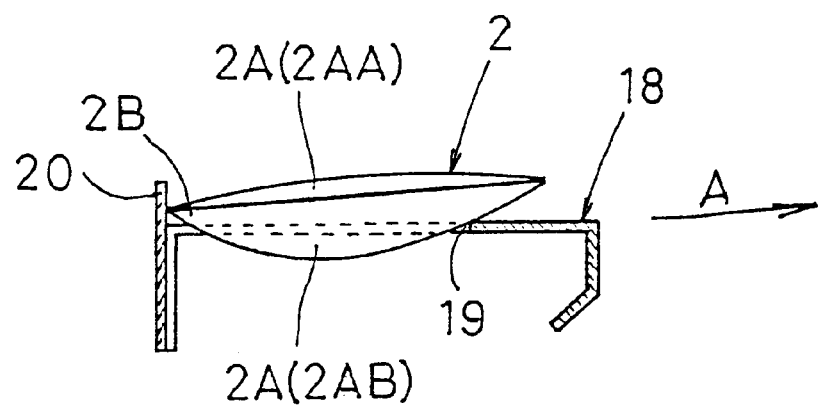
FIG. 4 is an enlarged side sectional view taken from FIG. 3.
Figure 5:
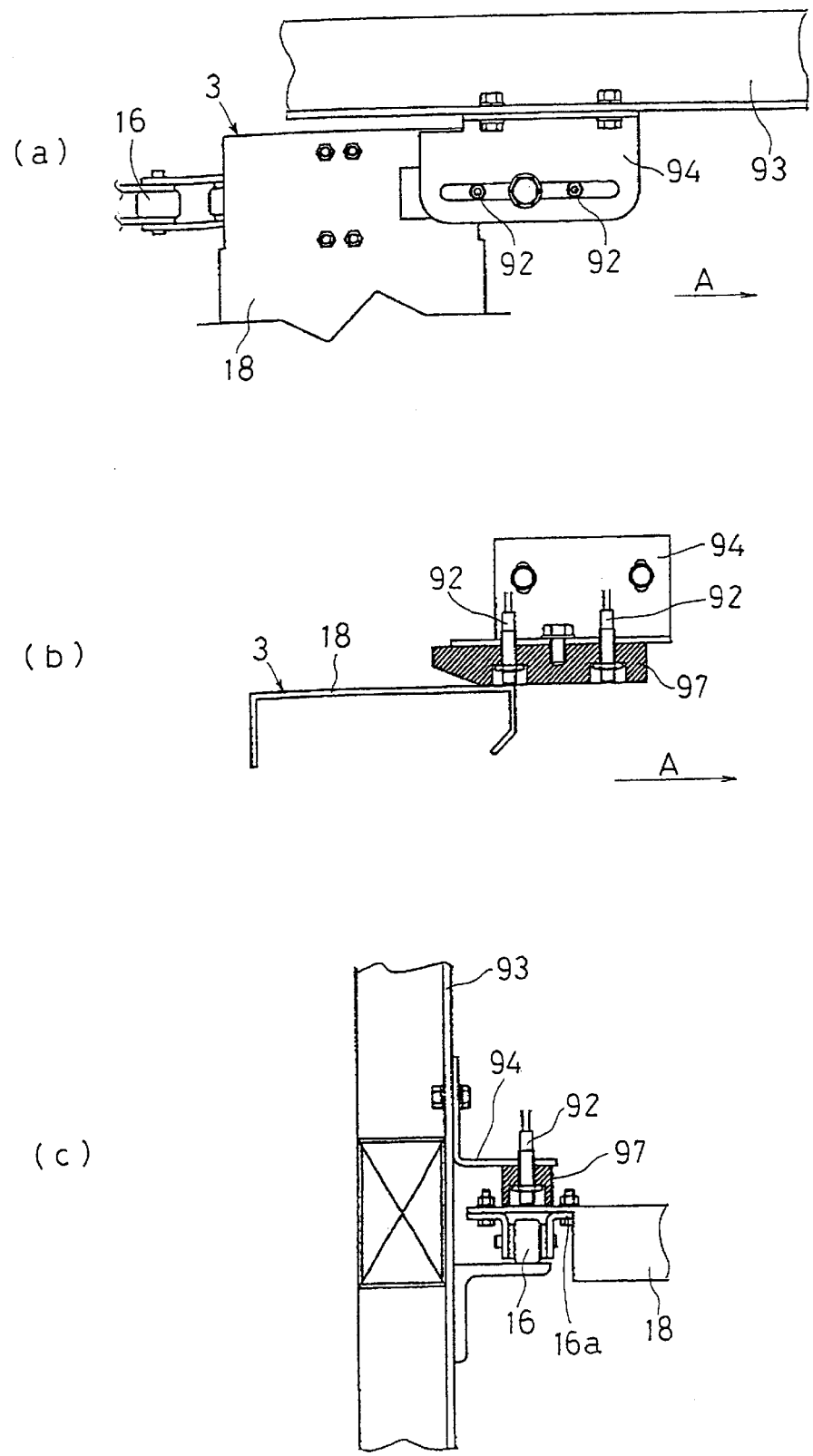
FIGS. 5a to 5c show sensors in an attached state for detecting the traveling of the bivalve loading plate on the transporting/handling means of FIG. 1, FIG. 5a being a plan view of an essential portion, FIG. 5b being a front view of the essential portion, and FIG. 5c being a side view of the essential portion.

As shown in FIGS. 3 and 4, each of the shell loading plates 18 has a plurality of (six in this embodiment) shell-fitting bores 19 defined at proper distances in a longitudinal direction of the shell loading plate 18 to penetrate the plate in a thickness-wise direction for loading the scallops 2 on the plates 18 in a manner that they are supported from below. The shell fitting bore 19 is formed smaller than the shell 2A. A stopper 20 is mounted at a portion of the shell loading plates 18 upstream of each shell fitting bore 19 as viewed in the shell transporting direction shown by the arrow A in FIGS. 3 and 4. Each of the stoppers are formed with a height as large as the thickness of the scallop 2, so that the scallop 2 can be prevented from being misaligned and falling off in the transportation of the scallop 2.

Thus, in this embodiment, it is possible to transport the scallops 2 lined up in 6 rows in the shell transporting direction shown by the arrow A in FIG. 2.

The traveling of the shell loading plates 18 in the shell transporting direction shown by the arrow A in FIG. 1 is detected by a pair of sensors 92, 92, as shown in FIGS. 5a through 5c. The sensors 92, 92 are secured, through a securing member 97, to a support stay 94 which is secured to a sub-frame 93 supported on the main frame (not shown). Thus, when one of the pair of sensors 92, which is located upstream (at the left) in the shell traveling direction shown by the arrow A in FIGS. 5a and 5b, detects the shell loading plate 18, this sensor 92 delivers a signal indicative of the detection of the shell loading plate 18 to the control section (not shown). Then, the control section controls the drive motor (not shown), so that the travel speed of the traveling shell loading plate 18 is reduced.

When the sensor 92 located downstream in the shell traveling direction shown by the arrow A in FIGS. 5a and 5b detects the shell loading plates 18, this sensor 92 delivers a signal indicative of the detection of the shell loading plates 18 to the control section (not shown) and then, the control section controls the drive motor (not shown), so that the traveling shell loading plates 18 are stopped.

The control section is adapted to control the drive motor (not shown), so that after a lapse of a preset period of time from the stoppage of the shell loading plates 18, the drive motor is driven to start the traveling of the shell loading plate 18.

The transporting/handling means 3 is driven intermittently so that the shell loading plates 18 can be stopped at each of the positions corresponding to the shell cleansing means 5, the heating means 6, the shell forcibly-opening means 9, the before-separation heating means 10 and the adductor muscle separating means 11.

The sensor 92 may be any selected from various known sensors such as a non-contact type optical sensor and a contact type limit switch.

The shell cleansing means 5 will be further described with reference to FIG. 6.

Figure 6:
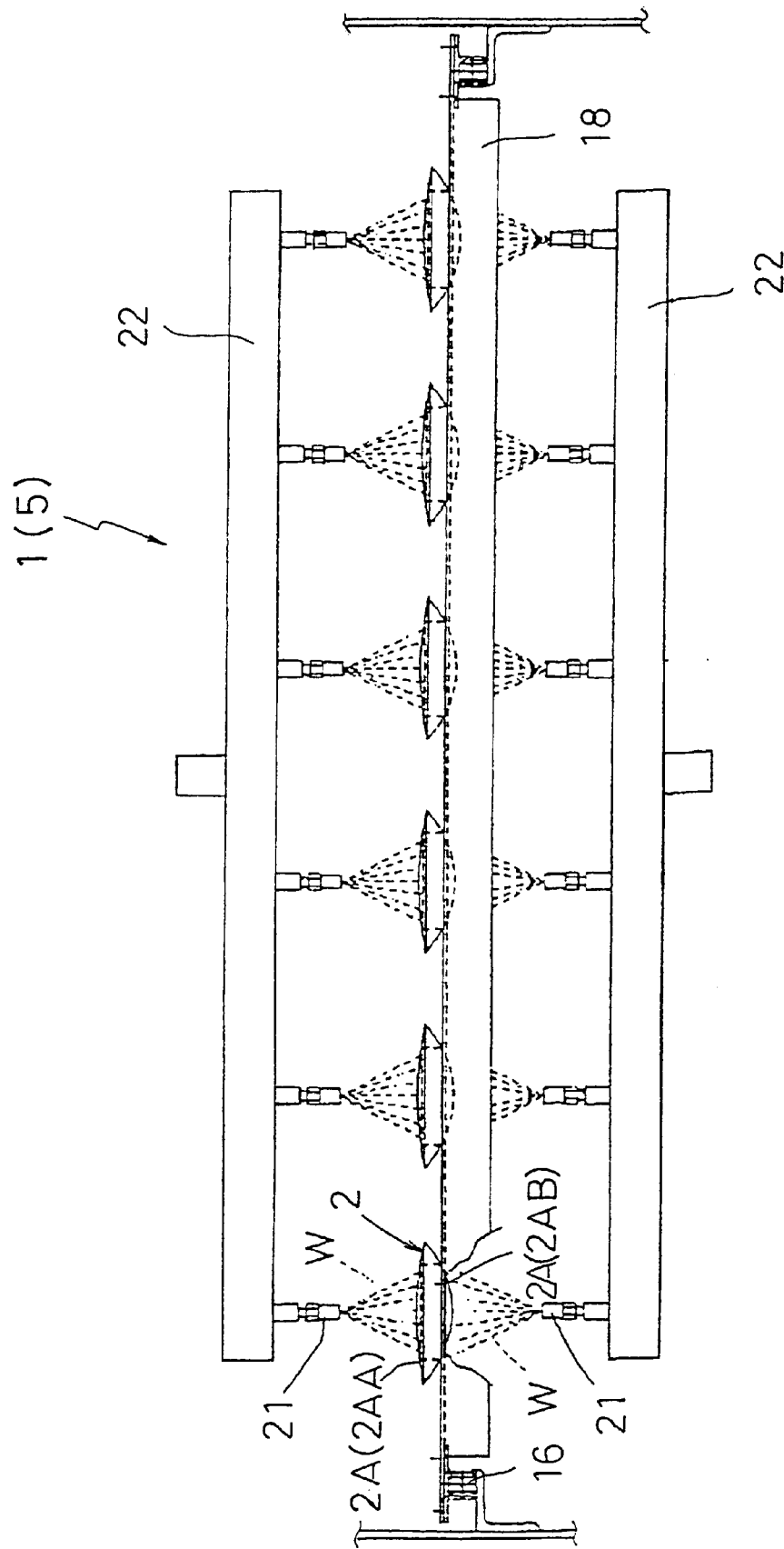
FIG. 6 is a side view of an essential portion of a shell cleansing means as viewed from the downstream in a shell transporting direction.

FIG. 6 is a side view of an essential portion of the shell cleansing means, taken from the downstream side in the shell transporting direction.

The shell cleansing means 5 is used to remove deposits deposited on the surface of the shell 2A of the scallops 2 to clean the surface of the shell 2A. The shell cleansing means 5 has cleansing liquid ejecting nozzles 21 for ejecting a cleansing liquid W such as regular and warm water toward the surface of the upper and lower shells 2AA and 2AB of each of the scallops 2 loaded on the shell loading plates 18. The cleansing liquid ejecting nozzles 21 are connected to a pair of upper and lower cleansing liquid supplying pipes 22 disposed so that they are perpendicular to the shell transporting direction shown by the arrow A in FIG. 1. The cleansing liquid W under a predetermined pressure is supplied for a predetermined period of time through control valves (not shown) to the cleansing liquid supplying pipes 22 by a pump (not shown).

In other words, the shell cleansing means 5 in this embodiment includes the six cleansing liquid ejecting nozzles 21 disposed above the chain conveyor 16 for the cleansing the surface of the upper shells 2AA of each of the scallops 2 loaded on the shell loading plates 18, and the six cleansing liquid ejecting nozzles 21 disposed below the chain conveyor 16 for the cleansing the surface of the lower shells 2AA of each of the scallops 2.

The heating means 6 will be further described with reference to FIG. 7.

Figure 7:
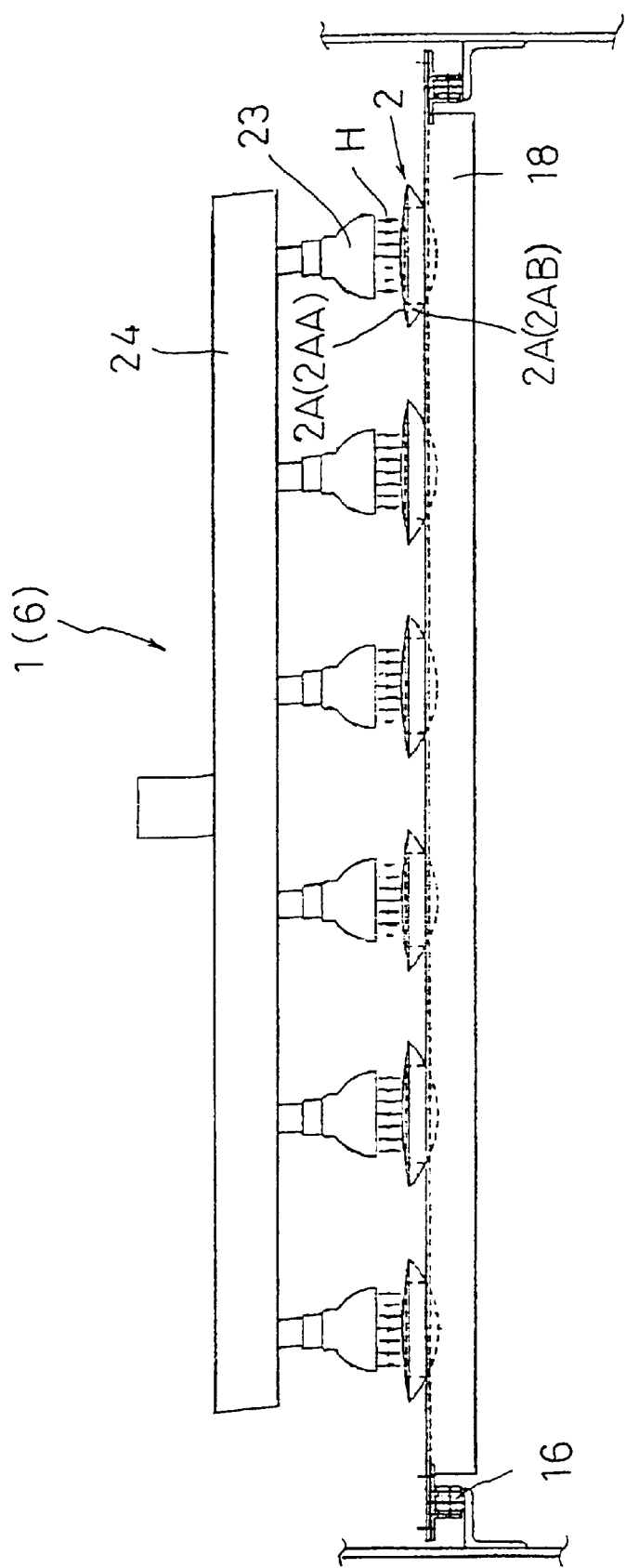
FIG. 7 is a view of the essential portion of a heating means shown in FIG. 1,similar to FIG. 6, as viewed from the downstream in the shell transporting direction.

FIG. 7 is a side view of an essential portion of the heating means, taken from the downstream side in the shell transporting direction.

The heating means 6 is used to heat the surface of one 2A of the shells of the scallops 2, so that the ligaments 2a as an edible part of the scallops 2 are kept in its raw state and a portion of the ligaments 2a joined to the shell 2A is gelled. The heating means 6 in this embodiment is adapted to be able to heat the surface of the upper shells 2AA as one shell 2A of the scallops 2 in such a manner that the ligaments 2a are not discolored and the mouth of the scallops 2 are kept closed.

The heating means 6 in this embodiment has six steam ejecting nozzles 23 as heating nozzles for ejecting steam H serving as a heating source toward the surface of the upper shells 2AA of the scallops 2 loaded on the shell loading plates 18, as shown in FIG. 7. The steam ejecting nozzles 23 are connected to a steam supplying pipe 24 which is disposed perpendicular to the shell transporting direction shown by the arrow A in FIG. 1. Steam H is supplied for a predetermined period of time through a control valve (not shown) to the steam supplying pipe 24 by a pump (not shown) or the like.

In other words, the heating means 6 in this embodiment is arranged to eject steam having a higher temperature as a heating source for a short period of time, e.g., steam having a temperature of 100° C. edible part to the shell for 4 seconds to the surface of the upper shells 2AA of the scallops 2 loaded on the shell loading plates 18, whereby the mouth of the scallops 2 can be kept closed so that the ligaments 2a are not discolored and kept in a raw state, and the portion of the ligaments 2a joined to the upper shells 2AA can be gelled. The temperature of the steam H and the time period of ejection of the steam H are not limited to the temperature and time period used in this embodiment and may be adjusted based on the size and the temperature of the scallops and the like. Hot water (of 100° C. at the maximum) may be used as the heating source.

The shell forcibly-opening means 7 will be further described with reference to FIGS. 8 through 12.

The shell forcibly-opening means 7 is disposed to forcibly expand the scallop shells 2A of the scallops 2 from the bivalves. The shell forcibly-opening means 7 of the present embodiment forcibly expands the lower shells 2AB from the upper shells 2AA through the center of the hinge joint 2B in the scallops 2 at the gelled part that connects the ligaments 2a to the upper shells 2AA from the heating means 6. In other words, it is possible to forcibly open the mouths (of bivalve scallop shells) by separating and peeling-off the shell from the connecting part of the ligaments 2a that are positioned on the heated side on the inner surface of the upper shells 2AA of the closed mouth of the bivalve scallop shells 2A.

Figure 8:
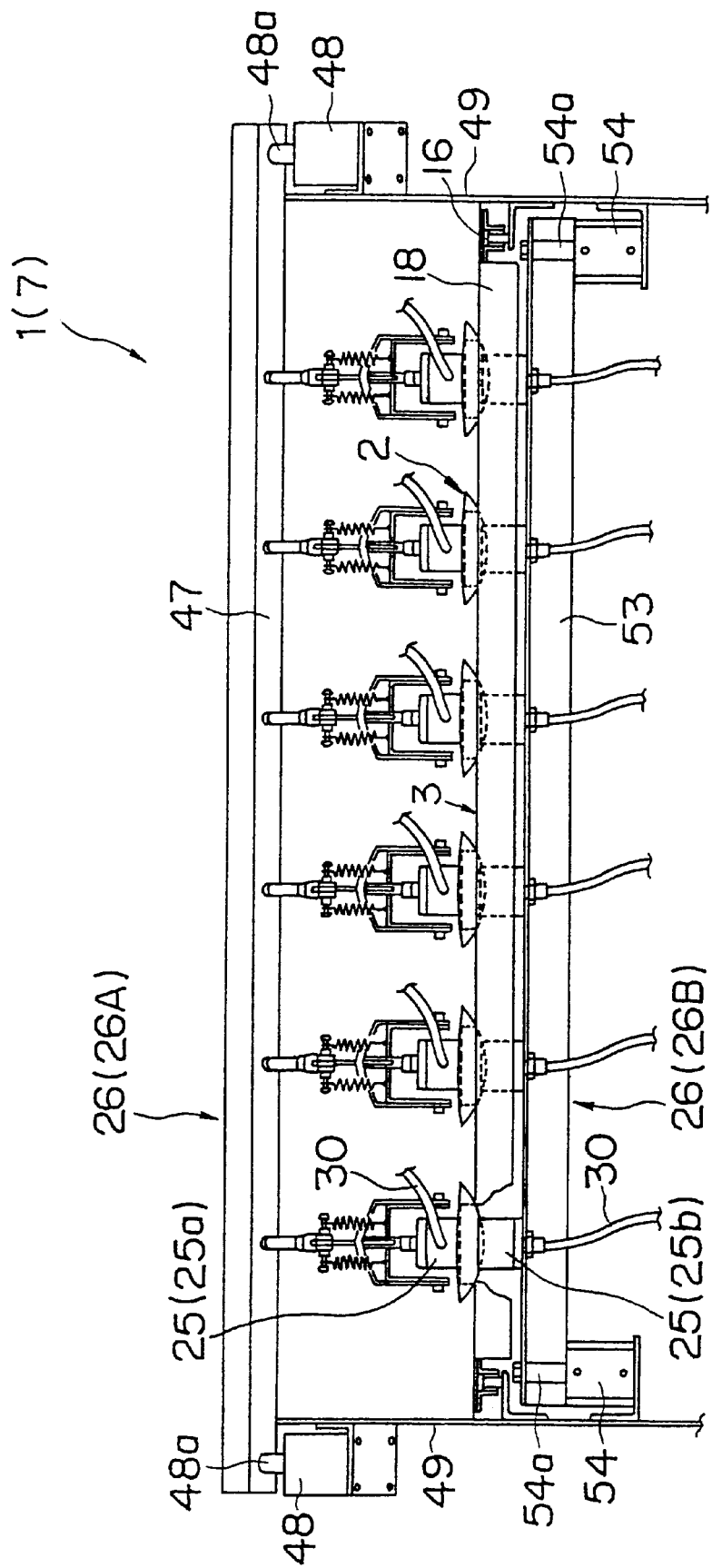
FIG. 8 is a side view of the shell forcibly-opening means in an adsorbed state shown in FIG. 1 as viewed from the downstream in the shell transporting direction.

The shell forcibly-opening means 7 has 6 pairs of upper and lower suction pads 25 that adhere to the surface of each scallop shell 2A of the scallops 2, while traveling by the chain conveyor 16 as shown in FIG. 8. The upper and lower pair of pad driving means 26 drives each pair of suction pads 25.

The suction pads 25, shown at the upper portion of FIG. 8, have an upper suction pad 25A capable of being brought into close contact with the surface of the upper shells 2AA of the scallops 2 under negative pressure, and a suction functioning lower suction pad 25B capable of being brought into close contact with the surface of the lower shells 2AB of the scallops 2 under negative pressure.

Figure 9:
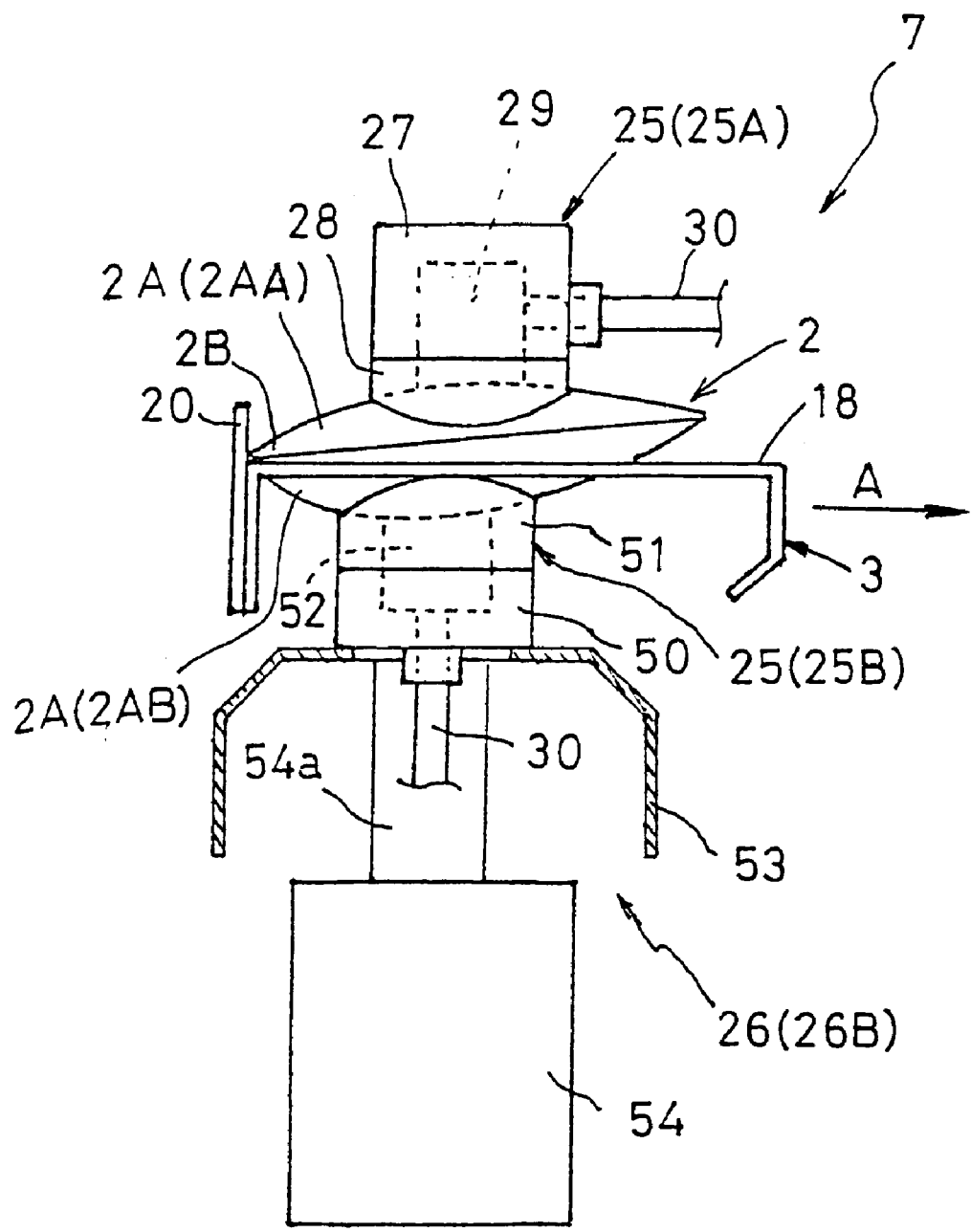
FIG. 9 is a partial enlarged front view of the shell forcibly-opening means in the adsorbed state in FIG. 8.

As shown in FIG. 9, the upper suction pad 25A has a columular shaped base 27. A resin or rubber elastic or the like pad 28 is fixed to the end (lower end) of the upper shells 2AA on the base 27. The lower end of the pad 28 is formed with an open-bottom bore 29 that penetrates the axes of the base 27 and the pad 28. One end of a hose 30, giving passage to the bore 29, is connected to the outer periphery of the base 27. The other end of the hose 30 is connected to a vacuum pump (also not shown) via a 3-way electromagnetic valve, making it possible to supply optimal negative pressure and positive pressure.

Considering suction to an uneven surface of a scallop shell 2a, it is desirable to form a pad 28 with a relatively soft styrene heat conducting plastic resin or silicon elastic material.

Figure 10:
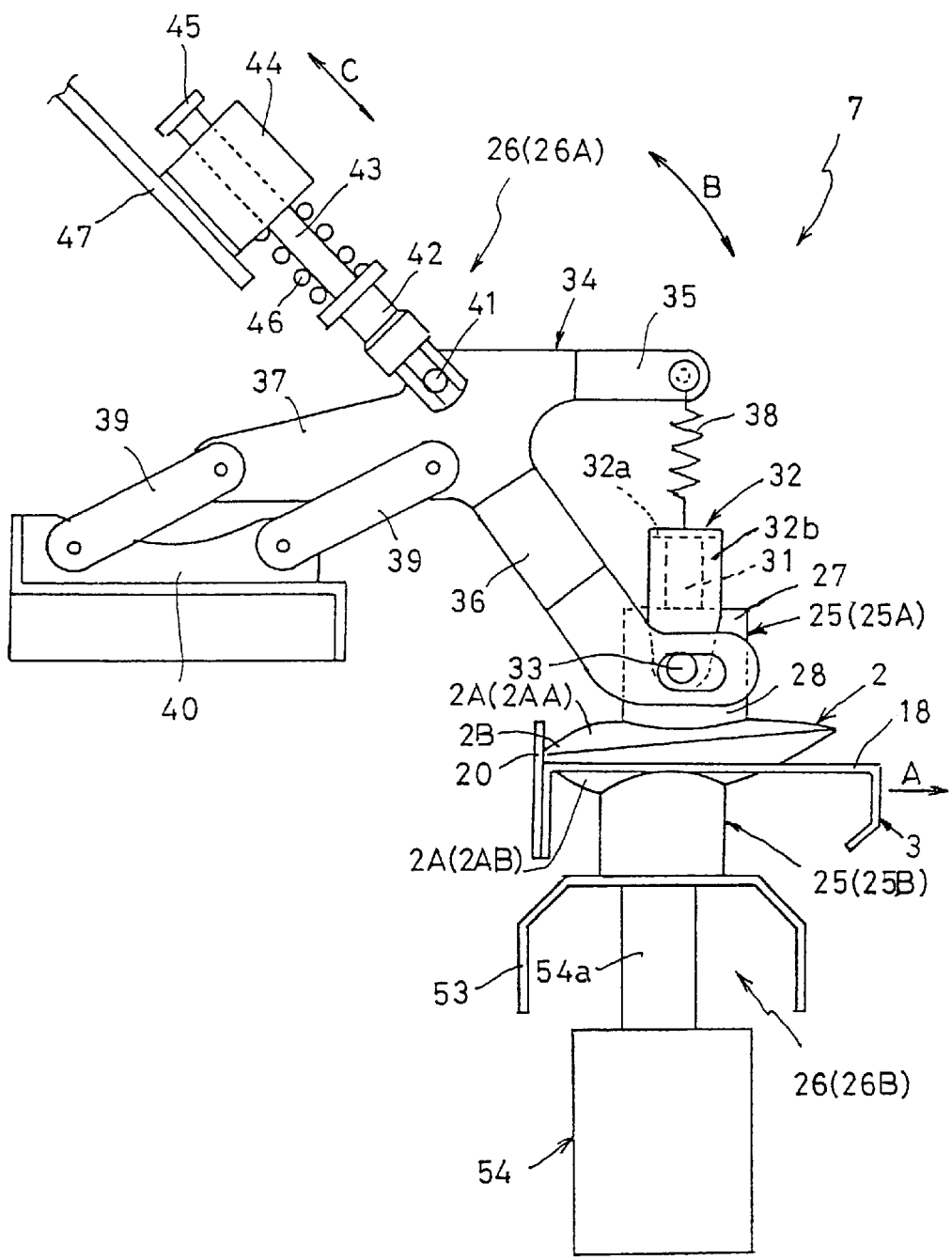
FIG. 10 is a partial enlarged front view of the shell forcibly-opening means in a close contact state in FIG. 8.
Figure 11:
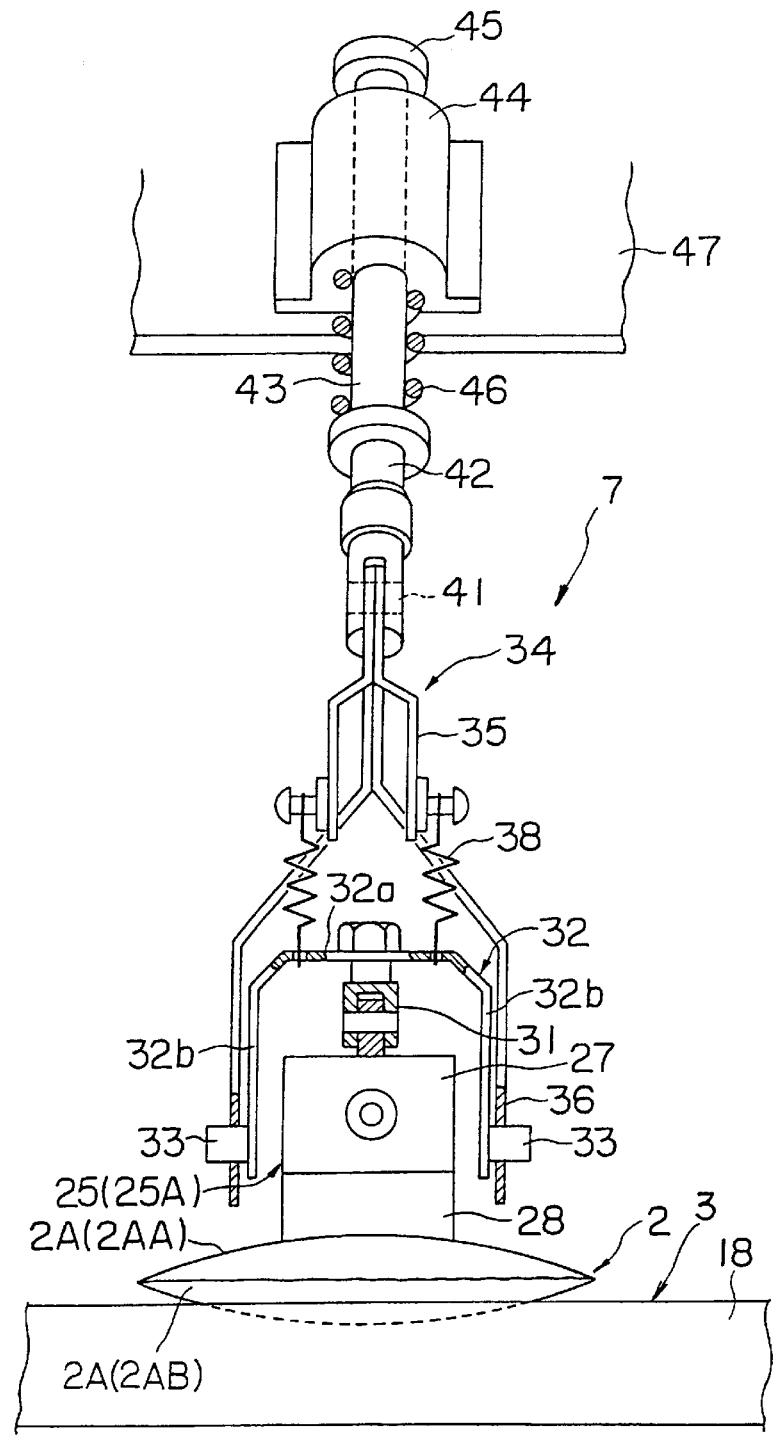
FIG. 11 is a partial side view of the essential portion shown in FIG. 10.

As shown in FIGS. 10 and 11, one end of a joint 31 is mounted to the upper end of the base 27 in the upper suction pad 25A. The other end of the joint 31 is mounted to the pad holder 32 disposed on the upper part of the upper suction pad 25A. The pad holder 32 is disposed on a flat plate 32a positioned on the upper part of the upper suction pad 25A as shown in FIG. 11. Opposite ends of the flat plate 32a are disposed in parallel with extrusions 32b that respectively extrude from the lower end. The pad holder 32, as a whole, is shaped in an upside down U shape. Also, each extrusion 32b on the pad holder 32 is disposed opposite the outer periphery of the upper suction pad 25 positioned centrally and rotationally on the outer periphery of the upper suction pad 25A. Also, a rotary shaft 33 is respectively disposed in the extruding direction on the outer side of the width of the extrusion 32b. Also, the pad holder 32 supports the operating plate 34.

The above-mentioned operating plate 34 includes a horizontal arm 35 with forked ends extruding substantially horizontally from the right side as in FIG. 10, a supporting arm 36 with horizontal extrusions at one tip and forked ends extruding downward at a rightward slant at the other tip as in FIG. 10, and a connecting arm 37 extruding substantially horizontally towards the left as in FIG. 10. One end of a spring 38 is fastened to the vicinity of the tip of the horizontal arm as shown in FIG. 11. The other end is fastened near the vicinity of the opposite ends of the horizontal plates 32a of the pad holder 32. Then, the tip of the support arm 36, positioned on the outer side of an extrusion 32b of the pad holder 32, supports free movement of the rotary support shaft 33 that is disposed near the tip of extrusion 32b of the pad holder 32.

In other words, the pad holder 32 is made to support free movement in the center of the rotary support shaft 33 on the support arm 36 of the operating plate 34, with the horizontal plate 32a bearing external force by the spring 38 being forced in the direction near the tip of the horizontal arm 35 of the operating plate 34, controlling the posture and position in the free state of the pad holder 32 with the rotary support shaft 33 and the spring 38.

Similar to the control of the posture and position in the free state of the pad holder 32, the lower surface of pad 28 of the upper suction pad 25A can continuously control the posture and position of the lower part in the free state of the upper suction pad 25A.

As shown in FIG. 10, one end of each ring plate 39 is mounted to move freely on the tip and base of the connection arm 37. The opposite ends of each ring plate 39 mounted to move freely on the fixed plate 40 are disposed on the lower part of the connection arm 37. The movement loci of the operation plate 34 is restricted to an arc shown by the double arrow B in FIG. 10, due to the fixed plate 40 and each ring plate 39. The movement loci of the operating plate 34 begins its arc-wise movement at substantially the same time when expanding the scallop shells 2A of the scallops 2.

As shown in FIGS. 10 and 11, the support shaft 41 is disposed to penetrate the operating plate 34 in a thickness-wise direction near the point of intersection of the upper side of the connection arm 37 and the upper side of the horizontal arm 35 of the operating plate 34. The binding tips of the forked connection member 42, inserted from opposite sides of the thickness-wise direction of the operating plate 34, are mounted with free movement on the support shaft 41. The upper end of the connection member 42, positioned at a leftward slant on the upper part of FIG. 10, is mounted to the lower end of a rod 43, shown in the lower part of FIG. 10, that is disposed at a slant in the direction of the leftward slant in the upper part of FIG. 10. A bearing block 44 fitted together and freely sliding on the outer periphery of the rod 43 is disposed on the upper part of the rod 43. A stopper 45 is disposed around the outer diametric dimension of rod 43 in the upper end of rod 43. i.e., rod 43 freely advances at a slant between a right downward slant and a left upward slant as shown by the arrow C in FIG. 10.

A compression coil spring 46 is externally fitted around the lower part of the outer periphery of the rod 43. The upper end of the leftward slant of the compression coil spring 46 shown in the upper part of FIG. 10 is put into actual contact with the lower end of the bearing block 44. The lower end of the rightward slant of the compression coil spring 46 shown in the lower part of FIG. 10 is put into actual contact with the upper part of the connection member 42.

Figure 12:
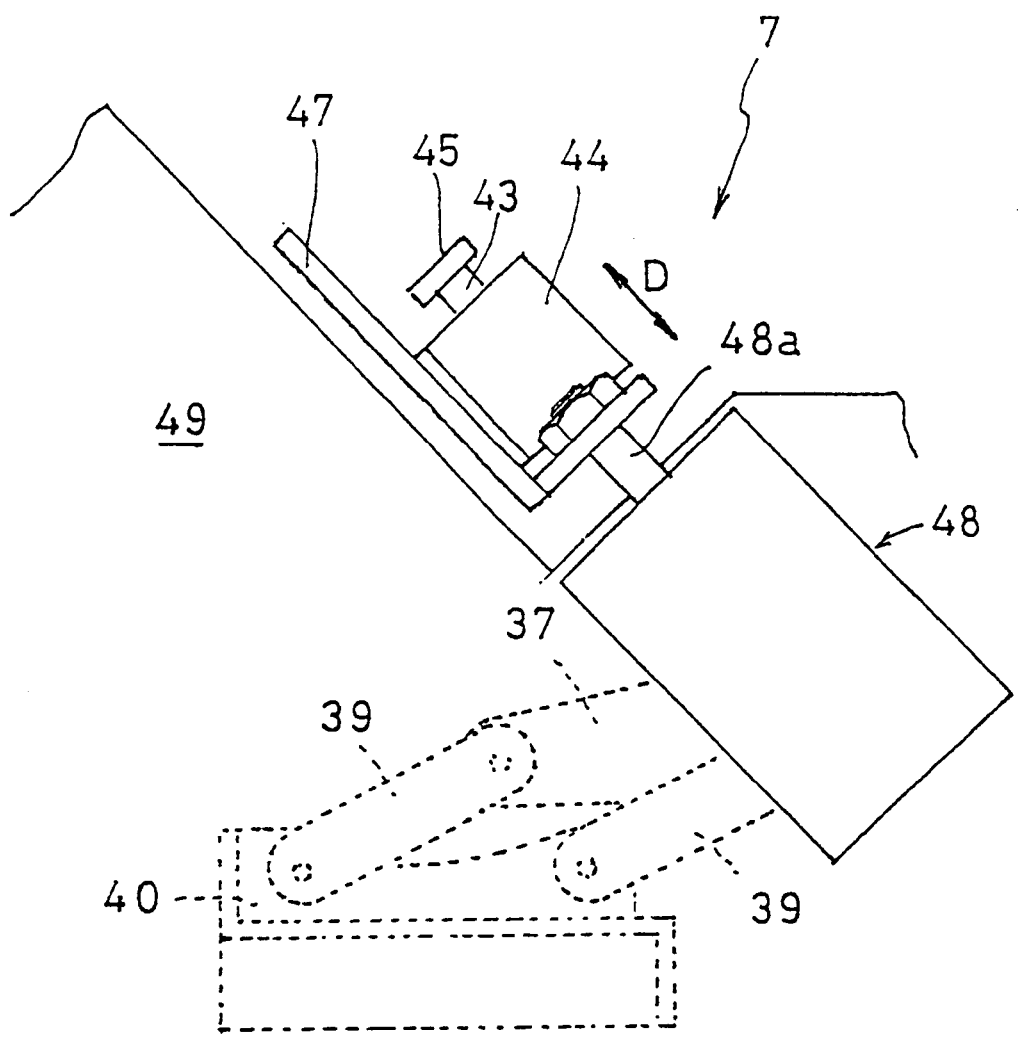
FIG. 12 is a partial enlarged front view showing the disposed state of the upper driving cylinder in the close contact state of the shell forcibly-opening means in FIG. 8.

The bearing block 44 is mounted to the substantially horizontal upper support frame 47. The upper support frame 47 is disposed at a slant extending in parallel to the rod 43 as shown in FIG. 10 and its longitudinal direction is disposed perpendicular to the shell transporting direction as shown in FIG. 8. The end of the output shaft 48a of the driving cylinder 48 (reciprocating cylinder) are each mounted in the vicinity of opposite ends in the longitudinal direction of the upper support frame 47 as shown in FIG. 8. The upper drive cylinder 48 is mounted to the outer side of the side frame 49 disposed on the outer side of the chain conveyor 16 as shown in FIGS. 8 and 12. The output shaft 48a of the upper driving cylinder 48 freely advances at a slant in a right downward slant and a left upward slant as shown by arrow D in FIG. 12.

The output shaft 48a of the upper drive cylinder 48 advances at a slant shown by double arrow D in FIG. 12 to drive the upper drive cylinder 48. The advancing movement of the upper support frame 47 can advance at a slant on the bearing block 44 as shown by double arrow C in FIG. 10. The advancing movement on the bearing block 44 shown by double arrow C in FIG. 10 is transmitted to the rod 43 via the compression coil spring 46 and the rod 43 moves between a right downward slant and a left upward slant shown by double arrow C in FIG. 10. The advancing movement of the rod 43 shown by double arrow C in FIG. 10 is transmitted to the operating plate 37 that rotatively moves in a substantially arc-wise direction in the center of the mounted parts of each ring plate 39 and the fixed plate 40 shown by double arrow B in FIG. 10. The substantially arc-wise rotary movement of the operating plate 37 is transmitted to the upper suction pad 25A via the pad holder 32.

The upper pad driving means 26A of this embodiment is composed of a pad holder 32, an operating plate 34, a rod 43, a bearing block 44, an upper support frame 47, and an upper driving cylinder 48.

Reverting to FIG. 9, the lower suction pad 25B has a base 50 formed in a substantially columnar condition. A rod 51 formed with a resin or rubber type elastic is fixedly mounted to the end (upper end) of the base 50 for the lower shells 2AB. The open passage bores 52 are formed at opposite ends to penetrate the axes of the base 50 and the pad 51. One end of a hose 30 is connected to the lower end of the base 50. The opposite end is connected to a vacuum pump (not shown) via a 3-way electromagnetic valve making it possible to supply optimal negative pressure and positive pressure.

In the same manner as the above-mentioned pad 28, it is desirable to form the pad 51 with a relatively soft styrene heat conducting plastic resin or a silicone elastic material to allow suction to an uneven surface of a scallop shell 2A. i.e., it is best for the suction pads 25 to be formed at the least with a relatively soft styrene heat-conducting plastic resin or a silicon elastic material or the like.

The lower end of the base 50 of the lower suction pad 25B is mounted to the lower support frame 53 in a manner to not interfere with the connection portions of the hose 30 as shown in FIGS. 8 and 9. The lower support frame 53 is disposed in a longitudinal direction perpendicular to the shell transporting direction shown by arrow A in FIG. 9. The tip of the output shaft 54a of the lower driving cylinder (reciprocating cylinder) are mounted to the vicinity of the opposite ends in a longitudinal direction of the lower support frame 53 to move in an upward and downward direction. Each lower driving cylinder 51 is mounted to the inner side of the side frame 49 disposed on the outer side of the chain conveyor 16 as shown in FIG. 8. i.e., the lower support frame 53 moves upward and downward to drive the lower drive cylinder 54 and each lower suction pad 25B can separate the surface of the lower shell 2AB with each upward and downward movement of the lower support frame 53.

The lower pad driving means 26B of the present embodiment is comprised of the lower support frame 53 and the lower drive cylinder 54.

The shell separation means 8 will be further explained with reference to FIGS. 2 and 13.

The shell separation means 8 has a means to remove one of the scallop shells 2A from the live scallops 2 from the opened bivalves in order to retain the edible part, the ligaments 2a, in actual contact in the scallop shells 2A. The shell separating means 8 of the present embodiment, with scallops 2 with forcibly opened mouths from the shell forcibly-opening means 7 en route to the internal organ separation means 9, can separate the actually contacting ligaments 2a on the upper shells 2AA of the scallops 2 from the lower shells 2AB.

Figure 13:
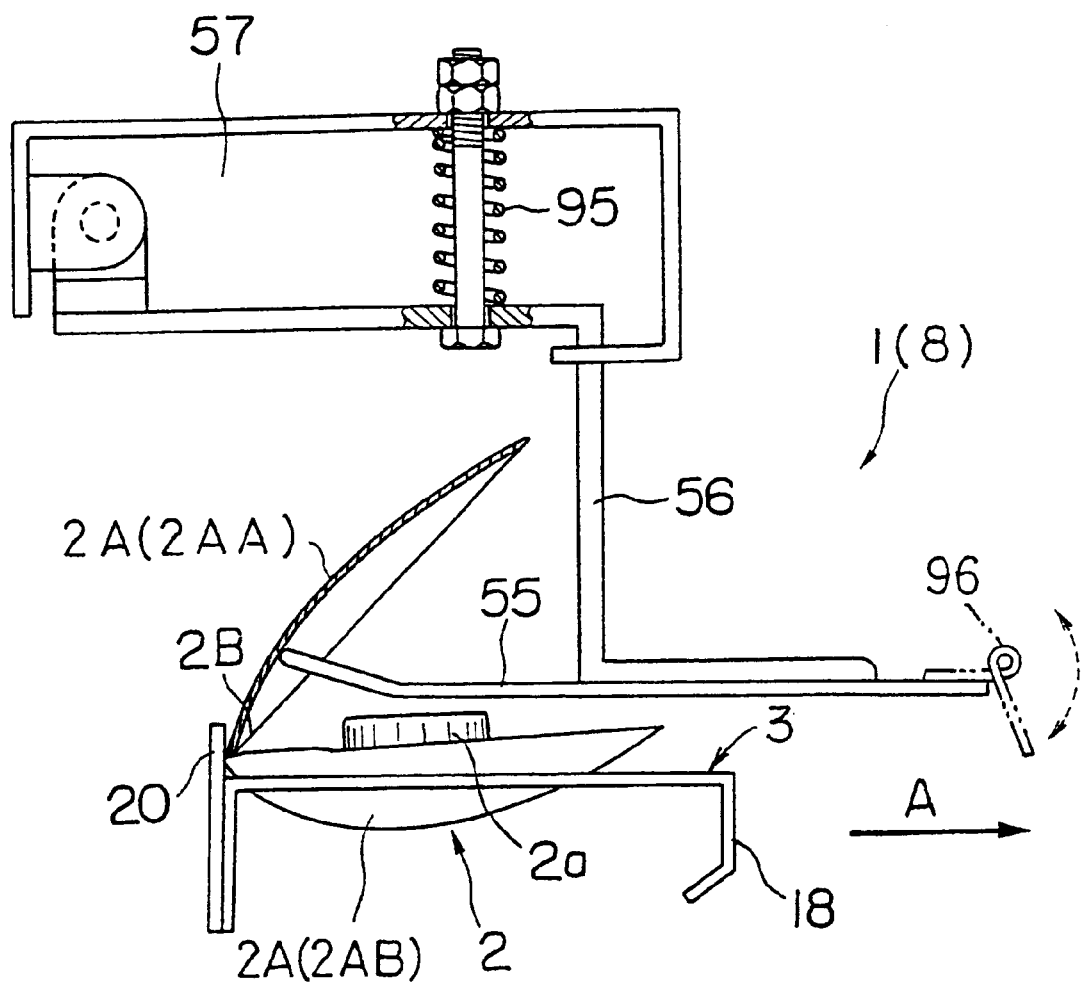
FIG. 13 is an enlarged front view of an essential portion of a shell separating means shown in FIG. 1.

The shell separation means 8 of the present embodiment are disposed with shell loading plates 18 as shown in FIGS. 2 and 13. The end of the inner surface of the upper shells 2AA of each scallop 2 with opened up mouths from the shell forcibly-opening means 7 has actual contact with 6 substantially horizontal separation plates 55. The separation plates 55 are disposed in an array perpendicular to the shell transporting direction shown by arrow A in FIGS. 2 and 13, and are each mounted to the lower surface of a support member 56 disposed across the upper part of the chain conveyor 16. The separator plates 55 are formed in an upside down V-shape with an enlongated left side disposed on the upper ends positioned upstream from the shell transporting direction shown by arrow A in FIG. 13. The opposite ends of the support member 56 supports a spring 95 (FIG. 13) and is mounted to rotate freely on the mounting member 57. The opposite ends of the support member 56 is mounted to rotate freely on the mounting member 57 and supported by a spring 95 (FIG. 13). The separation plates 35 can move in the case of an unusual posture of the scallops 2 riding in the shell loading plates 18 of and being thick of the scallops 2 if the upper part of the uppe shells 2AA is taller than the upper end of the stopper 20. The mounting member 57 is mounted to a mounting frame (not shown) disposed on the outer periphery of the chain conveyor 16.

To meet the demands to reduce the load and the like when separating the upper shells 2AA from the lower shells 2AB, it is desirable to shift positions of each line of separation plates 55 in the shell transporting direction in gradual phases.

One end of the substantially lower side of the back side of the separation plate 55 provides an extending rotating hinge joint 96, shown by the broken line arrow in FIG. 13. It is desirable to perform postural control in the hinge joint 96 of the lower shell 2AB after separation from the upper shells 2AA.

The internal organ separation means 9 will be further explained with reference to FIG. 1 and FIGS. 14 through 16.

The internal organ separation means 9 separates the internal organs 2b from the edible part of the ligaments 2a from the scallop shells 2A of a scallop 2 that has its bivalve opened. It is possible for the internal organ separation means 9 of the present embodiment to separate by suction with negative pressure of the non-edible abdominal appendages, strings and the like of the internal organs 2b from the ligaments 2a remaining in the lower shells 2AB of the scallops 2.

Figure 14:
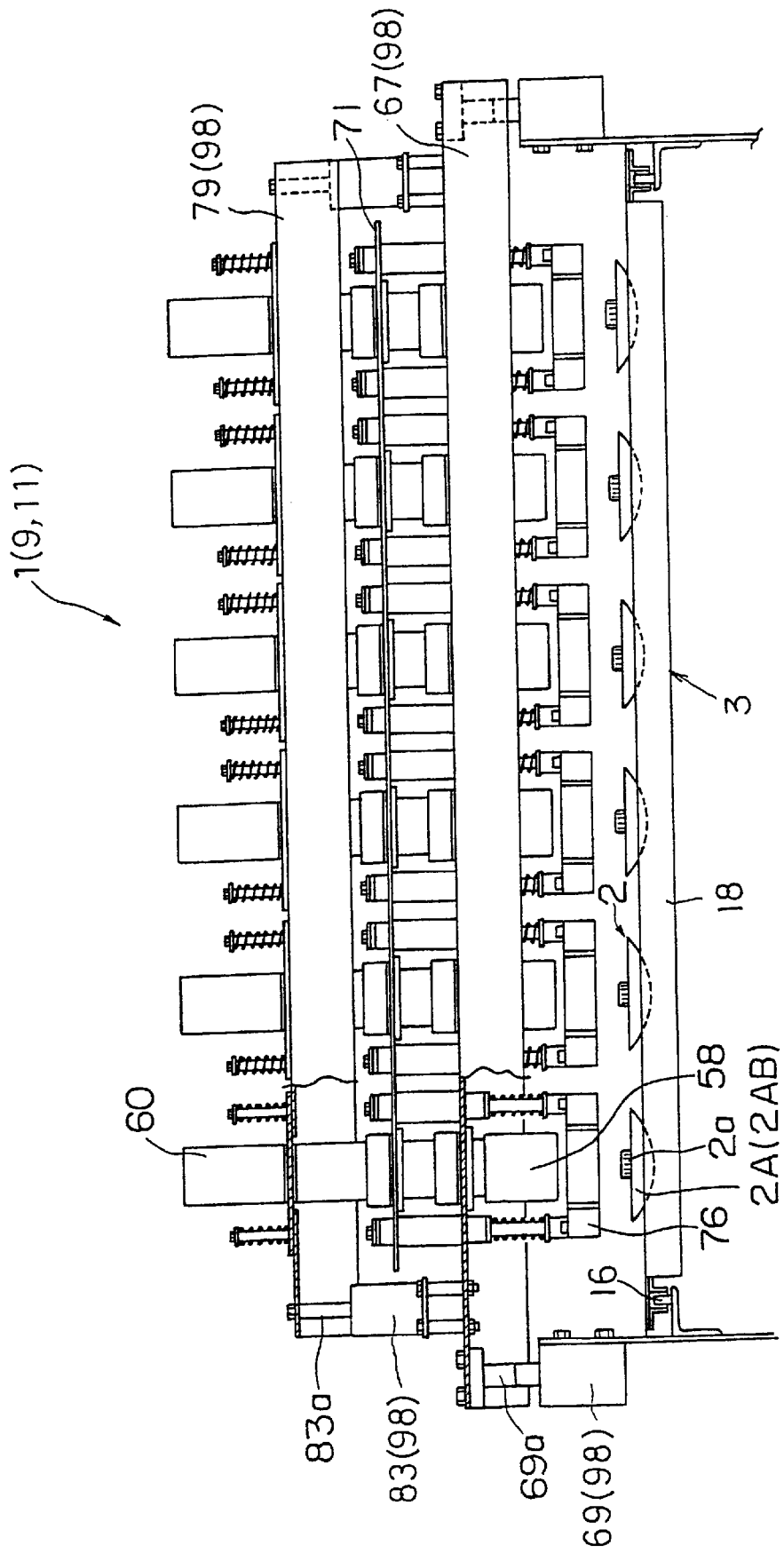
FIG. 14 is a view, similar to FIG. 6, of an essential portion of an internal organ separating means which is a non-edible part separating means shown in FIG. 1, as viewed from the downstream in the shell transporting direction.
Figure 15:
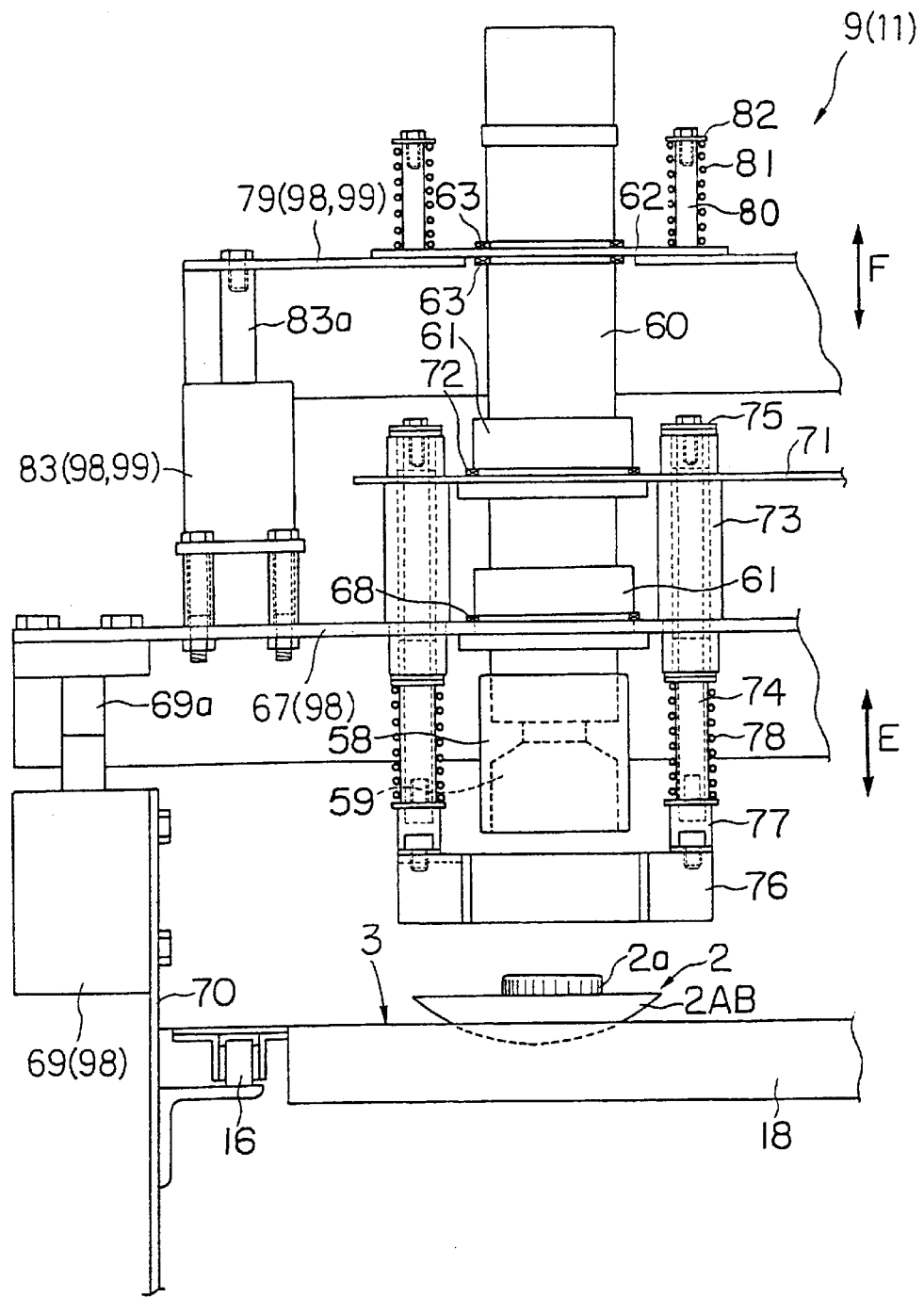
FIG. 15 is a partially enlarged side view taken from FIG. 14.
Figure 16:
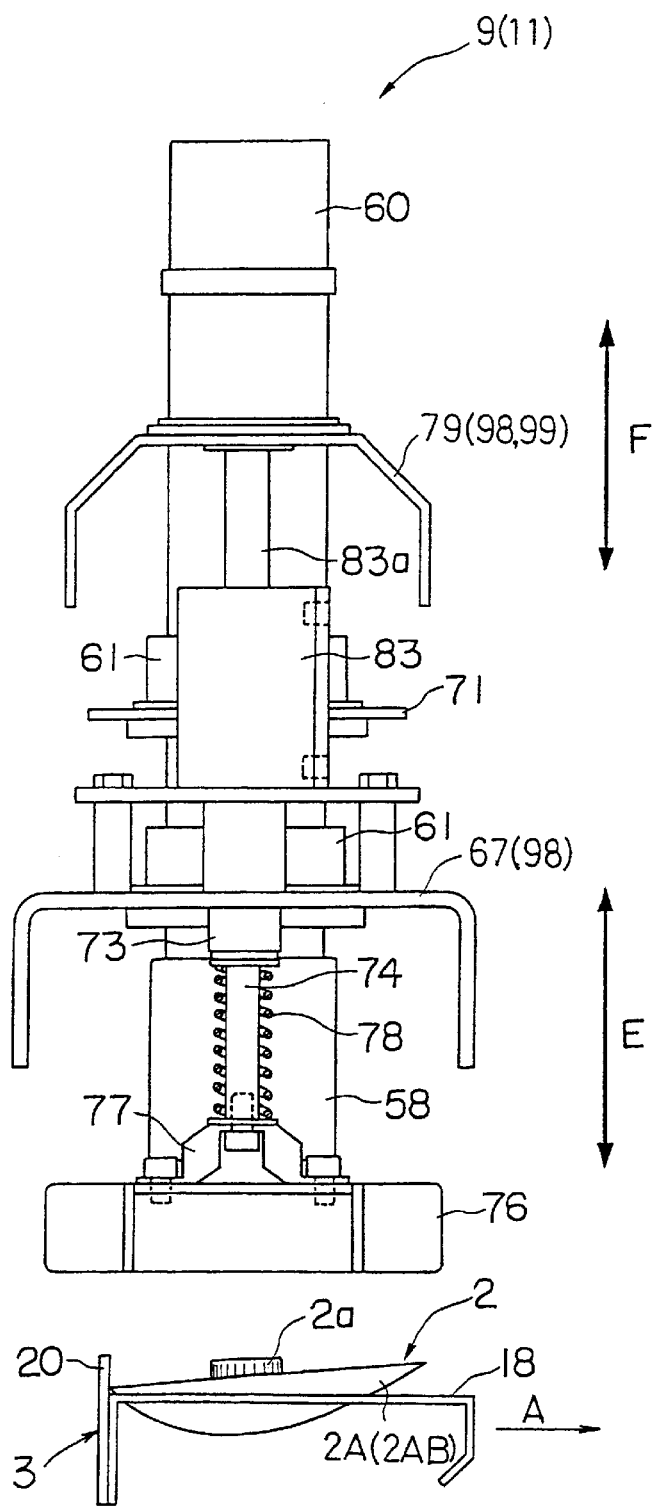
FIG. 16 is a partially enlarged front view taken from FIG. 14.

The internal organ separation means 9 has six suction nozzles 58 disposed opposite of the inner surface of the lower shells 2AB of each scallop 2 as shown in FIGS. 14 through 16. Each suction nozzle 58 is formed in a substantially cylindrical shape as shown in detail in FIG. 15. The lower end surface opposite the ligaments 2a of the scallops 2 can be peeled-off from the inner surface of the lower shells 2AB with a suction bore 59 on the inside diametrical dimension that is larger than the outside diametrical dimension of the ligaments 2a of the scallops 2. A base 60 formed in a substantially cylindrical shape is mounted to the upper portion of the suction nozzles 58. A slide ring 61 fits together to slide in each axial direction on the substantially axial portion and the lower portion of the outer periphery of the base 60. A horizontal plate 62 is mounted with a stop ring 63 to the upper portion of the outer periphery of the base 60. One end of an internal organ transporting hose 64 is connected to the upper end of the base 60 as shown in FIG. 1. The opposite end of the internal organ transporting hose 64 is connected to a chamber 65 as shown in FIG. 1.

A vacuum pump (not shown), via a 3-way electromagnetic valve, is connected to the upper portion of the chamber 65 making it possible to supply optimal negative pressure and positive pressure to the internal organ transporting hose 64 via the chamber 65. A freely opening and closing open/close door 66 is disposed on the lower portion of the chamber 65 making it possible to discharge the internal organs 2b passed through the internal organ transporting hose 64 to a container or transporting/handling conveyor (not shown) each time the open/close door 66 opens and closes.

It is desirable for the composition to supply continual pressure to the internal organ transporting hose 64 when driving the internal organ separation means 9.

The size of the actual contact portion of the suction nozzle 58 on the lower shell 2AB can use various sizes of ligaments 2a of selected scallops 2 from the shell selection machine (not shown).

At the least, the material of the suction nozzle 58 at the actual contact portion contacting the inner surface of the lower shells 2AB should have an adhesive function on the inner surface of the lower shells 2AB, in the event of actual contact with the lower shells 2AB. i.e., it is desirable to effectively utilize the suction power of negative pressure by forming the material with a resin or rubber or the like.

A slide ring 61 positioned on the outer periphery of the lower portion of the base 60 is mounted with a stop ring 68 on the lower frame 67 as shown in FIG. 15. The lower frame 67 is formed in an upside down U shape, as shown in FIG. 16 with its longitudinal direction disposed to the shell transporting direction. The opposite ends of the output shaft 69a of the lower frame driving cylinder 69 (reciprocating cylinder) is mounted to the opposite ends of the lower frame 67 as shown in FIGS. 14 and 15. The lower frame driving cylinder 69 is mounted on the upper portion in the direction of the output shaft 69a that is on the outer side of the side frame 70 disposed on the outer side of the chain conveyor 16.

The outer periphery of the slide ring 61 positioned substantially centrally in the longitudinal direction of the base 60 is mounted with a stop ring 72 on the middle frame 71 disposed on the upper portion of the lower frame 67 as shown in FIG. 15. The longitudinal direction of the middle frame 71 is disposed perpendicular to the shell transporting direction in the same manner as the lower frame 67. The opposite ends of the middle frame 71 disposed in parallel with the opposite ends of the base 60 is supported on the upper part of the lower frame 67 by a step-wise path cylindrical support pipe 73.

A slide rod 74 penetrating the shaft core of the support pipe 73 is fitted together with the support pipe 73. A head member 75 in actual contact with the upper end of the support pipe 73 is mounted to the upper end of the slide rod 74. A shell suppresser 76 adjoining a pair of two slide rods 74 to put pressure on the upper rim of the lower shells 2AB is mounted via a mounting member 77 to each suction nozzle 58. The inner diametrical dimension of the shell suppresser 76 is formed larger than the outer diametrical dimension of each suction nozzle 58. A compression coil spring 78 is in actual contact with the upper end surface of the mounting member 77. i.e., the slide rod 74 is forced in a continuous downward direction by having a force by the compression coil spring 78, and the shell suppresser 76 can have actual contact on the rim of the lower shells 2AB by bearing the force of the compression coil spring 78.

At the least, the material of the shell suppresser 76 at the actual contact portion should not damage the lower shells 2AB when actually contacting the lower shells 2AB. i.e., it is desirable to have a thin metal plate 62 composition or the like elasticized with a resin or a rubber elastic or the like.

The plate 62 is fitted together with a sliding joint on a support pin 80 established on the upper surface of the upper support frame 79 disposed in an upward direction on the middle frame 71. A compression coil spring 81 is fitted to the outer periphery of the support pin 80. One end (upper end) of the compression coil spring 81 is put into actual contact to the lower end surface of a disk-shaped support member 82 larger than the outer diametrical dimension of the support pin 80, and the opposite end (lower end of the compression coil spring 81 is out into contact with the upper surface of the plate 62.

The plate 62 is forced continuously in the direction of the upper surface of the upper frame 79 to bear force from the compression coil spring 81, and the suction nozzle 58 can be put into actual contact with the inner surface of the lower shells 2AB by bearing force from the compression coil spring 81.

The upper frame 79 is formed substantially in an upside down U shape as shown in FIG. 16, and its longitudinal direction is disposed perpendicular to the shell transporting direction. The tip of the output shaft 83a of the upper frame driving cylinder 83 (reciprocating cylinder) is mounted to the opposite ends of the upper frame 79 as shown in FIGS. 14 and 15. The upper frame driving cylinder 83 is mounted in an upward direction on the output shaft 83 near the vicinity of the opposite ends of the lower frame 67, as shown in FIG. 15. i.e., the internal organ separation means 9 of the present embodiment in this embodiment drives the lower frame driving cylinder 69, and the output shaft 69a of the lower frame driving cylinder 69 rises and falls in an upward and downward direction as shown by double arrow E in FIGS. 15 and 16. The rising and falling movement of the lower frame 67 can rise and fall to separate the lower shells 2AB opposite the suction nozzles 58 and shell suppresser 76. The output shaft 83a of the upper frame driving cylinder 83 rises and falls on the upper frame 79 in an upwards and downwards direction as shown by both arrows F in FIGS. 15 and 16 to drive the upper frame driving cylinder 83. The rising and falling movement of the upper frame 79 is transmitted to base 60 via the plate 62 and can rise and fall to separate the lower shells 2AB opposite the suction nozzles 58.

The nozzle peeling-off means 98 to peel-off the inner surface region of the lower shells 2AB of a scallop shell 2A opposite the tip of the suction bore 59 of the suction nozzles 58 in this embodiment of the present invention is comprised of a lower frame 67, a lower frame driving cylinder 69, an upper frame 79 and an upper frame driving cylinder 83. The nozzle oscillating allowance means 99 to oscillate on the inner surface of the lower shell 2AB opposite the suction nozzle 58 is comprised of an upper frame 79 and an upper frame driving cylinder 83.

The before-separation heating means 10 has a means to heat the back surface of the scallop shells 2A at the actual contact portion of the edible ligaments 2a of the scallops 2 from the opened bivalves while maintaining the raw state of the edible ligaments 2a of the scallops 2. The before-separation heating means 10 of the present embodiment ejects steam H in an upward direction as a heating source to weaken the fitted together force of the contact portion between the inner surface of the lower shells 2AB and the ligaments 2a. The ligaments 2a on the back surface of the lower shells 2AB of the scallops 2 are maintained in the raw state without discoloration and the actual contact portion of the ligaments 2a and the lower shells 2AB can be heated to become gelled, and is comprised in the same manner as the heating means 6, therefore, a detailed explanation will be omitted. The before-separation heating means 10 of the present embodiment is shown for the first embodiment of the raw bivalve peeling-off apparatus 1 of the present invention. An explanation of the raw bivalve peeling-off apparatus of the present invention will be omitted.

The adductor muscle separation means 11 will now be further discussed.

The adductor muscle separation means 11 of the present embodiment has a means to separate the edible ligaments 2a from the scallop shells 2A of the scallops 2 from the opened bivalves. The adductor muscle separation means 11 is comprised in the same manner as the internal organ separation means 9 and separates by peeling-off the ligaments 2a, the shell hinge ligament 2ab and the adductor muscle 2aa, the edible parts from the inside surface of the lower shells 2AB. Each suction nozzle 58 of the adductor muscle suction means 11 is formed to suction the ligaments 2a. A detailed explanation of the adductor muscle suction means 11 of the present embodiment will be omitted.

One end of a shell transporting hose 84 is connected to the upper end of the base 60 in the adductor muscle suction means 11 as shown in FIG. 1. The other end of the shell transporting hose 84 is connected to a chamber 85. A vacuum pump (not shown), via a 3-way electromagnetic valve, is connected to the upper part of the chamber 85, making it possible to supply optimal negative pressure and positive pressure to the shell transporting hose 84. A freely opening and closing open/close door 86 is established on the lower part of the chamber 85, making it possible to discharge to a container or a discharge conveyor (not shown) the ligaments 2a that passed through the shell transporting means by each opening and closing of the open/close door 86.

It is desirable for the composition to continuously supply negative pressure when driving the adductor muscle separating means 11.

A limit switch or the like sensor 87 is established to detect the passage of the ligaments 2a en route to the scallop transporting hose 84. The scallop collection means 88 is made to operate based on the detection result of the sensor 87.

The scallop collecting means 88 has six pairs of collection open/close valves 90 (shown as one pair in FIG. 1) than can open and close independently by each driving cylinder 89 (reciprocating cylinder) positioned between the lower shell transporting direction of the discharge chute 13 as shown in FIG. 1. The collection open/close valves 90 can open up based on the detection result of the sensor 87 and then continue to close. The collection open/close valves 90 can maintain a closed state when the ligaments 2a have passed through the scallop transporting hose 84, and can be discharged to a shell discharge conveyor 14 established downward and to the right of the discharge chute 13 when the lower shell 2AB is passing through the discharge chute 13. In the case when ligaments 2a are not passing through the scallop transporting hose 84, the collection open/close valves 90 are opened by the driving cylinders 89 and can discharge the lower shells 2AB attached to the ligaments 2a en route to passing through the discharge chute 13 by a collection conveyor 15 established in a downward direction from the discharge chute 13.

The process order of scallops 2 in the raw bivalve peeling-off apparatus 1 of the present invention will be explained with reference to FIG. 17.

Figure 17:
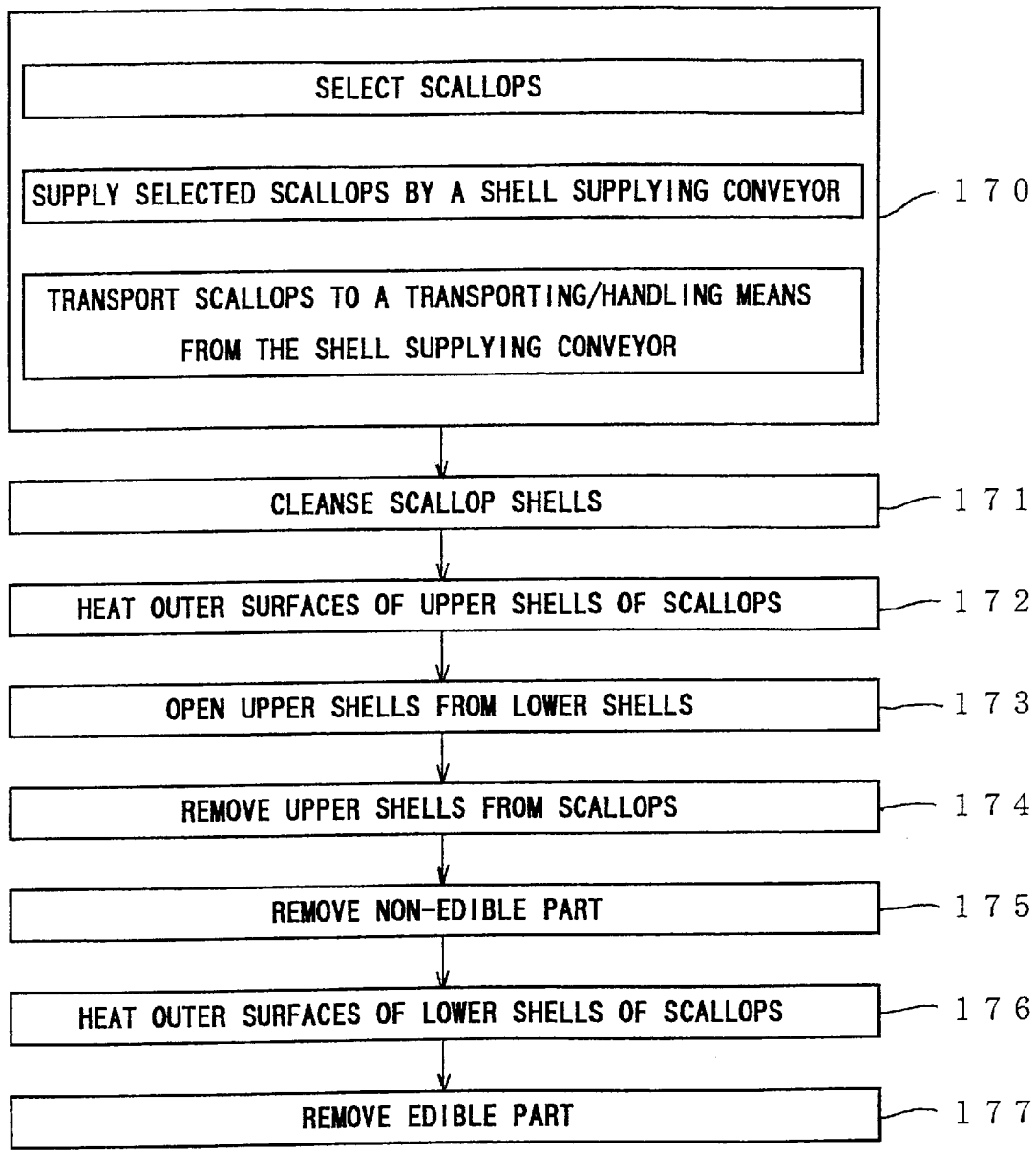
FIG. 17 is a block diagram for explaining one example of a bivalve processing procedure in sequence of steps in the first embodiment of the raw bivalve peeling-off apparatus of the present invention to which the bivalve peeling-off method of the present invention is applied.

As shown in FIG. 17, the working process order to separate a raw edible ligaments 2a of scallops 2 in the raw bivalve peeling-off apparatus 1 of the present embodiment has, in order, a supply process 170 to transport scallops 2 selected by a desired scallop selecting machine to the transporting/handling means 3 supplied from a shell supplying conveyor, a cleansing process 171 to cleanse by a shell cleansing means 5 the back surface of the scallop shells 2A of the scallops 2 transported by the transporting/handling means 3, a heating process 172 to maintain the raw state of the ligaments 2a at the heating means 6 on the back surface of the upper shells 2AA of the scallop shells 2A of the cleansed scallops 2, and also to heat to a gelled state the fitting together portion of the ligaments 2a and the upper shells 2AA, a shell opening process 173 to forcibly open the lower shells 2AB from the upper shells 2AA in the center of a hinge joint 2B at the forcibly-opening means 7 of the scallops 2 with heated upper shells 2AA, i.e., to forcibly open the mouth of the scallops 2 by separating and peeling-off from the fitting together portion of the ligaments 2a to position the heating side to the upper shells 2AA of the scallops 2 with opened mouths, a removing shell process 174 to remove (separate=remove) the upper shells 2AA of the scallops 2 with opened mouths from the scallops 2 at the shell separation means 8, an non-edible part removing process 175 to separate (remove) non-edible internal organs such as the adductor appendage and strings from the ligaments 2a remaining in the lower shells 2AB of the scallops 2 after being separated from the upper shells 2AA at the internal organ separation means 9, a before-separation heating process 176 to maintain the raw state of the ligaments 2a at the before-separation heating means 10 on the back surface of the lower shells 2AB of the scallop shells 2A of the scallops 2 after separating (removing) the internal organs 2b, and also to heat to a gelled state the fitting together portion of the ligaments 2a and the lower shells 2AA, and an edible part separation process 177 to separate and peel-off the edible parts, the adductor muscle 2aa and the shell hinge ligament 2ab making up the ligaments 2a, from the lower shells 2AB of the scallops 2 with heated lower shells 2AB at the adductor muscle separating means 11.

The working process order promised composition of the present invention will be further explained with reference to FIGS. 18 through 23.

According to the above-mentioned raw bivalve peeling-off apparatus 1 of the present invention, there is, first of all, a scallop 2 supplying process 170.

According to the above-mentioned supplying process 170, the scallops 2 previously selected by the scallop selecting machine are supplied successively to the vicinity of the starting position SP of the transporting/handling means 3 of the raw bivalve peeling-off apparatus 1 by a shell supplying conveyor 4. The scallops 2 supplied to the vicinity of the starting position SP are positioned on the shell loading plates 18 by hand or a robot and the supplying process 170 is completed when the shell loading plates 18 comprising one part of the transporting/handling means 3 are stopped at the starting position SP. At this time, each scallop 2 is fitted together on each shell fitting bore 19 with the substantially horizontal upper shells 2AA of the scallops 2 upwards and the other substantially uneven lower shells 2AB of the scallop shells 2A downwards. The scallops 2 are positioned in the shell loading plates 18 fitted together on the rim on the outer periphery of the shell fitting bore 19 to support the lower shells 2AB from the bottom for good stability. The hinge joint 2B of the scallops 2 fitted together with each shell fitting bore 19 are in actual contact with stoppers 20 as shown in FIG. 4. The transporting/handling means 3 drives by intermittently stopping each shell loading plate 18 for about 10 seconds at established positions of the shell cleansing means 5, the heating means 6, the shell forcibly-opening means 7, the internal organ suction means 9, the before-separation heating means 10 and the adductor muscle separation means 11.

Before being selected by the shell selecting machine, it is desirable to use a deposit removing device (not shown) singly or combined in pairs with a brush, grindstone, high pressure water of the like to remove deposits such as seaweed, seas plants, barnacles and the like adhering to the back surfaces of the scallop shells 2A of the scallops 2.

The temperature of the scallops 2 can vary depending if using scallops 2 claimed and harvested on the same day or if using scallops 2 harvested a day earlier and maintained for a day in a pool or the like. When cleansing of the deposits, for example using 35° C., it is desirable to elevate the entire scallop shell 2A to a specific heat that is fixed to the scallops 2 temperature supplying to the raw bivalve peeling-off apparatus 1 of the previous heat that was low temperature water, 35° C. used before supplying the scallops 2 on the shell supplying conveyor 4. Even if the temperature of the scallops 2 is low in the case of winter season scallops, it is desirable to use 35° C. warm water, to elevate the entire scallop shells 2A to a specific heat that is fixed to the scallops 2 temperature supplying to the raw bivalve peeling-off apparatus 1 of the previous heat that was low temperature water, 35° C. used before supplying the scallops 2 on the shell supplying conveyor 4.

At this point, the supplying process 170 is completed and the scallops 2 positioned in the shell loading plates 18 of the transporting/handling means 3 are driven by the transporting/handling means 3 and stopped at the established position of the shell cleansing means 5 after moving in the shell transporting direction shown by arrow A in FIG. 1. During the interval of being stopped, the cleansing process 171 is performed. According to the above-mentioned cleansing process 171, the scallops 2 on the shell loading plates 18 are stopped at the established position of the shell cleansing means 5 and cleansing liquid W is ejected shower-like from a cleansing liquid ejecting nozzle 21 in the direction of the back surfaces of the upper shells 2AA and the lower shells 2AB of each scallop 2 on the shell loading plates 18, and the cleansing process 171 of the back surfaces of the scallop shells 2A is completed. During this time, in order to not misalign the scallops 2 in the shell fitting bore 19 on the shell loading plates 18, the ejection timing of the cleansing liquid W first ejects cleansing liquid W on the back surface of the upper shells 2AA and then commences to eject cleansing liquid W on the back surface of the lower shells 2AB. Also, the ejection timing of the cleansing liquid W first stops ejecting cleansing liquid W on the back surface of the upper shells 2AA and then stops ejecting cleansing liquid W on the back surface of the lower shells 2AB. Water or warm water or the like is used with the cleansing liquid W. If the temperature of the scallops 2 is low in the case of winter season scallops 2, use warm water of about 35° C. in the cleansing liquid W to elevate the entire scallops 2 temperature to a specific heat. It is desirable to continuously eject cleansing liquid W with a pressure of cleansing liquid W on the back surface of the upper shells 2AA higher than the pressure of cleansing liquid W on the back surface of the lower shells 2AB.

At this point, the cleansing process 171 is completed and the scallops 2 with cleansed back surfaces of scallop shells 2A by the shell cleansing means 5 are driven by the transporting/handling means 3 and stopped at the established position of the heating means 6 after moving in the shell transporting direction shown by arrow A in FIG. 1. During the interval of being stopped, the heating process 172 is performed.

According to the above-mentioned heating process 172, the scallops 2 on the shell loading plates 18 are stopped at the established position of the heating means 6 steam H is ejected from a steam ejecting nozzle 23 in the direction of the back surface of the upper shells 2AA of each scallop, and the heating process 172 of the back surfaces of the upper shells 2AA is completed. During this time, the heating means 6 ejects high temperature steam H in the direction of the back surface of the upper shell 2AA for a short time interval, for example, 100° C. steam H is ejected for about 4 seconds. The short time interval limitation of high temperature steam H on the back surface of the upper shell 2AA is different from before to reliably maintain the raw state without discoloring the ligaments 2a positioned by the heat source, and in order to gel the actual contact portion of the ligaments 2a and the upper shells 2AA, and the mouth of the scallops 2 are kept closed. This heating method to heat the back surface of the upper shells 2AA can weaken the fitting together force of the fitting together portion between the ligaments 2a and the upper shells 2AA positioned by the heat source, i.e., the fitting together portion between the ligaments 2a and the upper shells 2AA positioned by the heat source by a simple suction function, for example, the force of a human hand, can forcibly open the mouth of the scallop 2.

If the temperature and ejection time of the steam H is controlled based on the size and body temperature of the scallops 2, the ligaments 2a can be opened by the shell forcible-opening means 7 while maintaining the raw state and not discoloring. Specifically, the temperature and ejection time of the steam H in the present embodiment is not fixed.

It is desirable to have a longer steam H ejection interval in the case of large scallops 2 or low temperature scallops 2, but in order to lengthen the steam H ejection time, the stopping period of the transporting/handling means 3 is not lengthened. In order to avoid a longer stopping period of the transporting/handling means 3 for the longer required process that would reduce the production volume per standard period of time interval, a plurality of heating means of steam ejection nozzles 23 are placed along the shell transporting direction. For example, the heating process 172 can be repeated twice by establishing steam ejection nozzles 23 in two interval spaces in the space running along the shell transporting direction. For example two steam ejection nozzles 23 of heating nozzles are established along the shell transporting direction, the heating process 172 is comprised to repeat twice, for example for the heating process 172 to eject 4 seconds worth of 100° C. steam H, the heating process 172 ejects 2 seconds worth of 100° C. steam H and repeats twice. It is desirable to comprise to dispose a heating means 6 in two locations at appropriate spaces at the position where the shell loading plates 18 stop along the shell transporting direction.

The heating means 6 composition established in two interval spaces in the space running along the shell transporting direction only lengthens the distance between the starting position SP and the discharge position OP, therefore a detailed explanation of the heating means six composition established in two interval spaces in the space running along the shell transporting direction will be omitted.

The applied heat source steam H should be a high temperature heat source (100° C. at a maximum), but the temperature is not fixed for the present embodiment.

In the case of applying a burner-like flame, laser beam, infrared light, halogen lights or the like as a heat source, it is possible to weaken the fitting together force of the ligaments 2a and the upper shells 2AA near the heat source, but it is not desirable from the viewpoint of reliably maintaining the raw state of the ligaments 2a because it is exceedingly troublesome to maintain the raw state of the ligaments 2a without changing the color of the ligaments to white. Additionally, in the case of applying microwaves as a heat source, the entire body of the ligaments 2a are heated, and therefore not desirable. There is a known Japanese Laid-Open Patent Publication No. 3751/1993 that doesn't require the variance of the heat temperature on the back surface portion of the upper shells 2AA, but it can be done simply with the composition of the heating means 6 of the present embodiment.

At this point, the heating process 172 is completed and the heated scallops 2 with upper shells 2AA positioned in shell loading plates 18 on the transporting/handling means 3 are driven by the transporting/handling means 3 and stopped at the established position of the shell forcibly-opening means 7 in the stand-by state after moving in the shell traveling direction as shown by arrow A in FIG. 1. During the interval of being stopped, the shell opening process 173 is performed.

Figure 18:
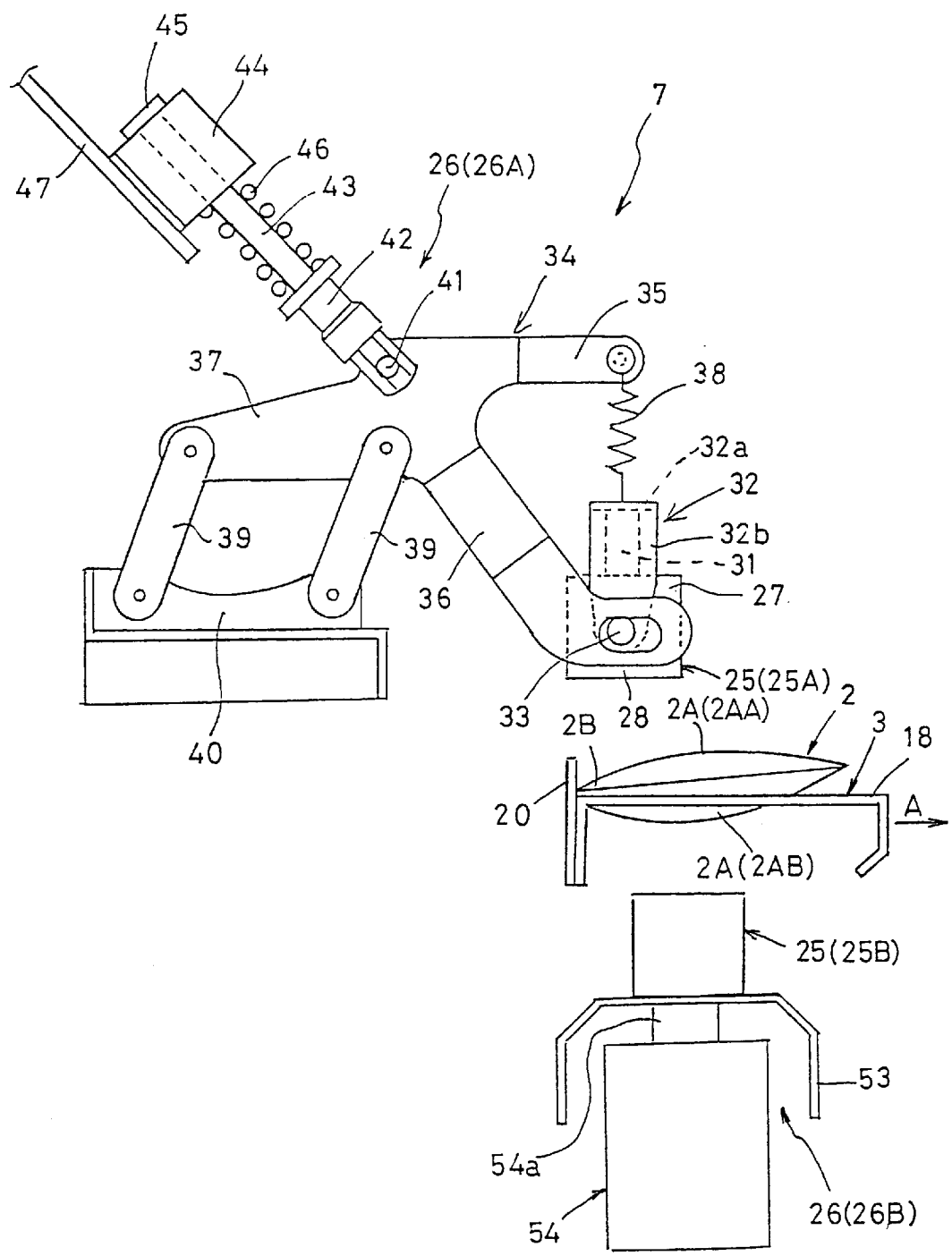
FIG. 18 is a view, similar to FIG. 10, illustrating the stand-by state of the shell forcibly-opening means shown in FIG. 1.
Figure 19:
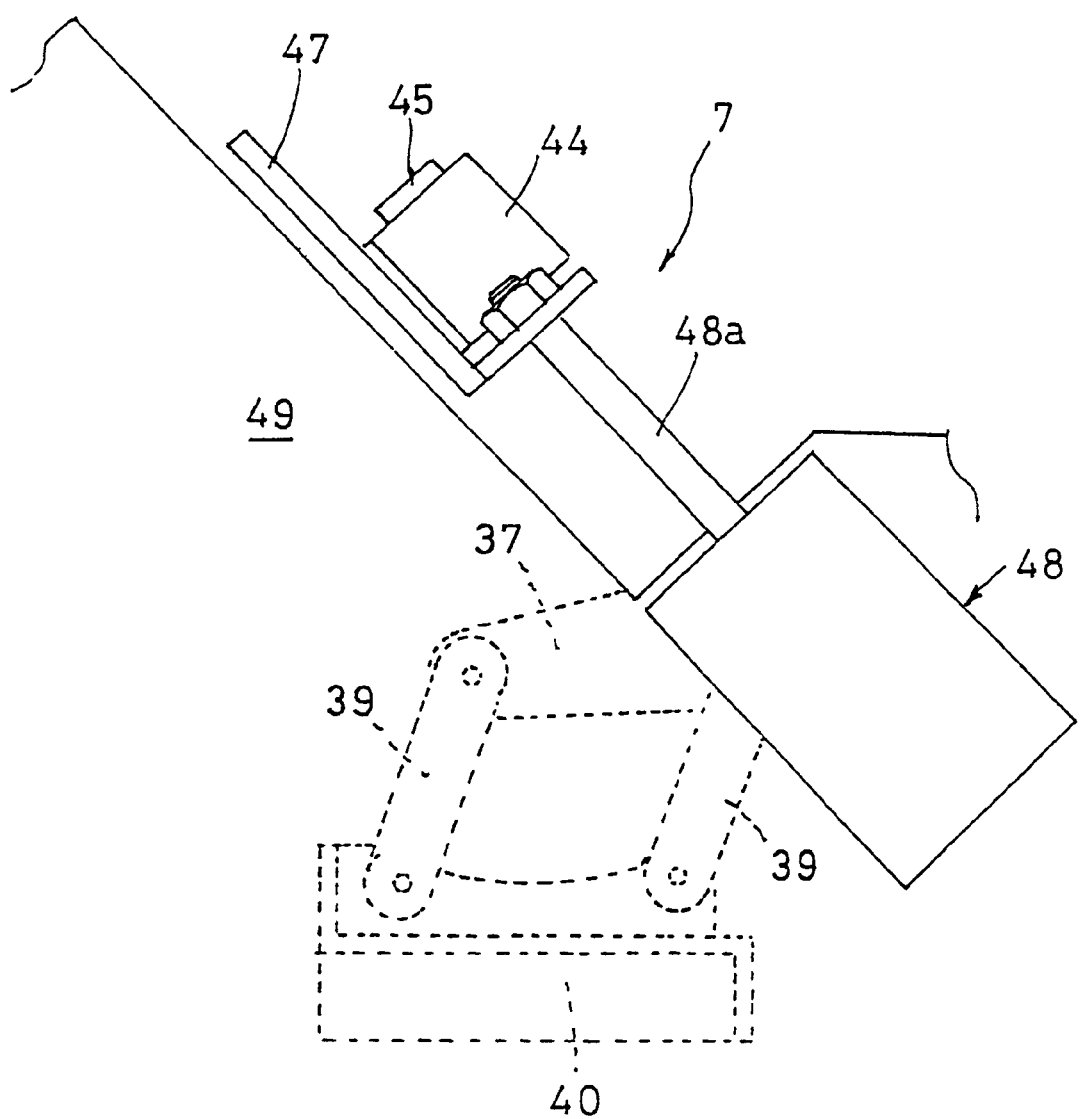
FIG. 19 is a view, similar to FIG. 12, illustrating the stand-by state of the shell forcibly-opening means shown in FIG. 1.

According to the above-mentioned shell opening process 173, the shell forcibly-opening means 7 in the stand-by state can maintain the opened up state of the upper suction pads 25A and the lower suction pads 25B on the traveling surface of the shell loading plates 18 as shown in FIG. 17. i.e., the shell forcibly-opening means 7 of the present embodiment positions the output shaft 48a of the upper drive cylinder 48 of the upper pad driving means 26A to an advanced forward end. The upper support frame 47 is positioned in an advanced forward position at a leftward slant in the upper part of FIG. 19 on the output shaft 48a of the upper drive cylinder 48. A bearing block 44 is positioned at a leftward slant in the upper part of FIGS. 18 and 19 in the advanced forward upper support frame 47. A rod 43, via a compression coil spring 46, positions in an advanced forward position to advance at a upwards left slant, as shown in FIG. 18, to the advanced forward bearing block 44, is rotated in a counter-clockwis direction in a substantial arc on the center of the mounting portion of each link plate 39 and the fixed plate 40 of the operation plate 34, and can position the upper suction pad 25A and pad holder 32 upwards on the shell loading plate 18. At this time, the pad holder 32 controls the position and posture of the pad body 28 of the upper suction pad 25 on the rotary support shaft 33 and spring 38 in the free state in the direction of the shell loading plates 18.

As shown in FIG. 18, the lower drive cylinder 54 of the lower pad driving means 26B positions the output shaft 54a to the falling back retreating end. The lower support frame 53 is positioned on the output shaft 54a of the lower driving cylinder 54 in the advancing forward position at the lower part of FIG. 18, and can position the shell loading plates 18 and the lower suction pad 25B to the advancing forward lower support frame 53.

The scallops 2 positioned in the shell loading plates 18 stop at the established position of the shell forcibly-opening means 7 in the stand-by state and the shell forcibly-opening means 7 drives and the shell forcibly-opening means 7 performs the suction function as shown in FIGS. 8 through 12. i.e., in the shell forcibly-opening means 7, the output shaft 48a of the upper drive cylinder 48 of the upper pad driving means 26A advances forward at a downward right slant as in FIG. 18, and the output shaft 48a of the upper drive cylinder 48 of the upper pad driving means 26A positions in the retreating position as shown in FIG. 12. The upper support frame 47 is positioned on the output shaft 48a of the upper drive cylinder 48 at the retreating position at a downward right slant as in FIG. 12. The shell forcibly-opening means 7 positions the driving bearing block 44 on the retreating upper support frame 47 at a downward right slant. Then the retreated bearing block 44, working together with the rod 43 via a compression coil spring 46, retreats in a downward right slant, rotates the operation plate 34 in a clockwise direction substantially columnar in the center of the mounting position of each ring plate 39 and the fixed plate 40, moves the pad holder 32 in the direction of the upper shell 2AA as in FIG. 10, and presses the pad body 28 of the upper suction pad 25A to the back surface of the heated upper shells 2AA with a force from the compression coil spring 46. At this time, the height position of the back surface of the upper shells 2AA opposite the upper surface of the shell loading plates 18 varies according to the size of the scallops 2, so the extension of the compression coil spring 46 can suck up the difference in height positions of the back surface of the upper shells 2AA. Also, the extension of the compression coil spring 46 in exchange for a large pressing force on the back surface of the upper shells 2AA can reliably prevent breaking the upper shells 2AA.

The output shaft 54a of the lower drive cylinder 54 of the lower pad driving means 26B advances forward in an upward direction, as shown in FIG. 18, with the lower support frame 53, shown in FIG. 9, positioned above it, the lower support frame 53 advances forward and the pad body 51 of the lower suction pad 25B presses on the back surface of the lower shells 2AB.

Each pad body 28,51 of the upper suction pad 25A and the lower suction pad 25B is pressed to the back surface of the upper shells 2AA and lower shells 2AB, negative pressure is supplied to each hose 30 (shown in FIG. 9) via a 3-way electromagnetic valve (not shown), the pad body 28 of the upper suction pad 25A on the back surface of the upper shell 2AA and the pad body 51 of the lower suction pad 25B on the back surface of the lower shell 2AB each reliably adhere, and the suction function of the shell forcibly-opening means 7 is formed as shown in FIGS. 8 through 12. At this time, each pad body 28,51 formed with a relatively soft styrene heat conducting resin or silicon rubber material can effectively use negative pressure to reliably adhere to the back surfaces of the uneven scallop shells 2A. Using a styrene heat conducting resin is important to the manufacture of each pad body 26,51.

The shell forcibly-opening means 7 has a suction function that functions to adhere each suction pad 25 to the back surfaces of upper shells 2AA and lower shells 2AB with negative pressure, and return to the stand-by state of the upper pad driving means 26 advanced forward on the output shaft 48a of the upper drive cylinder 48. The operation plate 34 rotates counterclockwis on a substantially columnar shaped center of the mounting portion of the fixed base 40 and ring plates 39. Only the upper shells 2AA of the scallops 2, by rotating action to the counterclockwis direction of the operating plate 39 is forcibly opened by rotation counter-clockwis to the center of a hinge joint 2B to separate by peeling-off the upper shells 2AA from the adductor muscles 2A.

Figure 20:
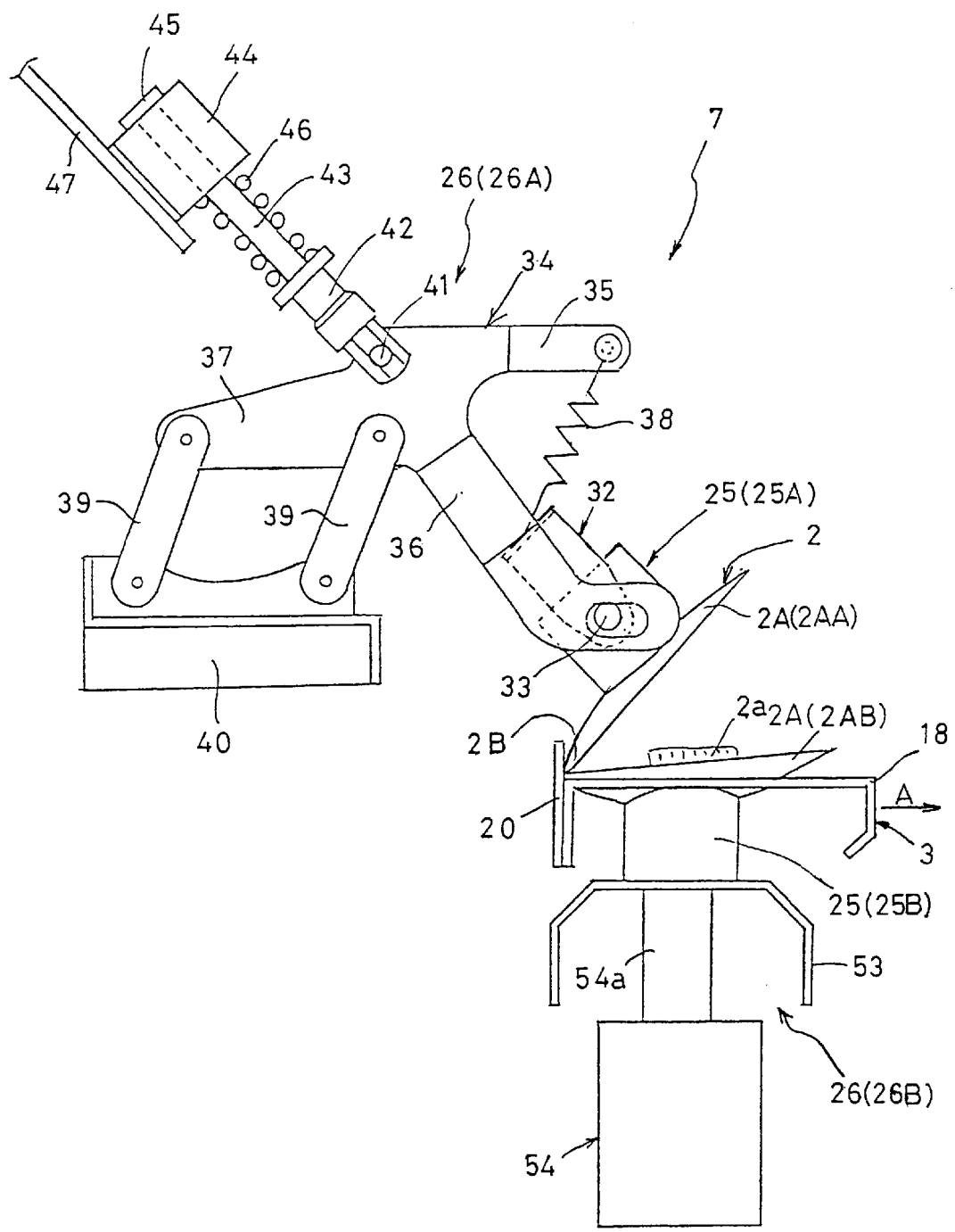
FIG. 20 is a view, similar to FIG. 10, illustrating the opening state of the shell forcibly-opening means shown in FIG. 1.
Figure 21:
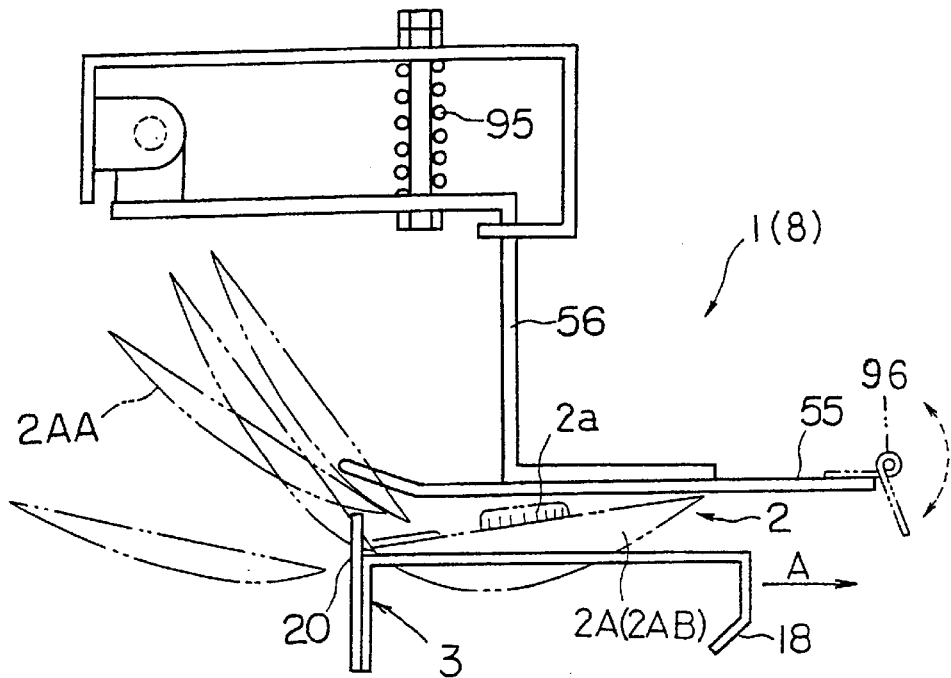
FIG. 21 is an explanatory drawing for explaining the operation of the shell separation means shown in FIG. 1.

Since the fitting together portion of the inner surface of the upper shells 2AA heated by the heating means 6 and the ligaments 2a positioned by the heating side is in an adhering state, the upper shells 2AA and ligaments 2a, by the rotating action in the counterclockwis direction on the operating plate 34, is simply separated by peeling-off and can easily forcibly open the mouth of the scallops 2, resulting in the ligaments 2a remaining in the lower shells 2AB. The opened-up state is shown in FIG. 20. The upper surface (fitted together surface with the upper shells 2AA of the ligaments 2a peeled-off from the upper shells 2AA, shines with smoothness, can improve the external appearance quality of the ligaments 2a, and since it can separate in the same way from the uneven inner periphery of the upper shells 2AA with the upper surface of the ligaments 2a from the upper shells 2AA (the part of the ligaments 2a not remaining behind in the upper shells 2AA), can improve the step stopping when separating the ligaments 2a from the scallop shells 2A.

With the mouths of the scallops 2 open, positive pressure in place of negative pressure is supplied to each hose 30 (shown in FIG. 9) via the 3-way electromagnetic valve (not shown), reducing the suction function of each suction pad 25 to the upper shells 2AA and lower shells 2AB, the output shaft 54a of the lower driving cylinder 54 is retreated, each part of the shell forcibly-opening means 7 returns to the stand-by state, and the shell separating process 172 is completed.

In the above-mentioned heating process 173, the fitting together portion of the inner surface of the upper shells 2AA heated by the heating means 6 and the ligaments 2a positioned on the heating side are put in a suction state different from before and can open the scallop shells 2A forcibly with the shell forcibly-opening means 7. For example, it is possible to use many types of compositions such as a composition established with a plurality of freely opening and closing hooks on a robot arm to forcibly open the mouths of scallops 2.

At this point, the shell opening process 173 is completed and the scallops 2 with opened up upper shells 2AA positioned in the shell loading plates 18 on the transporting/handling means 3 are driven by the transporting/handling means 3 and en route to stopping at the established position of the internal organ separating means 9 by moving in the shell transporting direction, the shell removing process 174 is performed by a shell separating means 8.

Figure 22:
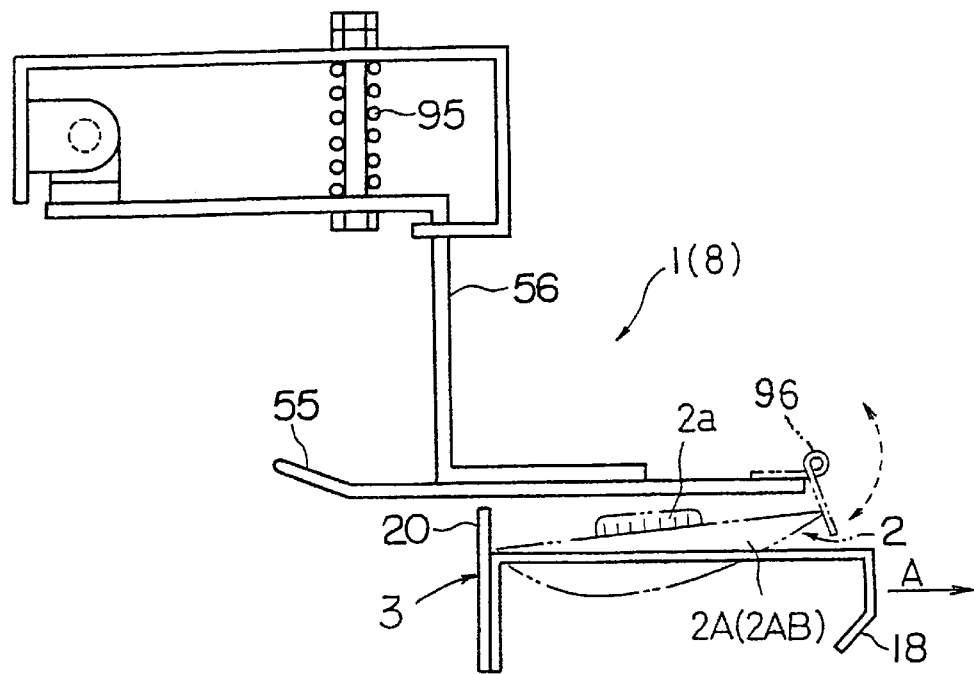
FIG. 22 is an explanatory drawing illuatrting one of the shells separated by the shell separation means shown in FIG. 1.

According to the above-mentioned shell removing process 174, the inner surface of the upper shells 2AA of the scallops 2 on the shell loading plates 18 with opened mouths from the shell forcibly-opening means 7, en route to stopping at the established position of the internal organ separating means 9 by moving in the shell transporting direction on the transporting/handling means 3 as shown in FIG. 1, actually contacts the tip of the separator plate 55 of the shell separating means 8. The lower shell 2AB moving on the shell loading plate 18 maintains the position in the shell loading plate 18 by actually contacting the hinge joint 2B to a stopper 20, as shown in FIG. 20, and only the upper shells 2AA expands by pressing rotatively in a counterclockwis direction central to the hinge joint 2B. While moving in the shell loading plates 18 and pressing open beyond the limits of the upper shells 2AA, the shell removing process 174 to remove the separated upper shells 2AA from the lower shells 2AB is completed. Then the scallops 2, only with lower shells 2AB with ligaments 2a or the like meat attached to the inside of the scallop shells 2A, completing the shell removal process 174, as shown in FIG. 22, are transported to the established position of the internal organ separating means 9 in the shell loading plates 18. The separated upper shells 2AA, as shown in FIG. 1, are discharged, falling down on top of a shell discharge conveyor 12 and are collected in a desired container (not shown).

At this point, the shell removing process 174 is completed and the scallops 2 with the upper shells 2AA separated (lower shells 2AB with ligaments 2a or the like meat attached) positioned on the shell loading plates 18 stop at the established position of the internal organ separating means 9 after moving on the transporting/handling means 3 in the shell transporting direction shown by arrow A in FIG. 1. At the time of being stopped the non-edible part removing process 175 is performed.

Figure 23:
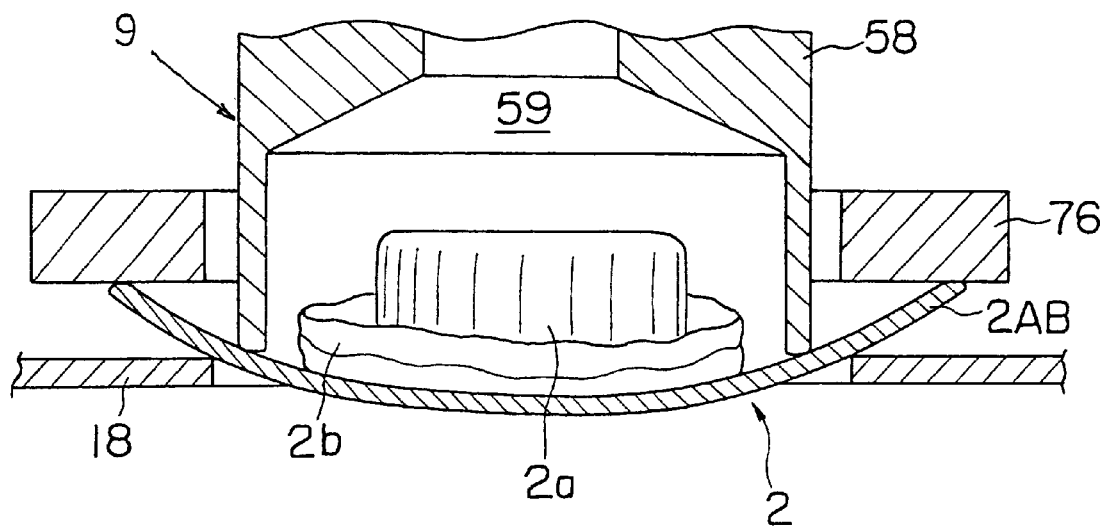
FIG. 23 is an explanatory drawing showing the suction nozzle of the internal organ separating means which is the non-edible part separating means shown in FIG. 1 and a shell retaining ring in abutment against the inner surface of the lower shell.

According to the above-mentioned non-edible part removing process 175, the shell loading plates 18 stop at the established position of the internal organ separating means 9, the lower frame driving cylinder 69 of the internal organ separating means 9 is driven, the output shaft 69a of the lower frame driving cylinder 69 retreats and contracts, and falls in a downward direction to the lower frame 67 as in FIG. 15. The suction nozzle 58 and shell suppresser 76 also fall towards the lower frame 67. The suction nozzle 58 surrounds the circumference of the ligaments 2a with the suction mouth 59 actually contacting the inner surface of the lower shells 2AB by a force from a compression coil spring 81. The shell suppresser 76 actually contacts the rim of the lower shells 2AB with the force by a compression coil spring 78. At this time, since the suction nozzle 58 and the shell suppresser 76 are in actual contact with the lower shells 2AB by the forces of the compression coil springs 81,78, damage to the lower shells 2AB by an excessive force on the lower shells 2AB can be prevented. The actual contact state of the suction nozzle 58 and the shell suppresser 76 in actual contact with the lower shells 2AB is shown in FIG. 23.

Together with the falling down of the lower frame 67, negative pressure is supplied to an internal organ transporting hose 64, and the internal organs 2b such as the abdominal appendage and strings fitting together on the circumference of the ligaments 2a surrounded by the suction mouth 59 of the suction nozzle 58 are suctioned by negative pressure. At that time, the upper frame driving cylinder 83 is flexibly driven by rising and falling in an upwards and downwards direction on the output shaft 83a, the suction nozzle 58 moves by oscillating in an upwards and downwards direction, and the tip of the suction nozzle 58 makes a contacting/separating movement opposite the inner surface of the lower shells 2AB, alternating the suction force opposite the circumference of the ligaments 2a with the contacting/separating movement of the suction nozzle 58 opposite the inner surface of the lower shells 2AB, and can allow for the oscillation of the internal organs 2b fitted together on the circumference of the ligaments 2a. i.e., since the internal organs 2b move, it is possible to simply separate the internal organs 2b from the ligaments 2a compared to the case of allowing a fixed suction force opposite the internal organs 2b. The internal organs 2b separated from the ligaments 2a are suctioned from the suction mouth 59 of the suction nozzle 58 and is transported to a chamber 65 via an internal organ transporting hose 64. With the separation of the internal organs 2b around the circumference of the ligaments 2a by suction in the internal organ separating means 9, it is possible to only have the ligaments 2a remain in the inner surface of the lower shells 2AB.

The internal organs 2b are separated from the ligaments 2a, and the upper frame drive cylinder 83 stops to stop the supply of negative pressure opposite to the internal organ transfer hose 64, the output shaft 69a of the lower frame driving cylinder 69 is raised up by the driving of the lower frame driving cylinder 69, all parts return to the original state, and the edible part removing process 175 is completed. The supply of negative pressure to the opposite of the internal organ transfer hose 64 is stopped, positive pressure is supplier to the chamber 65, and at the same time the open/close door 66, with an opening and closing action, discharges the internal organs 2b inside the chamber 65 to a container or a transport conveyor (not shown).

Without the contacting/separation movement of the tip of the suction nozzle 58 opposite the inner surface of the lower shells 2AB, it is desirable to have a composition to allow for a fixed suction force opposite the internal organs 2b with actual contact of the tip of the suction nozzles 58 opposite the inner surface of the lower shells 2AB.

At this point, the internal organ removing process 175 is completed. The scallops 2 in the shell loading plates 18 on the transporting/handling means 3 with the upper shells 2AA and the internal organs 2*b* removed, are driven by the transporting/handling means 3, stop at the established position of the before-separation heating means 10 after moving in the shell transporting direction shown by arrow A in FIG. 1, and during the interval of being stopped the before-separation heating process 176 is performed. The before-separation heating process 176 heats the back surface of the scallop shells 2A of the scallops 2 in the same manner as the before-mentioned heating process 172.

According to the above-mentioned before-separation heating process 176, the scallops 2 with the upper shells 2AA and internal organs 2*b* removed stop at the established position of the before-separation heating means 10, steam H is ejected in the direction of the back surface of the lower shells 2AB from a steam ejection nozzle 23 as a heat nozzle positioned on the lower part of the lower shells 2AB, and the lower shells 2AB is heated to complete the before-separation heating process 176. At this time, the before-separation heating means 10, in the same manner as the heating means 6, ejects high temperature steam H for a short time interval, for example 100° C. steam H for 4 seconds, in the direction of the back surface of the lower shells 2AB, reliably maintaining the raw state without changing the color of the ligaments portion by the heated side, and can gel the fitting together portion of the ligaments 2*a* and the lower shells 2AB. It is possible to weaken the fitting together force of the fitting together portion between the ligaments 2*a* and the lower shells 2AB positioned by the heated side by heating the back surface of the lower shells 2AB by this heating method. i.e., the fitting together portion of the lower shells 2AB positioned by the heated side can be separated by forcibly and simply peeling-off the lower shells 2AB from the ligaments 2*a* with a single suction function such as the force of a human hand.

If the temperature and ejection time of the steam H is controlled based on the size and body temperature or the like of the scallops 2, the ligaments 2*a* can be forcibly and simply peeled-off from the lower shells 2AB while maintaining the raw state and not discoloring. Specifically, the temperature and ejection time of the steam H in the present embodiment is not fixed.

A steam force, for example 2 kg/cm$^2$, can prevent the lower shells 2AB from lifting off the surface of the shell loading plates 18. It is desirable to control the steam force based on the size of the scallops 2 and the volume or the like of the produced ligaments 2*a* and internal organs 2*b* in order to prevent the lower shells 2AB from lifting off the surface of the shell loading plates 18.

At this point, the before-separation heating process 176 is completed. The heated scallops 2 with the lower shells 2AB positioned in the shell loading plates 18 on the transporting/handling means 3 (the scallops 2 with weakened fitting together portions between the lower shells 2AB and the ligaments 2*a*) are driven by the transporting/handling means 3, stopped at the established position of the adductor muscle separation means 11 after moving in the shell transporting direction as shown by arrow A in FIG. 1, and during the time of being stopped the edible part separating process 177 is performed.

According to the above-mentioned edible part separating process 177, the shell loading plates 18 stop at the established position of the adductor muscle separation means 11, and the adductor muscles 2*aa* and shell hinge ligaments 2*ab* making up the ligaments 2*a* remaining in the inner surface of the lower shells 2AB can be automatically peeled-off and separated from the lower shells 2AB by the adductor muscle separation means 11 in the same manner as the internal organ separating means 9. The ligaments 2*a* separated from the lower shells 2AB are suctioned from the suction mouth 59 of the suction nozzles 58, and transported to a chamber 85 via the adductor muscle transporting hose 84 as shown in FIG. 1. The ligaments 2*a* can be easily suctioned, peeled-off and separated from the lower shells 2AB with the adductor muscle separation means 11. The internal organs 2*b* are separated from the ligaments 2*a* and each part of the adductor muscle separation means 11 returns to the original state to complete the edible part separating process. The supply of negative pressure to the adductor muscle transporting hose 84 is stopped, positive pressure is supplied to the chamber 85, and at the same time the open/close door 86, with an opening and closing action, discharges the adductor muscles 2*aa* inside the chamber 85 to a container or a transport conveyor (not shown).

In order to prevent damage to the ligaments 2*a* from colliding with the side walls on the inside of the chamber 85 when the ligaments 2*a* pass through the adductor muscle transfer hose 84 shown by the imaginary line in FIG. 1 inside the chamber 85, it is desirable to establish a damage preventing member 91 formed with a virtual curtain to receive the ligaments 2*a* passing through the adductor muscle transport hose 84. It is desirable to use a food sanitary safe fluorinated resin or silicon rubber or the like film, sheet plate or sponge material in the damage preventing member 91.

The lower surface of the ligaments 2*a* peeled-off and separated from the lower shells 2AB (the fitting together portion with the lower shells 2AB), shining with smoothness, can improve the external appearance quality of the ligaments 2*a*, and since it can separate in the same way from the uneven inner periphery of the lower shells 2AB with the lower surface of the ligaments 2*a* from the lower shells 2AB (the part of the ligaments 2*a* not remaining behind in the lower shells 2AB), can improve the step stopping when separating the ligaments 2*a* from the scallop shells 2A.

In the present embodiment, a sensor 87 is established to detect the passage of a ligaments 2*a* en route to the above-mentioned adductor muscle transporting hose 84. In the case of not detecting the passage of a ligaments 2*a*, the sensor 87 drives the drive cylinder 89 of the adductor collection means 88, opens the collection open/close valve 90 as shown in FIG. 1, and can discharge the lower shells 2AB with the remaining ligaments 2*a* en route to passing through the discharge route 13 to a collection conveyor 15 positioned below the discharge chute 13. The production region of the scallops 2 (harvested region) is established for the case the ligaments 2*a* not being 100% separated from the lower shells 2AB and for a freshness characteristic. i.e., in the form of the present invention, it is possible to collect and sort for whatever reasons the ligaments 2*a* are not separated from the lower shells 2AB.

At this point the edible part separation process 177 is completed. Only the lower shells 2AB of the scallops 2 positioned in the shell loading plates 18 on the transporting/handling means 3 are driven by the transporting/handling means 3, move in the shell transporting direction shown by arrow A in FIG. 1, and are discharged at the discharge position OP, separating from the shell fitting bores 19 on the shell loading plates 18 onto the discharge conveyor 14 after passing through the discharge chute 13.

However, according to the raw bivalve peeling-off apparatus 1 of the present invention, the back surface of the upper shells 2AB of the scallops 2 in the heating means 6 can be heated in a way to maintain the raw state of the ligaments 2a, and at the same time can reliably maintain the quality of using raw food by reliably preventing a change in color of the ligaments 2a by heating the back surface of the upper shells 2AA in the heating means 6, to weaken the fitting together force between the upper shells 2AA and the ligaments 2a. i.e., to simply suction the fitting together portion of the ligaments 2a and the inner surface of the upper shells 2AA positioned on the heated side. The result is the shell forcibly-opening means 7 can forcibly, automatically and easily open the mouths of the scallops 2.

The ligaments 2a at the before-separation heating means 10, are heated, while maintaining the raw state, to weaken the fitting together force between the upper shells 2AA and the ligaments 2a. i.e., to simply suction the fitting together portion of the ligaments 2a and the inner surface of the upper shells 2AA positioned on the heated side, making it possible to forcibly, automatically and simply separate the ligaments 2a from the lower shells 2AB. It is possible to effectively separate ligaments 2a from the scallops 2 while maintaining the quality of using raw food. i.e., the raw bivalve peeling-off apparatus 1 of the present invention, before opening (expansion) the mouth of the scallop shells 2A of the bivalve and before taking (separating) the edible ligaments 2a from the scallop shells 2A, can effectively administer a weakness on the fitting together force on the fitting together portion of the ligaments 2a and the scallop shells 2A while maintaining the effectively raw state of the ligaments 2a.

The fitting together portion of the scallop shells 2A and the ligaments 2a separates from the scallop shells 2A, shining with smoothness, can improve the external appearance quality of the ligaments 2a, and since the ligaments can be completely separated from the scallop shells 2A (no parts of the ligaments 2a remain in the scallop shells 2A), it is possible to effectively improve the yield (collection percentage) when separating the ligamentss 2a from the scallop shells 2A. i.e., it is possible to get a 100% yield. The yield of ligaments 2a in the present embodiment was 98% and there was a 2% loss.

The existing firm portion can remain in the rim of the fitting together surface of the scallop shells 2A and the ligaments 2a separated from the scallop shells 2A, and can improve the eating experience and taste of the raw ligaments 2a.

Since the fitting together surface of the scallop shells 2A and the ligaments 2a separated from the scallop shells 2A are not suctioned, and water used for trimming (cleansing process to remove minute internal organs or the like deposits attached to the edible parts to be used for food) the ligaments 2a after separating from the scallop shells 2A deteriorates the taste by suctioning the inner portion of the fitting together surface of the ligaments 2a, it is possible to reliably prevent the inconvenience of washing away the flavor from the water evaporating from the dripping when defrosting the frozen ligaments 2a, and it is possible to reliably improve commercial price of the ligaments 2a.

In the raw bivalve peeling-off apparatus 1 of the present invention, it is possible to automatically separate the ligaments 2a from the scallop shells 2A, and possible to place a reduction in required labor to separate ligaments 2a, and it is possible to swiftly manage scallops 2 in the case of hauling a large volume of scallops 2.

In the present embodiment, explaining using scallops 2 as one of bivalves in a separating apparatus for ligaments 2a from scallops 2 to be used as raw food, it is possible to utilize and separate the edible parts of bivalves, for example ark shell meat and oyster meat or the like.

Figure 24:
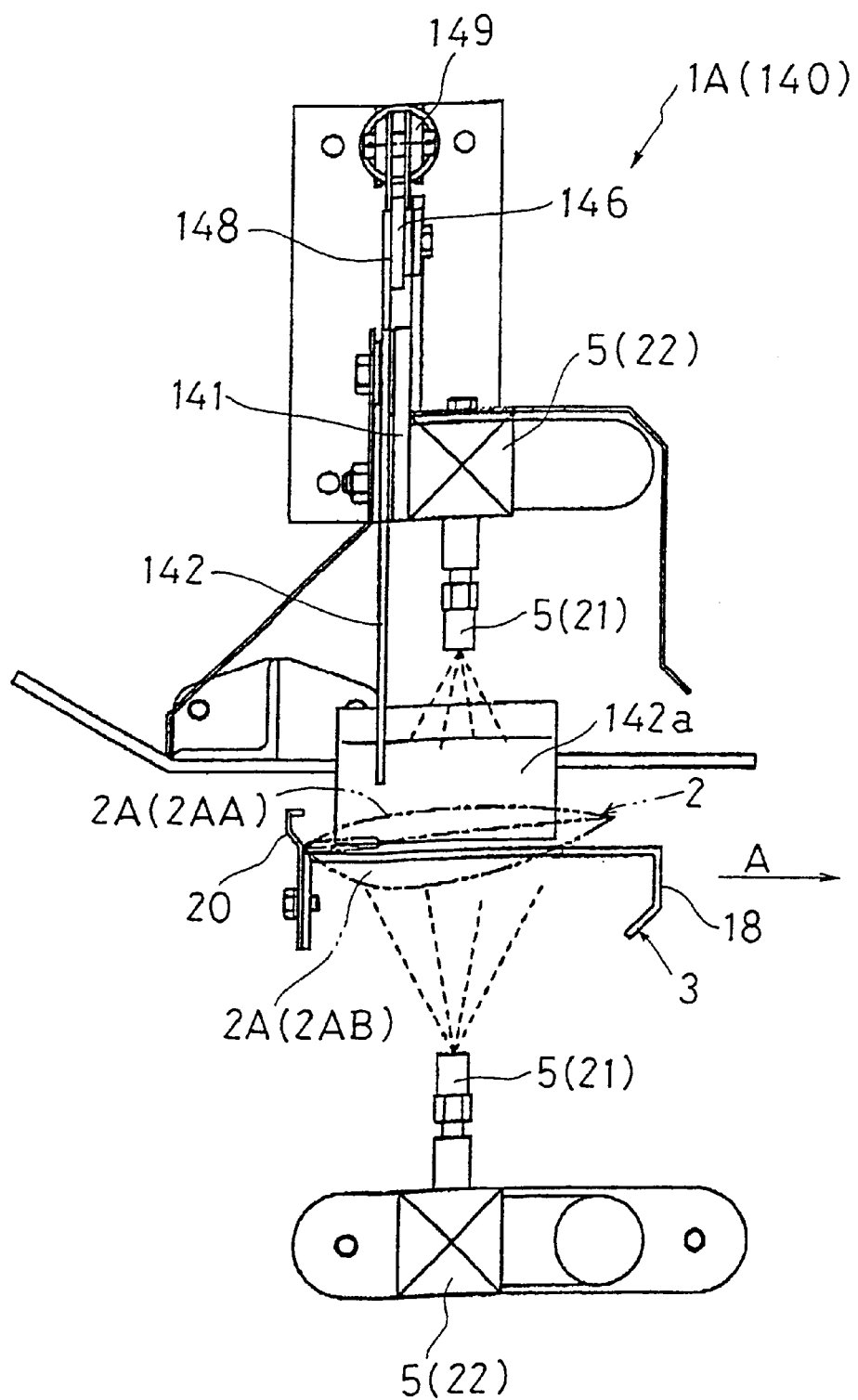
FIG. 24 is a front elevation of an essential portion of a starting shell positioning means in the second embodiment of the bivalve peeling-off apparatus of the present invention to which the bivalve peeling-off method of the present invention is applied.
Figure 25:
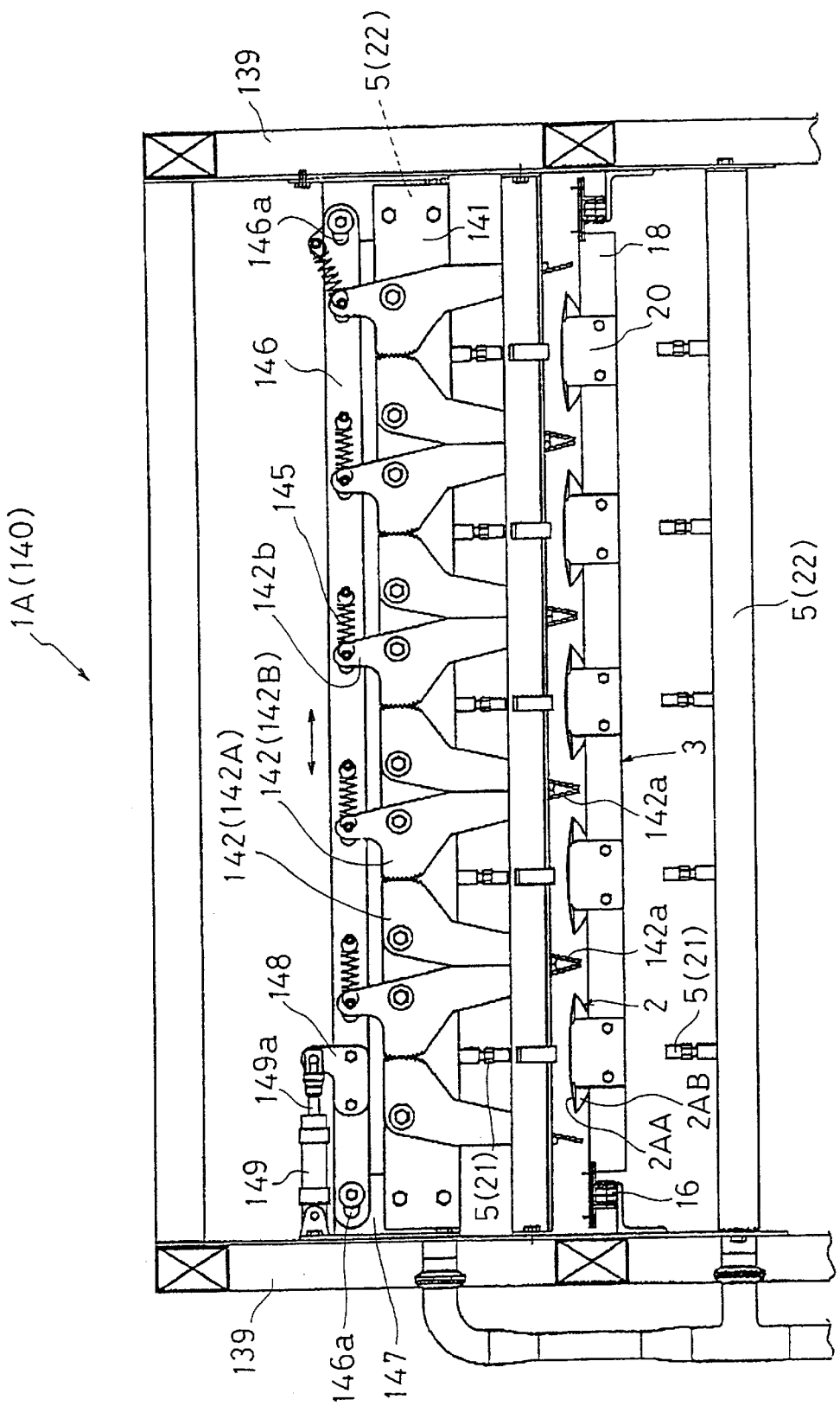
FIG. 25 shows a side view of an essential portion of the starting shell positioning means from FIG. 1 as viewed from the upstream in the shell transporting direction.
Figure 26:
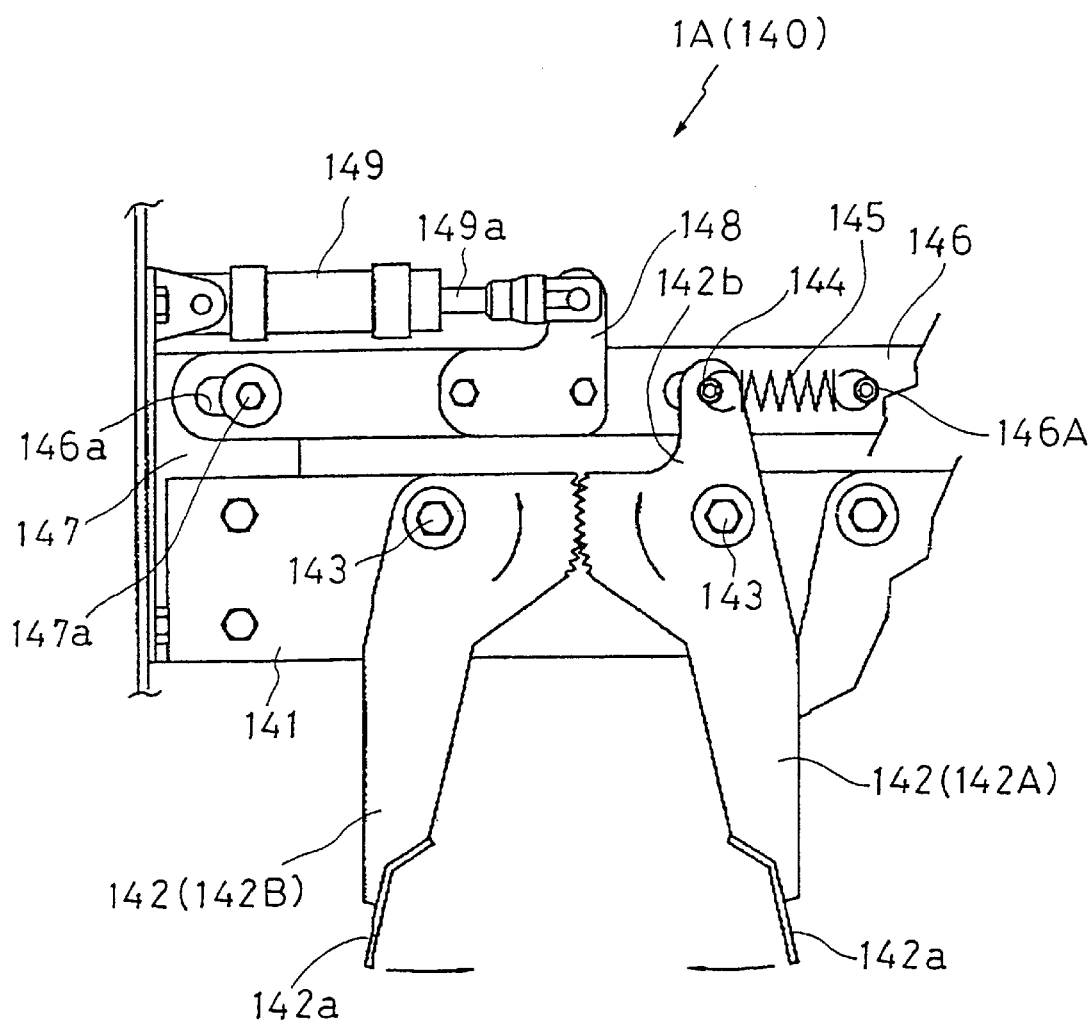
FIG. 26 is a partially enlarged side view taken from FIG. 25.

FIGS. 24 through 26 explain the second embodiment of the raw bivalve peeling-off apparatus of the present invention using the raw bivalve peeling-off method of the present invention.

The raw bivalve peeling-off apparatus 1A of the present embodiment includes a starting-shell positioning means 140 disposed therein for positioning the scallops 2 supported by the transporting/handling means 3 of the above-mentioned raw bivalve peeling-off apparatus 1 in the first embodiment. The other constructions are similar to those in the above-mentioned bivalve peeling-off apparatus 1 in the first embodiment. Only the shell positioning means 140 in the bivalve peeling-off apparatus 1A of the present embodiment will be described, and description of the other constructions will be omitted. Also, similar and corresponding constructions in the above-mentioned embodiment are merely designated by the like reference characters in the drawings and the detailed description thereof will be omitted.

The shell positioning means 140 of the raw bivalve peeling-off apparatus 1A of the present embodiment positions the center of the scallop 2 at a fixed position with respect to the center of the shell fitting bore 19 by allowing the center of the scallops 2 to substantially conform to the center of the shell fitting bore 19, for the porpose of smoothly conducting steps thereafter. Specifically, scallops 2 are fitted into shell fitting bores 19 in the shell loading plates 18 constituting a portion of the transporting/handling means 3 by hand or by a robot in the starting position SP, and are supported from below by the shell loading plates 18 around the outer periphery of the shell fitting bores 19. Particularly the lateral center, perpendicular to the scallop transporting direction, of the scallops 2 fitted in the shell fitting bores 19 are substantially conformed to the center of the shell fitting bores 19 by the shell positioning means 140.

As shown in FIGS. 24 through 26, the shell positioning means 140 of the raw bivalve peeling-off apparatus 1A of the present embodiment has a jointly established shell cleansing means 5 in the above-mentioned raw bivalve peeling-off apparatus 1 in the first embodiment, has a horizontal support plate 141 mounted to the surface of a cleansing liquid supplying pipe 22 positioned on the upper part to comprise of one part of the shell cleansing means 5 composition as shown upstream to the shell transporting direction in FIG. 24. A pair of left/right shell grasping hooks 142 are disposed in the front positioned upstream to the shell transporting direction on the support plate 141 as shown in detail in FIGS. 25 and 26. Each shell grasping hook 142, as shown in detail in FIG. 26, is formed in a substantially bell crank shape and pivots on a suitable rotary shaft 143 established in a desired position on the above-mentioned support plate 141. Each horizontal hook 142 extending parallel to the shell transporting direction is disposed to the lower end of each shell grasping hook 142.

The actual contact parts of one part of the shell grasping hook 142, shown on the right side of FIG. 26, another part shown of the left side of FIG. 26, the drive shell grasping hooks 142A, 142A engage driving opposite each other following the movement of the driving shell grasping hook 142B. The drive arm 142b extending in an upward direction is disposed on the upper part of the drive shell grasping hook 142A, and a pin 144 is established to the front near the vicinity of the upper end of the drive shell grasping hook 142A. One end of a return spring 145 is fastened to the pin 144. Each hook 142a disposed on the lower end of each shell grasping hook 142 in the stand-by state (beginning state) shown in FIGS. 25 and 26 is opened to the widest possible separation through the force of the return spring 145.

The other end of the return spring 145, shown in detail in FIG. 26, is attached to a pin 146A established in a desired position on each substantially horizontal movement plate 146 disposed in parallel opposite the support plate 141 on the upper part of the support plate 141. A long bore 146a positioned in parallel with the longitudinal direction of the movement plate 146 is formed to the opposite ends of the movement plate 146. A mounting member 147 is mounted to a side frame 139 supporting the shell cleansing means 5 disposed on the outer side of the chain conveyor 16, and the support pin 147 disposed on the mounting member 147 is fitted together with the long bore 146a. However, the movement path of the movement plate 146 is restricted by the support pin 147a, and the movement plate 146 is comprised to prevent from falling off of the mounting member 147. The movement plate 148 substantially formed in an L-shape is mounted to the upper part of the upper tip of the support plate 146. The tip of the output shaft 149a of the corresponding movement cylinder 149, mounted to the side frame 139, is mounted to the vicinity near the upper tip of the movement plate 148. i.e., the output shaft 149a of the corresponding movement cylinder 149 is driven in a left/right direction, perpendicular to the shell transporting direction shown by the opposite arrows in FIGS. 25 and 26, of the movement plate 146 to drive the corresponding movement cylinder 149. The movement in a left/right direction of the movement plate 146 transmits to the driving shell grasping hook 142A via the return spring 145, and an opening/closing movement of the shell grasping hook 142 separates/connects the hooks 142a disposed on the tips of each shell grasping hook 142.

The composition of the raw bivalve peeling-off apparatus 1A of the present embodiment, can be as successful as the above-mentioned raw bivalve peeling-off apparatus 1 in the first embodiment.

According to the shell positioning means 140 of the raw bivalve peeling-off apparatus 1A of the present embodiment, the supply process is completed, the scallops 2 positioned in the shell loading plates 18 on the transporting/handling means 3 are driven by the transporting/handling means 3, stop at the established position of the shell cleansing means 5 after moving in the shell transporting direction as shown by the arrow A in FIG. 1, cleansing liquid W is ejected from the front in the direction of the back surface of the scallop shells 2A from the cleansing liquid ejecting nozzle 21 of the shell cleansing means 5, the output shaft 149a of the corresponding movement cylinder 149 advances forward in a rightward direction as in FIG. 26, and rotates the driving shell grasping hook 124A via the return spring 145 in a clockwise direction on the center of the rotary support shaft 143 as in FIG. 26. The rotation of the driving shell grasping hook 124A in a clockwise direction rotates the corresponding shell grasping hook 142B driving on the driving shell grasping hook 124A in a counterclockwise direction on the center of the rotary support shaft 143 as shown in FIG. 26, making it possible for each hook 142a to mutually approach each tip of the shell grasping hooks 142 as shown by the arrow in FIG. 26. In the proximity of each hook 142a disposed on the tip of the shell grasping hook 142, the hooks 142a disposed on the tip of the shell grasping hooks 142 drive in the direction of the rim (for combining the scallop shells 2A) of the scallop shells 2A of the scallops 2 fitted on the shell fitting bores 19 in the shell loading plates 18 from a direction perpendicular to the shell transporting direction, grasp the scallops 2 from a left/right direction perpendicular to the shell transporting direction, fitting the center of the scallops 2 opposite the center of the shell fitting plates 19, and specifically, determines the appropriate position of the scallops 2 substantially conforming to the center of the left/right direction and positioning perpendicular to the shell transporting direction. Thereafter, each process can be smoothly performed. i.e., the positioning of the scallops 2 in a parallel order to the shell transporting direction shown by arrow A in FIG. 1, is carried out by actual contact of the hinge valve 2B of the scallops 2 with the stopper 20 to fit together the scallops 2 in the shell fitting bores 19 in a left/right direction perpendicular to the shell transporting direction shown by arrow A in FIG. 1, and performs the shell positioning means 140 of the present embodiment.

At the time when the hooks 142a of the shell grasping hook 142 grasp the scallops 2, the hooks 142a of the shell grasping hook 142 grasps the rim of the scallops 2 with a force from the return spring 145, making it possible to grasp the scallops 2 with a fixed force, and the appropriate force on the scallops 2 makes is possible to reliably prevent damage the scallop shells 2A of the scallops 2.

According to the present embodiment, the hook 142a of the shell grasping hook 142 of the shell positioning means 140, in the grasping state of the rim of the scallop shells 2a of the scallops 2, performs a cleansing of the back surface of the scallop shells 2A by the shell cleansing means 5, making it possible to reliably prevent the scallop shells 2A from misaligning from the shell fitting bores 19 in the shell loading plates 18 in the cleansing process 171.

The hook 142a of the shell grasping hook 142 of the shell positioning means 140, completing the cleansing of the back surface of the scallop shells 2A by the shell cleansing means 5, retreats the output shaft 149a of the corresponding cylinder 149 in a leftward direction as in FIG. 26, and the hooks 142a disposed on the tips of the shell grasping hooks 142 are separated via the return spring 145. The hooks 142a disposed on the tips of the shell grasping hooks 142 return to the stand-by state and disengaging from grasping the scallops 2. The shell positioning means 140 completes the positioning action by determining the appropriate position of the scallops 2 opposite the center of the shell fitting plates 19, and specifically, determines the appropriate position of the scallops 2 substantially conforming to the center of the left/right direction and positioning perpendicular to the shell transporting direction. Thereafter, each process can be smoothly performed.

The composition of the raw bivalve peeling-off apparatus 1A of the present embodiment, can be as successful as the above-mentioned raw bivalve peeling-off apparatus 1 in the first embodiment.

With the appropriate performance of positioning of the scallops 2 opposite the shell loading plates 18 in the shell positioning means 140 of the raw bivalve peeling-off apparatus 1A, the suction position of the suction pads 25 in the shell forcibly-opening means 7 to the back surface the scallop shells 2A, the actual contact position opposite the back surface of the upper shell 2AA of the separation plate 55 in the shell separation means 8, the position of the ligaments 2a opposite the steam ejection nozzles 23 as a heat nozzles of the before-separation heating means 10 and heating means 6, as well as the position of the ligaments 2a opposite the suction bores 59 of the internal organ separation means 9 and the adductor muscle separation means 11, can appropriately be determined.

It is desirable to independently establish the shell positioning means 140 on the shell cleansing means 5 separately, and have a composition that establishes the shell positioning means 140 at the starting position SP.

Figure 27:
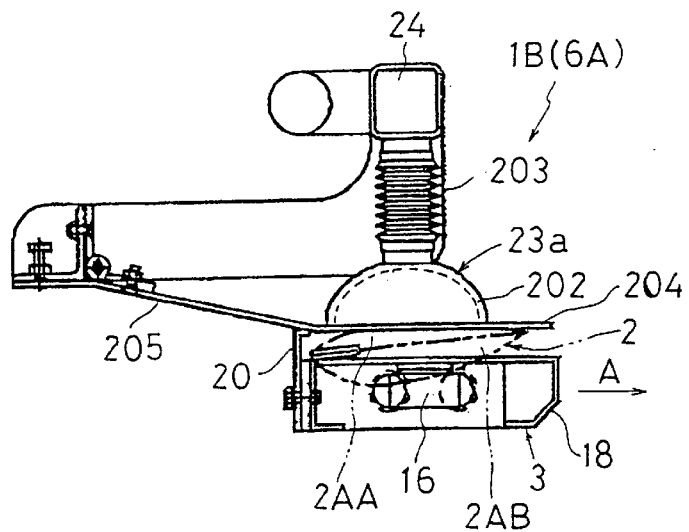
FIG. 27 is a front view of an essential portion of the heating means in a third embodiment of the bivalve peeling-off apparatus of the present invention to which the bivalve peeling-off method of the present invention is applied.
Figure 28:
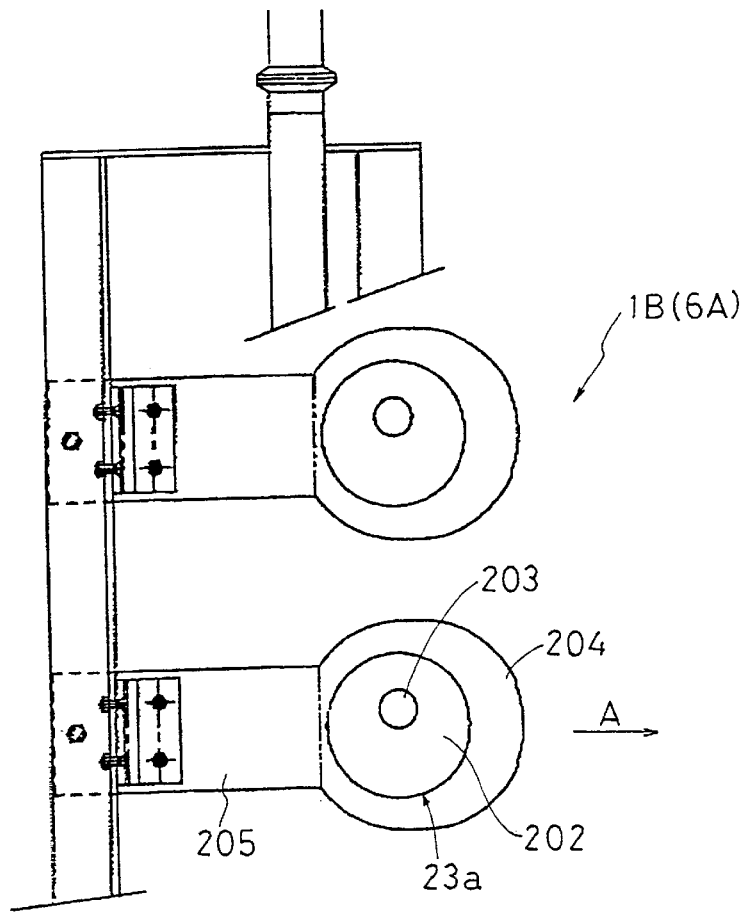
FIG. 28 is a top plan view of a part of the heating means in FIG. 27.
Figure 29:
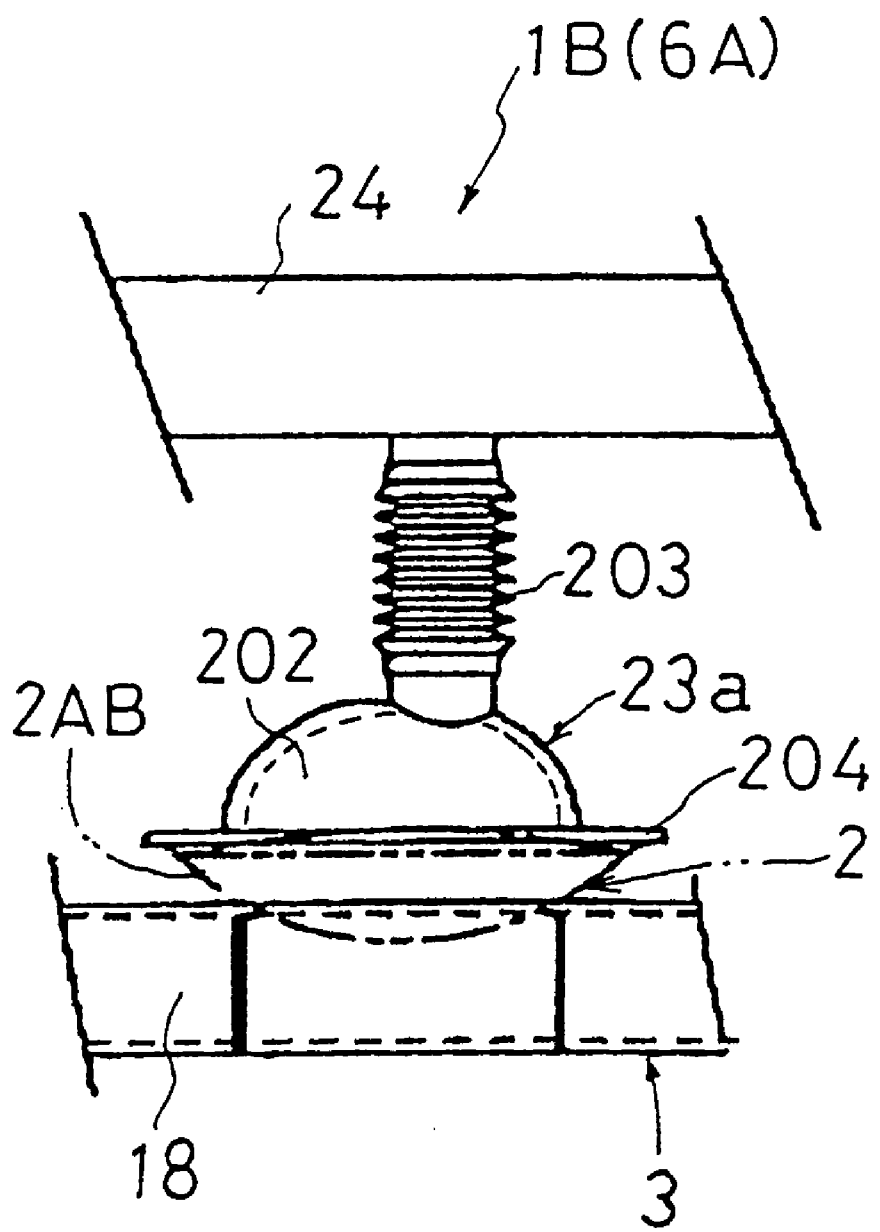
FIG. 29 shows a side view of one part of the shell heating means as seen from the downstream of the shell transporting direction.

FIGS. 27 through 29 explain the third embodiment of the raw bivalve peeling-off apparatus of the present invention using the raw bivalve peeling-off method of the present invention.

The raw bivalve peeling-off apparatus 1B of the present embodiment has a means to improve the heat transmitting efficiency of the back surface of the upper shells 2AA of the heating means 6 of the above-mentioned raw bivalve peeling-off apparatus 1 in the first embodiment. The other compositions are comprised in the same manner as the above-mentioned raw bivalve peeling-off apparatus 1 in the first embodiment. Only the heating means 6A part of the raw bivalve peeling-off apparatus 1B of the present embodiment will be explained, explanations of the other compositions will be omitted. Also, a detailed explanation of similar reference characters in the drawings of similar and corresponding compositions in the above-mentioned embodiment will be omitted.

As shown in FIGS. 27 through 29, the heating means 6A of the raw bivalve peeling-off apparatus 1B of the present embodiment is formed with a cup body 202 on a steam ejection nozzle 23a of a heat nozzle to eject steam H as a heat source in the direction of the back surface of the upper shells 2AA positioned on the upper part of the scallops 2 in the shell loading plates 18. The cup body 202 is formed in a substantially empty bowl shape with the mouth opening downwards to actually contact opposite the back surface of the upper shells 2AA. One end of a supply hose 203 equipped with a elastic and flexible bellows or the like is connected to the substantially neck part on the upper part of the cup body 202 as shown in FIG. 27. The opposite end of the supply hose 203 is connected to a steam supply pipe 24. When the connection position opposite the cup body 202 of the supply hose 203 stops at the established position of the heating means 6A, the shell loading plates 18 are substantially directly above the ligaments 2b.

The size of the mouth opening of the cup body 202 is formed larger than the ligaments 2b and smaller than the size of the upper shells 2AA of the scallops 2 being transported in the shell transporting direction shown by the arrow A in FIGS. 27 and 28 in the shell loading plates 18 on the transporting/handling means 3, i.e., the shell loading plates 18, when stopped at the established position of the heating means 6A, the fitting together part on the back surface of the upper shells 2AA can surround at the least the ligaments 2b.

Each substantially circular flange body 204 is disposed to the outer periphery of the rim of the mouth opening of the cup body 202. The left-side rim of the flange body 204 seen positioned upstream to the shell transporting direction by arrow A in FIGS. 27 and 28 is connected to the right end of the flat supporting plate 205 disposed in parallel with the shell transporting direction. The left end of the supporting plate 205 is mounted to the supporting stay 206 disposed perpendicular to the shell transporting direction and the supporting stay 206 and the supporting plate 205 are connected to the hinge joint 207. i.e., the cup body 202 of the steam ejecting nozzle 23a as a heat nozzle of the heating means 6A of the present embodiment is disposed with a dead weight positioned downwards and bent in a clockwise direction on the center of the hinge joint 207 of the supporting plate 205. The position of the lower surface of the cup body 202 is positioned downwards on the upper end of the stopper 20 mounted on the shell loading plates 18 on the transporting/handling means 3.

The cup body 202 of the heating means 6A actually contacts the back surface downstream of the shell transporting direction of the lower shells 2AA positioned on the opposite side of the hinge joint 2B of the scallops 2 being accompanied to the proximity of the shell loading plates 18 in established position of the heating means 6A. At this point, the back surface of the upper shells 2AA, being accompanied to the proximity of the shell loading plates 18, move in the direction of the lower surface of the cup body 202 while sliding along downstream from the shell transporting direction, and the cup body 202 rises to the back surface of the upper shells 2AA. The shell loading plates 18 arrive at the established position of the heating means 6A, shown in detail in FIGS. 27 through 29. The lower surface of the cup body 202 surrounds at least the ligaments 2b at the part fitting together with the upper shells 2AA, and the connection position opposite the cup body 202 of the supplying hose 203 is positioned substantially directly above the ligaments 2b. The shell loading plates 18 stop at the established position of the heating means 6A, and for a brief time interval a high temperature steam is ejected, for example, comprised to eject 100° C. steam for 4 seconds.

The heating to the back surface of the upper shells 2AA in the heating means 6A is completed, accompanied by a movement of the shell loading plates 18 downstream in the shell transporting direction, the upper end of the stopper 20 successively makes contact with the lower surface of the flange 204 and the supporting plate 205, and since the cup body 202 is pushed upwards, the shell loading plates 18 can easily pass through the heating means 6A.

The composition of the raw bivalve peeling-off apparatus 1B of the present embodiment, can be as successful as the above-mentioned raw bivalve peeling-off apparatus 1 in the first embodiment.

The heating means 6A of the raw bivalve peeling-off apparatus 1B of the present embodiment, when ejecting a high temperature steam H as a heating source to the back surface of the upper shells 2AA, the steam H accumulating on the inner part of the cup body 202, and can improve the heat transfer efficiency to the back surface of the upper shells 2AA.

Figure 30:
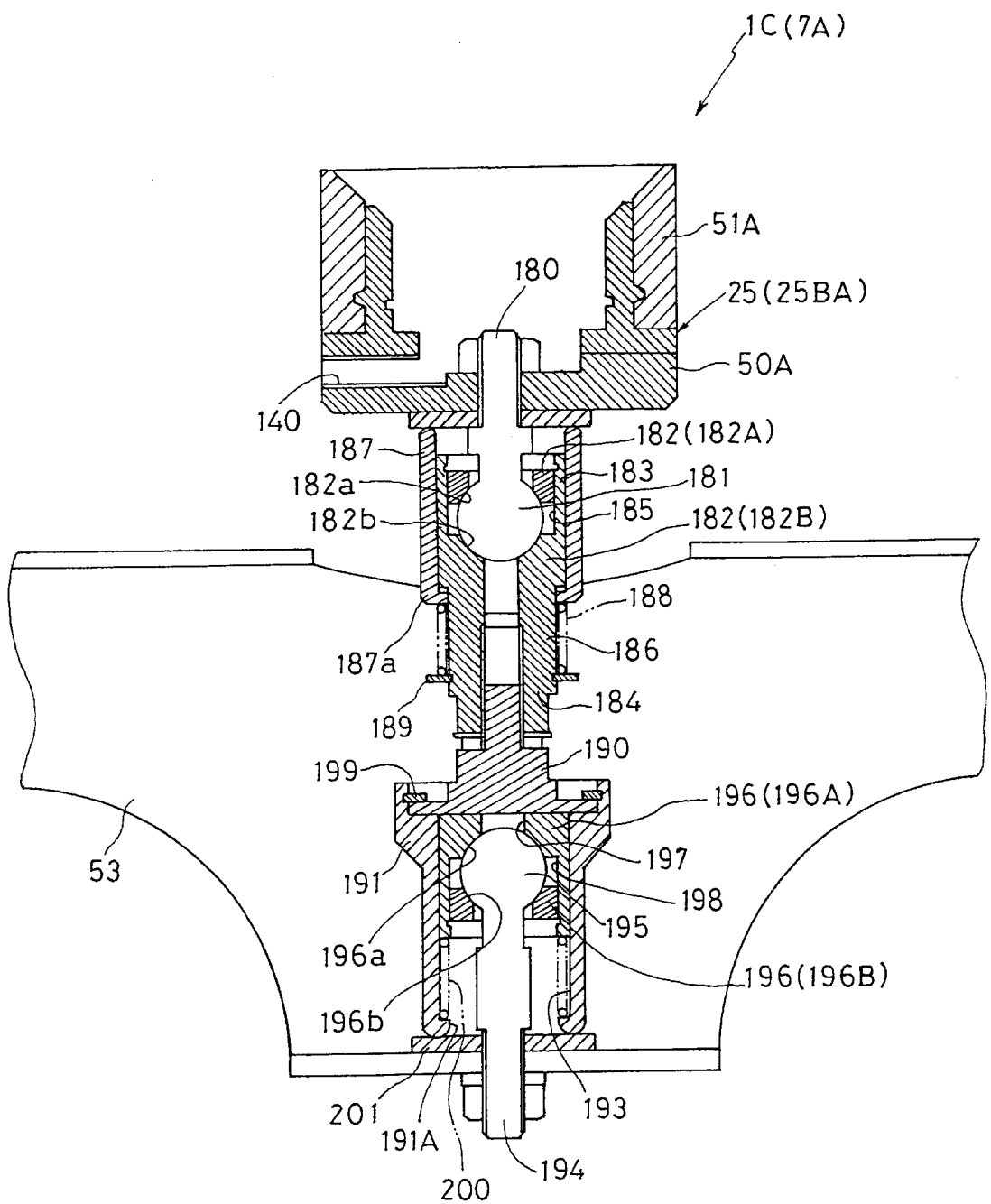
FIG. 30 is a sectional side elevation of a part of the shell forcibly-opening means from in the fourth embodiment of the raw bivalve peeling-off apparatus of the present invention as it is used to separate raw bivalves as seen downstream of the shell transporting direction.

FIG. 30 explains the fourth embodiment of the raw bivalve peeling-off apparatus of the present invention using the shell forcibly-opening means of the present invention in a sectional side elevation diagram shown downstream from the shell transporting direction.

The raw bivalve peeling-off apparatus 1C of the present embodiment has a means to improve the suction ability to the scallop shells 2A, specifically, the suction ability opposite the back surface of the curved lower shells 2AB, of the shell forcibly-opening means 7 of the above-mentioned raw bivalve peeling-off apparatus 1 in the first embodiment. The other compositions are comprised in the same manner as the above-mentioned shell forcibly-opening means 7 of the raw bivalve peeling-off apparatus 1 in the first embodiment. Only the shell forcibly-opening means 7 part of the raw bivalve peeling-off apparatus 1C of the present embodiment will be explained, explanations of the other compositions will be omitted. Also, a detailed explanation of similar reference characters in the drawings of similar and corresponding compositions in the above-mentioned embodiment will be omitted.

As shown in FIG. 30, the lower suction pad 25BA of the suction pad 20 of the shell forcibly opening means 7 of the raw bivalve peeling-off apparatus 1C of the present embodiment, has a base 50A substantially formed in a columnar shape. The pad body 51A, formed substantially in a cylindrical shape with a resin or rubber or the like elastic body, is mounted to the end (upper end) opposite the lower shells 2AB on the base 50A. A bore 140, passing through the inner part of the base 50, is formed on the outer periphery of the base 50, and one end of a hose 30 is connected to the bore 140.

One end of an upper wear bearing body 180 is secured to the lower end of the base 50A. The lower end of the upper wear bearing body 180 is formed with substantially circular shaped circular section 181. The 181 rotatively supports the upper and lower sides of the bearing body 182. The bearing body 182A with one part shown on the upper part of FIG. 30, is formed substantially circular, and the lower end of the sliding member 182a is formed to support the circular section 181 from above. The upper part on the outer diameter of the large diametric part 183 is formed with the bearing body 182B, the lower part of which is shown in FIG. 30, and the lower part is formed with a cylindrically step-like small diametric part 184 on the inner diameter. The inner bore 155 with a diameter larger than the circular sections 181 is formed to the upper end of the bearing body 182B, and the inner bore 186 with an inner diameter smaller than the circular sections 181 is formed to the lower end of the bearing body 182B. The sliding member 182b supporting the circular sections 181 from below is formed to the upper end of the inner diameter of the inner bore 186 of the bearing body 182B, and the bearing body 143A is mounted to the outer diameter of the inner bore 185 of the upper end of the bearing body 182B. i.e., the first universal joint is mounted to the bearing body 182 opposite the upper wear bearing bodies 180, 181.

An upper sleeve 187 is disposed to slide freely on the upper and lower sides of the outer periphery of the outer diameter of the large diametric part 183 of the bearing body 143B. An introverted flange 187a is formed to the lower end of the upper sleeve 187 to restrict the maximum moving position upwards on the upper sleeve 187 opposite the bearing body 182B to the flange 187a. One end of a compression coil spring 188 fitted to the outer periphery of the inner diameter of the small diametric part 184 of the bearing body 182B makes actual contact with the lower end of the flange 187a of the upper sleeve 187, and the other end of the compression coil spring 188 makes actual contact to the stopping hub 189 mounted in the vicinity near the lower end of the outer periphery of the inner diameter of the small diametric part 184 of the bearing body 182B. The upper sleeve 187 is forced in an upward direction continually by the force of the compression coil spring 188, and the upper end of the upper sleeve 187 makes actual contact, by the force of the compress coil spring 188, to the lower end of the base 50A via the plate 189.

One end of the connection member 190 is secured to the lower part of the inner diameter of the small diametric part 186 of the bearing body 182B. The lower end of the connection member 190, with an outer diameter larger than the upper sleeve 187, is mounted to the stopping hub 199 on the outer diameter of the inner bore 192 of the upper part of the lower sleeve 191 positioned downward on the upper sleeve 187. The introverted flange 191a is formed to the lower end of the sleeve 191. One end of the lower wear bearing body 194 is secured to the lower support frame 53, and the opposite end is disposed to the upper part of the inner bore 193 of the lower sleeve 191 to slide freely up and down on one part of the up/down pair of bearing bodies 196 to support free rotation on the formed circular part 195. One part of the bearing body 196A supports the circular sections 195 from above, and being shorter than the lower sleeve 191, the sliding part 196a, supporting the circular section 195 from above, is mounted to the lower end of the inner surface of the inner bore 187 on the upper part of the bearing body 196A. The other circular part of the bearing body 196B, supporting the circular section 195 from below, is mounted in the vicinity near the lower end of the outer diameter of the inner bore 198 on the lower part of the bearing body 196A. The sliding part 196b, supporting the circular section from below, is mounted to the upper part of the bearing body 196B. i.e., the second universal joint is mounted to the bearing body 196 opposite the lower wear bearing bodies 194, 191.

A compression coil spring 200 is fitted to the lower part of the inner periphery of the inner diameter of the inner bore 193 on the lower sleeve 191. The upper end of the compression coil spring 200, shown on the upper part of FIG. 30, makes actual contact with the lower end of one part of the bearing body 196. The lower end of the compression coil spring 200, shown on the lower part of FIG. 30, makes actual contact with the introverted flange 191a formed to the lower end of the lower sleeve 191. The bearing body 196A is forced in an upward direction continually by the force of the compress coil spring 200, and the lower end of the lower sleeve 191 makes actual contact, by the force of the compression coil spring 200, to the lower support frame 53 via the plate 201.

The composition of the raw bivalve peeling-off apparatus 1C of the present embodiment, can be as successful as the above-mentioned raw bivalve peeling-off apparatus 1 in the first embodiment.

According to the shell forcibly-opening means 7A of the raw bivalve peeling-off apparatus 1B of the present embodiment, when suctioning the curved lower shells 2AB with the lower suction pad 25BA, the lower suction pad 25BA can control the posture by automatically following the back surface of the curved lower shells 2AB, and can reliably improve the suction ability of the lower suction pad 25BA opposite the back surface of the curved lower shells 2AB.

Figure 31:
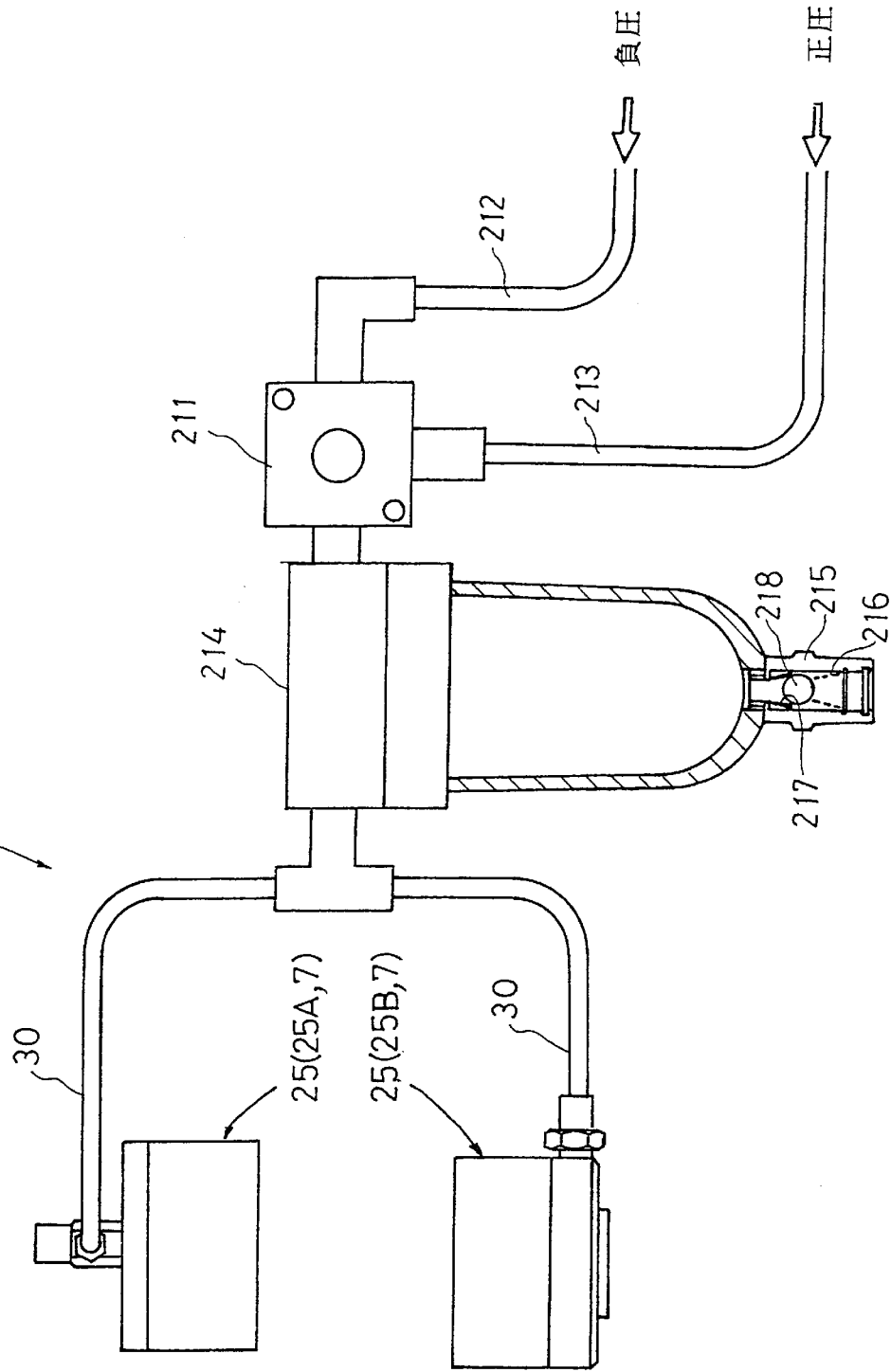
FIG. 31 is a transverse section diagram that shows part of the shell forcibly-opening means from the present embodiment as it is used in the water removal means in the fifth embodiment of the raw bivalve peeling-off apparatus of the present invention as it is used to separate raw bivalves.

FIG. 31 explains the fifth embodiment of the raw bivalve peeling-off apparatus of the present invention of a water removing means using the shell forcibly-opening means of the present embodiment in a transverse sectional diagram.

The raw bivalve peeling-off apparatus 1D of the present embodiment has a means, disposed on the water removing means 210 to discharge the captured cleansing liquid W to the outside, to capture water due to the cleansing liquid W used in the cleansing process 171 that remains on the back surface of the scallop shells 2A through the hose 30 by suctioning the scallop shells 2A on the suction pads 25 in the shell forcibly-opening means 7 of the above-mentioned raw bivalve peeling-off apparatus 1 in the first embodiment. The other compositions are comprised in the same manner as the above-mentioned shell forcibly-opening means 7 of the raw bivalve peeling-off apparatus 1 in the first embodiment. Only the water removing means 210 part of the raw bivalve peeling-off apparatus 1D of the present embodiment will be explained, explanations of the other compositions will be omitted. Also, a detailed explanation of similar reference characters in the drawings of similar and corresponding compositions in the above-mentioned embodiment will be omitted.

As shown in FIG. 31, the raw bivalve peeling-off apparatus 1D of the present embodiment has a water removing means 210 established on the shell forcibly-opening means 7. The water removing means 210 has a switching valve 211 utilized to selectively exchange either negative pressure or positive pressure opposite each suction pad 25 of the shell forcibly-opening means 7. One end of a hose 212, connected to a vacuum pump that is not shown, is connected to the right end of the switching valve 211, and one end of a hose 212, connected to a compressor that is not shown, is connected to the lower end of the switching valve 211. A hose 30, connected to each suction pad 25 via an air filter, is connected to the left end of the switching valve 211. i.e., an air filter 214 possessing a discharge valve 215 to discharge captured cleansing liquid. W to the outside is disposed to capture moisture of the cleansing liquid W from each suction pad 25 opposite the switching valve 211 en route to the hose 30 connecting the switching valve 211 and each suction pad 25, by using positive pressure (pressure from the compressor passing through the switching valve 211) from the compressor to the switching valve 211. The discharge valve 215 has a ball 218 in continuous actual contact opposite a valve washer 217 with a force by a spring 216, and the ball 218 opposite the valve washer 217 can maintain a closed state with negative pressure supplied to the air filter 214 and negative pressure supplied to the each suction pad 25. When positive pressure from the compressor is supplied to the air filter 214, positive pressure moves the ball 218 in the lower part of FIG. 30, that is resisting force from the spring 216, the ball separates from the valve washer 217, and can discharge the captured cleansing liquid W to the outside of the air filter 214.

The composition of the raw bivalve peeling-off apparatus 1D of the present embodiment, can be as successful as the above-mentioned raw bivalve peeling-off apparatus 1 in the first embodiment.

The water removing means 210 of the raw bivalve peeling-off apparatus 1D of the present embodiment, when suctioning the scallop shells 2A on each suction pad 25 of the shell forcibly-opening means 7, can discharge moisture from the cleansing liquid W remaining on the back surface of the scallop shells 2A to the outside before arriving at the vacuum pump.

FIGS. 32 through 40 explain the sixth embodiment of the raw bivalve peeling-off apparatus of the present invention using the raw bivalve peeling-off method of the present invention.

The raw bivalve peeling-off apparatus 1E of the present embodiment has a means to improve the separation efficiency of the internal organs 2b of the internal organ separating means 9 of the above-mentioned raw bivalve peeling-off apparatus 1 in the first embodiment. The other compositions are comprised in the same manner as the above-mentioned raw bivalve peeling-off apparatus 1 in the first embodiment. Only the internal organ separating means 9 part of the raw bivalve peeling-off apparatus 1E of the present embodiment will be explained, explanations of the other compositions will be omitted. Also, a detailed explanation of similar reference characters in the drawings of similar and corresponding compositions in the above-mentioned embodiment will be omitted.

Figure 32:
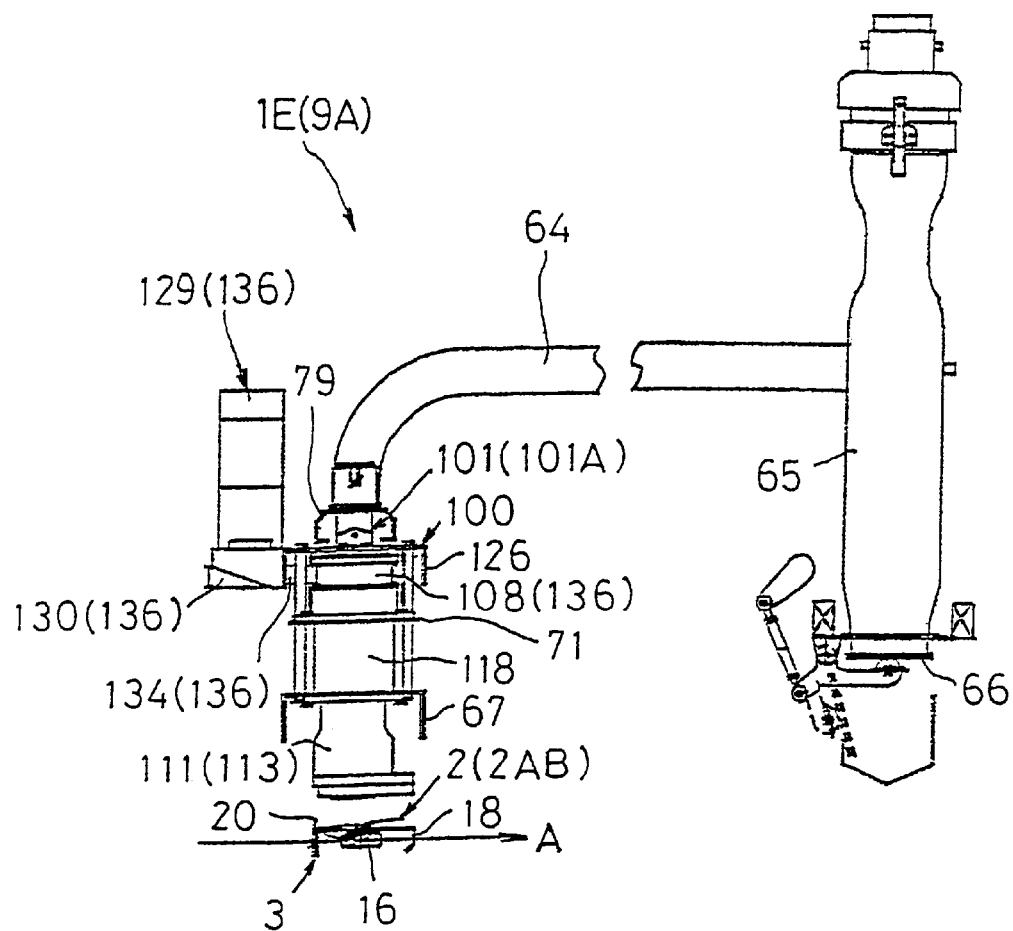
FIG. 32 is a front elevation of a part of the stand-by state of the internal organ separating means for removing the non-edible parts form in the embodiment of the raw bivalve peeling-off apparatus of the present invention as it is used to separate raw bivalves.
Figure 33:
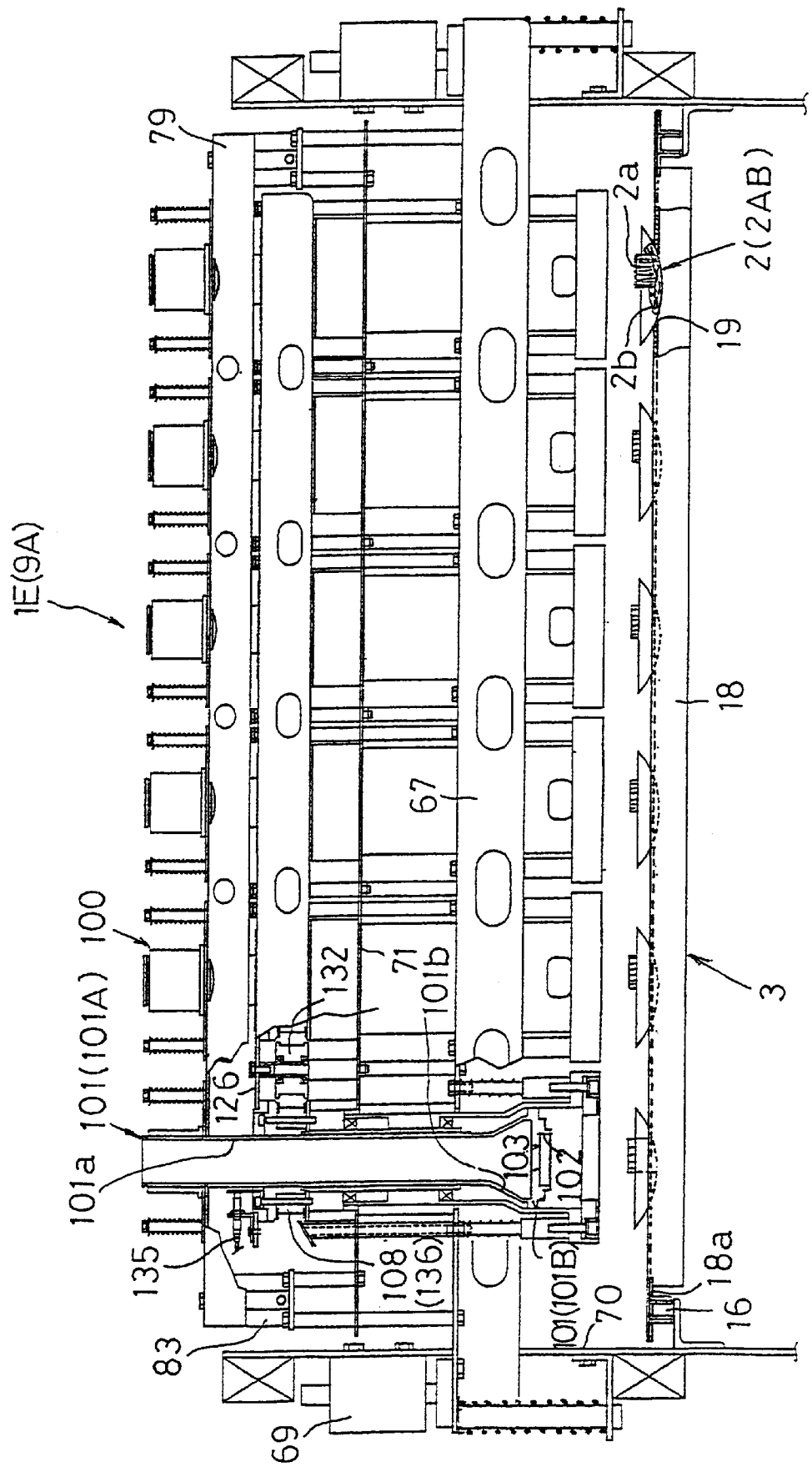
FIG. 33 is a side view of a part of the internal organ separation means in FIG. 32 as seen downstream of the shell transporting direction.

As shown in FIG. 32, the internal organ separating means 9 of the raw bivalve peeling-off apparatus 1E of the present embodiment has a separation body 100 to separate the non-edible internal organs 2b away from the ligaments 2a from the lower shells 2AB. The separation body 100, mounted to the lower shells 2AB of the scallops 2, has a suction member 101 to separate (remove by suction), in detail, the adductor appendages and strings and the like internal organs 2b in actual contact circularly around the outer periphery of the ligaments 2a, by suctioning with negative pressure. The suction member 101, as shown in FIG. 33, possess six suction nozzles 100A disposed opposite the inner surface of the lower shells 2AB of the scallops 2, and a suction plate 101B, the lower part of which is shown in FIG. 33, fitted to the tips of each suction nozzle 101A. Each suction nozzle 101A, shown in detail in FIGS. 34 and 35, possess a base 101a formed substantially cylindrical, and a bell-shaped member 101b that is wider at the bottom fixed to the lower end of the base 101a, and suction plate 101B is fitted to the bell-shaped member 101b. The suction nozzles 101A and suction plate 102B comprising the suction member 101 in the present embodiment, after being formed individually, are integrated to fit together.

As shown in FIG. 36, the outer periphery of suction plate 101B is formed with three-tiered small diameter facing downward. A cavity 102 with an inner diameter of the circular plane larger than the outer diameter of the ligaments 2a of the scallops 2, and extending to half the depth of the plate, is formed to the tip of the suction plate 101B opposite the lower shells 2AB. The cavity 102 can fit around the ligaments 2a. A passage hole shaped in a substantially elliptical plane with a depth about half of the plate, is formed on the upper surface of the suction plate 101B and positioned towards the outer periphery of the ligaments 2a. One end of the axis of the bottom wall of the passage hole 103 lies on the bottom wall on the outer periphery of the cavity 102. This position, passing through to the inner part of the suction nozzle 101A and the cavity 102 of the suction plate 101B, makes a suction bore 104 to suction the internal organs 2b to the inner part of the suction nozzle 101A. The suction bore 104 is formed at a position outside the outer periphery of the ligaments 2a.

The size of the inner diameter of the cavity 102 can utilize a size corresponding to large or small sizes of the scallops 2 (ligaments 2a) as selected by the shell selecting machine (not shown).

Figure 34:
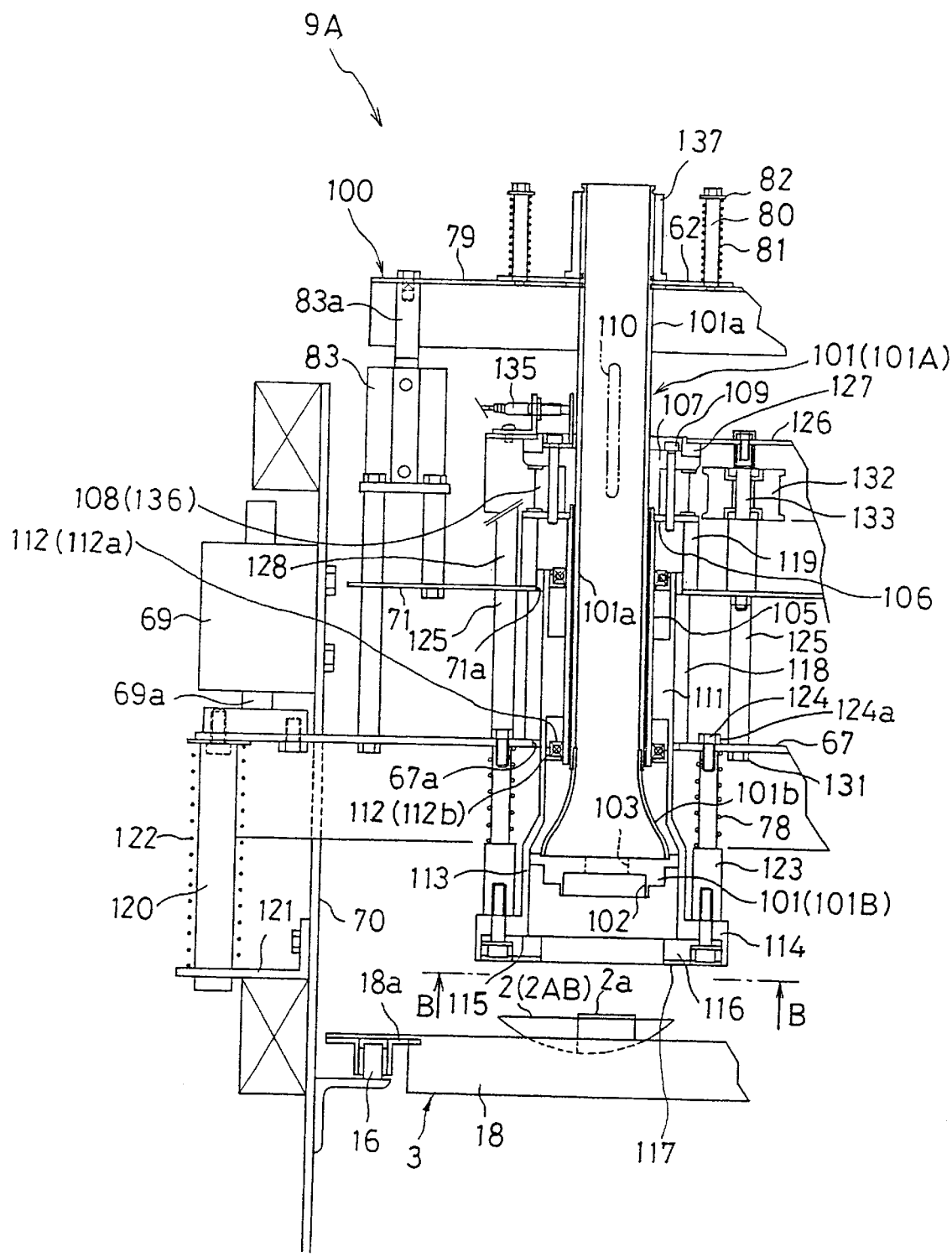
FIG. 34 is a side view of a part of the internal organ separation means in FIG. 33.
Figure 35:
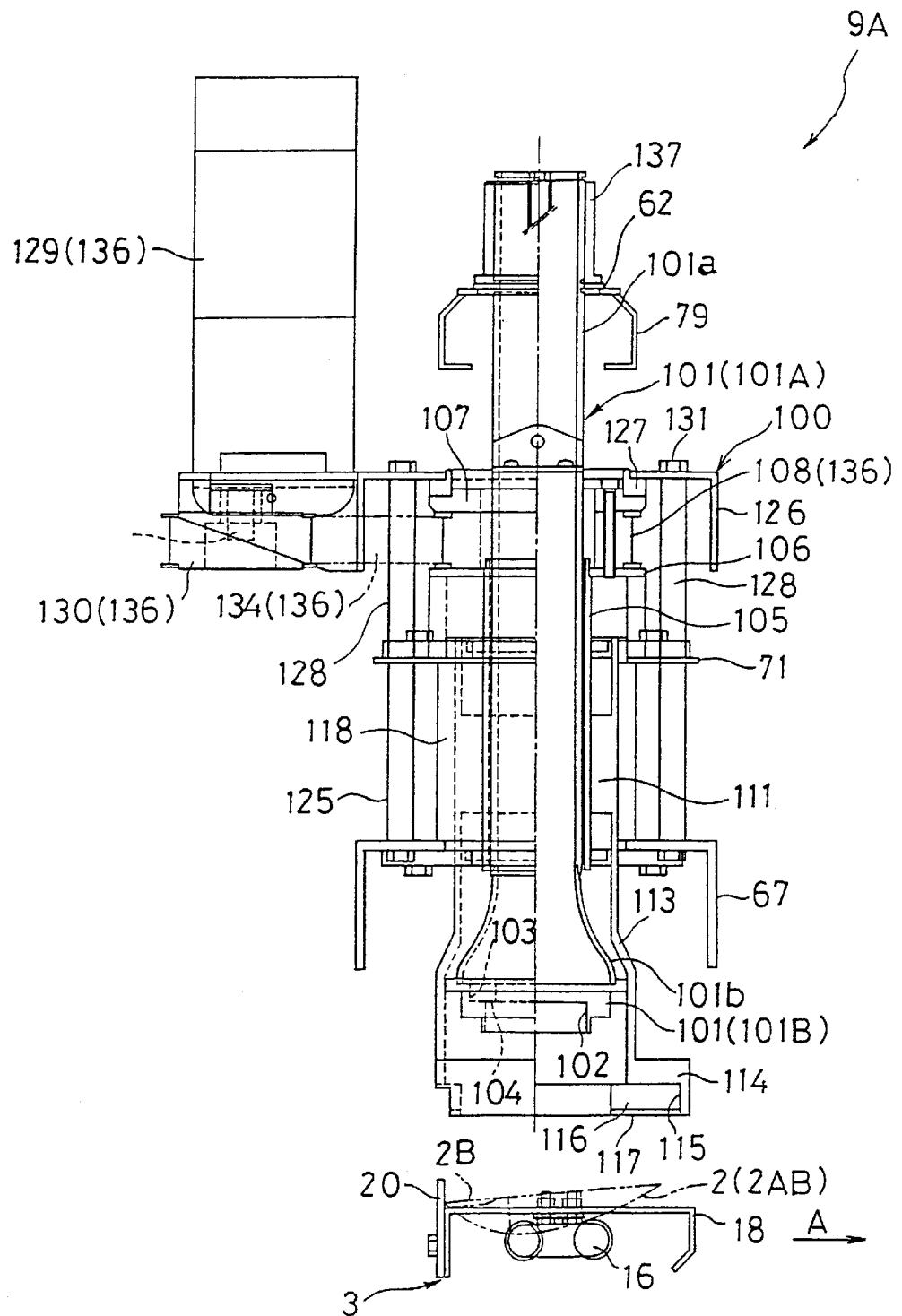
FIG. 35 is an expanded rear elevation of a part of the internal organ separation means in FIG. 32.

Reverting to FIGS. 34 and 35, a sleeve 105 to support the sliding function upwards and downwards of the suction nozzle 101A, is disposed on the outer periphery leading to the vicinity of the tips on the lower end from the substantially central portion of the base 101a of the suction nozzle 101A. A circular flange 106 is fitted to the vicinity near the upper end on the outer periphery of the sleeve 105. A tube-shaped pulley mounting member 107 formed in a sectional L-shape, is disposed to the upper part of the sleeve 105, and a pulley 108 is disposed on the inner diametric part of the outer periphery of the pulley mounting member 107. The flange 106, pulley 108 and pulley mounting member 107 established in the vicinity near the upper end of the outer periphery of the sleeve 105, are united by a plurality of bolts 109 disposed and penetrating through each. A key ditch (not shown) is formed on the outer periphery of the pulley mounting member 107. The rotary power of the pulley 108 can be transmitted to the suction nozzles 101A by the sliding key 110 disposed in parallel with the shaft on the outer periphery of the base 101a of the suction nozzles 101A shown by the imaginary line in FIG. 34, and the suction nozzles 101A opposite the sleeve 105 and pulley mounting member 107 is comprised with a movement ability reciprocally in an upwards and downwards direction.

Figure 37:
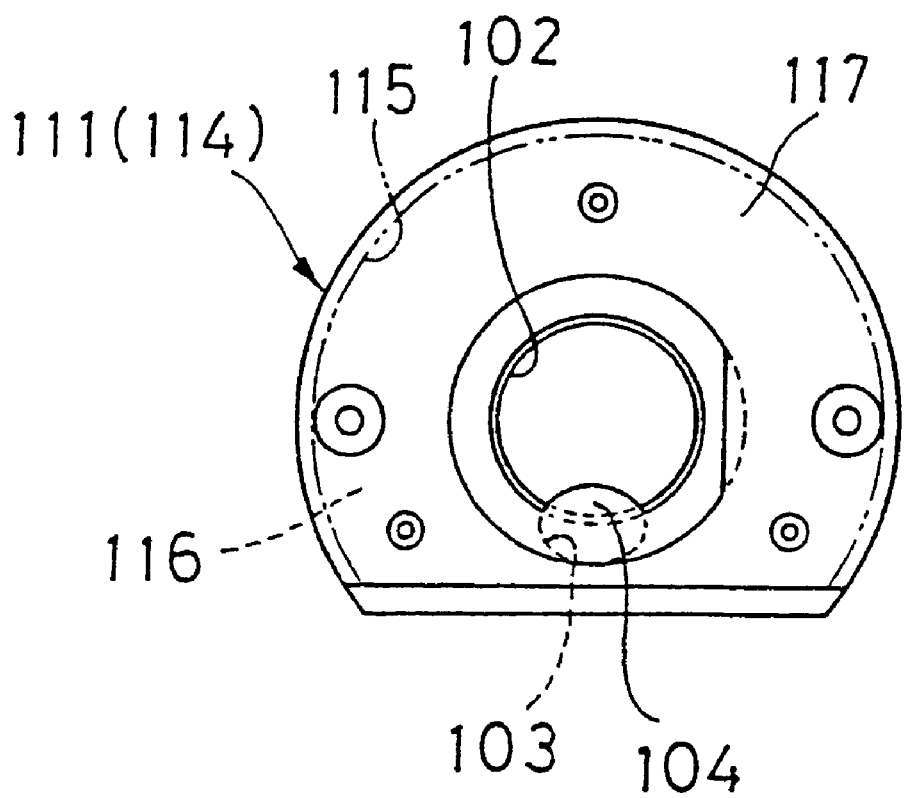
FIG. 37 is a close up view along the B—B line in FIG. 34.

As shown in FIGS. 34 and 35, a inner casing 111, for example made with a resin, is mounted via an upwards/downwards pair bearing 112 to the outer periphery of the sleeve 105. The bearing 112 is comprised from a ball bearing 112a disposed on the outer periphery of the sleeve 105 and a substantially sectional L-shaped sliding bearing 112*b* disposed between the inner periphery of the inner casing 111 and the outer periphery of the ball bearing 112*a*. A pressing guide 113, extending widening downwards and surrounding the circumference of the suction plate 101B comprised of suction members 101, is mounted to the lower part of the inner casing 111. A shell suppresser mounting member 114, extending towards the out diametrical side, is established on the tip (lower end) of the pressing guide 113. The tip of the shell suppressor mounting member 114, in order to prevent interference with the stopper 20 of the transporting/handling means 3 when separating the internal organs, is mounted in a substantially same planar D-shape as the scallops 2, and a mounting cavity member 115, with a substantially planar D-shape, is mounted to the tip. A shell suppresser link 116, formed with a substantially planar D-shape on the outer periphery that is in actual contact with the lower shells 2AB, is fitted to the mounting member cavity 115. A thin horizontal damage prevention plate 117, for example made from metal, is mounted to the actual contact surface of the rim of the lower shells 2AB opposite the lower shells 2AB of the shell suppresser link 116, as shown in FIG. 37, in order to prevent damage by decreasing friction on the shell suppresser link 116.

An outer casing 118, formed with a longitudinal cylindrical shape and a smaller diameter on both ends on the outer periphery in the shaft position in order to support the sliding movement upwards and downwards of the inner casing 111, is disposed on the upper end of the outer periphery of the inner casing 111. The long part formed on the lower end of the outer casing 118, supported from below with a fitted together penetrating bore 67*a* to penetrate thickness-wise the plate formed to the lower frame 67, fits together the penetrating bore 71*a*, penetrating thickness-wise the plate formed to the middle frame extending in parallel with the lower frame 67, to the upper part of the lower frame 67. The outer casing 118 supports limited wear on the middle frame 71 disposed on the upper part and the lower frame 67 disposed downward to position the tip of the suction nozzle 101A comprised of the suction mounting members 101. A lower pulley receptor 119 is disposed on the step formed on the upper end of the outer casing 118. The lower end of the lower pulley receptor 119 is in actual contact with the upper surface of the middle frame 71, and the upper end of the lower pulley receptor 119 is in actual contact in the vicinity of the outer periphery of the lower surface of the adhered flange 106 in the vicinity of the upper end of the sleeve 105.

The tips of the output shaft 69*a* of the lower frame driving cylinder 69 (reciprocating motion cylinder)is mounted to the opposite ends of the lower frame 67, as shown in FIGS. 33 and 34, in order to have sliding ability in an upwards and downwards direction on the lower frame 67. The lower frame driving cylinder 69 is mounted in a downwards direction on the output shaft 69*a* on the outer side of the side frame 70 disposed on the outer side of the chain conveyor 16. A pipe body 120, for restricting the movement path when moving the lower frame 67 in an upwards and downwards direction, is mounted to the lower end of the opposite ends of the lower frame 67. The lower end of the pipe body 120 is disposed to penetrate, in a plate thickness-wise direction, a sectional L-shaped pipe guide 121 mounted to the side frame 70. A compression coil spring 122, fitted to the outer periphery of the pipe guide 121 and lower frame 28 of the pipe body 120, buffers a sudden movement of the lower frame 67 to the lower frame driving cylinder 69 by a force on the compression coil spring 122, and can smoothly move in an upwards and downwards direction on the lower frame 67.

A rod body 123 with a stepped inner diametric upper part is disposed in parallel to the opposite sides of each shell suppressor mounting member 114 between the lower frame 67 and the shell suppresser mounting member 114 formed on the lower part of the inner casing 111. The small diametric part of the rod body 123 is disposed with a moving joint opposite the lower frame 67 to penetrate the lower frame 67 from below in a plate thickness-wise direction, and a compression coil spring 78 is fitted to the outer periphery of the small diametric part of the rod body 123. The upper end of the compression coil spring 78 fitted to the small diametric part of the rod body 123 is in actual contact with the lower surface of the lower frame 67, and the lower end of the compression coil spring 78 is in actual contact of the step part of the small and large diametric parts.

The compression coil spring 78 fitted to the small diametric part of the rod body 123, to force the inner casing 111 continually in a downwards direction on the lower frame 67, forces the inner casing 111 continually in a downwards direction on the lower frame 67 on the disposed shell suppressor ring 116, and the shell suppresser ring 116 can be put into actual contact with the rim of the lower shells 2AB by the force of the compression coil spring 78.

The middle frame 71 the upper part of the lower frame 67 to the plurality of cylindrically shaped support pipes 25 disposed in parallel to the outer circumference of each outer casing 118. A motor mounting plate 126, formed in an upside down U-shape, is disposed to the upper part of the middle frame 71, as shown in FIG. 35, and a circular upper pulley receptor 127 is disposed between the motor mounting plate 126 and the upper part of the pulley mounting member 107. i.e., according to the present embodiment, the positioning of the upwards and downwards direction of the sleeve 105 and the pulley 108 is applied to the lower pulley receptor 119 and the upper pulley receptor 127. It is desirable to have the lower pulley receptor 119 and the upper pulley receptor 127 but they are not essential.

The motor mounting plate 126 is supported on the upper part of the middle frame 71 to the circular support pipe 128 on the circumference of each pulley 108. The output shaft 129*a* of the pulley drive motor 129, for rotatively driving the pulley 108, is disposed downward on the motor mounting plate 126, as shown in detail in FIG. 35. A driving pulley 130 is mounted to the output shaft 129*a* of the pulley drive motor 129. As shown in FIGS. 34 and 35, the support pipe 125, supporting the upper part of the lower frame 67 to the middle frame 71, and the support pipe 128, to support the upper part of the middle frame 71 to the motor suction plate 126, are mounted jointly on the same shaft by a bolt 131 penetrating the lower frame 67, middle frame 71, and motor mounting plate 126. A freely rotating tensioner 132 is disposed, as shown in FIG. 34, between each suction nozzle 101A. The tensioner 132 is mounted with a rotary joint to the support rod 133 supported at opposite ends to the middle frame 71 and motor mounting plate 126. A circular belt 134 (with only one part shown in FIG. 35) rolls around to contact the outer periphery of each pulley 108 mounted to the outer periphery of each suction nozzle 101A and driving pulley 130 mounted to the output shaft 129*a* of the pulley driving motor 129. Each tensioner 132 disposed between each suction nozzle 101A can contact with the outer periphery of the belt 134. i.e., according to the present embodiment, six suction nozzles 101A can rotate at the same time by one pulley driving motor 129.

A sensor 135 for detection of the rotating position and rotating amount of each suction nozzle 101A is disposed on the upper end of the motor mounting plate 126.

A rotary driving means 136 of the present embodiment is comprised of a driving pulley 130 and a belt 134.

The output shaft 83a of the upper frame driving cylinder 83 rises and falls simply to drive the upper frame driving cylinder 83. The rising and falling action of the upper frame 79 is transmitted to each suction nozzle 101A comprised of suction members 101 via a plate 62. i.e., only the suction member 101 can simply contact and separate opposite from the inner surface of the lower shells 2AB.

As shown in FIGS. 34 and 35, a substantially circularly-shaped collar 137 is mounted with a stop ring, that is not shown, to the upper back end on the outer periphery of the suction nozzle 101A. The collar 137 relatively rotates opposite the suction nozzles 101A, and the lower end surface can actually contact the upper surface of the plate 62. One end of an internal organ transporting hose 64 is connected to the outer periphery of the collar 137, as shown in FIG. 32. The collar 137, when rotating the suction nozzles 101A, suctions the rotation of the suction nozzles 101A, and rotation of the suction nozzles 101A can twist the internal organ transporting hose 64 when it arrives at the internal organ transporting hose 64.

It is desirable for the supply of negative pressure to the internal organ transporting hose 64 to be comprised to supply negative pressure continuously when driving the apparatus.

In the present embodiment, the suction members 101 are comprised to rotate by the rotary driving means 136, and the suction member 101 and lower shells 2AB mutually rotate, for example, it is desirable for the composition to rotate a fixed lower shell 2AB on the suction member 101, however, the composition in the present embodiment is not limited.

Now, the utilization of the internal organ suction means 9 of the present embodiment from the above-mentioned composition will be further explained.

The scallops 2 (containing small hinge lingament 2a and internal organs 2b and the like), separated from the upper shells 2AA at the shell separation means 8, riding in the shell loading plates 18, are transported in the shell transporting direction by the transporting/handling means 3 shown by arrow A in FIG. 1 and stop at the established position of the internal organ separation means 9 of the present embodiment. The non-edible part removing process 175 is performed during the period of being stopped.

According to the non-edible part removing process 175A of the internal organ suction means 9 of the present embodiment, the shell loading plates 18 stop at the separation body 100 in the stand-by state of the internal organ separation means 9, i.e., at a position opposite the cavity 102 of the suction plate 101B of the suction member 101 that is opposite the ligaments 2a attached to the inner surface of the lower shells 2AB. The separation body 100 in the stand-by state, as shown in FIG. 34, positions the output shaft 69a of the lower frame driving cylinder 69 in the advanced forward retreating end (upper part), and the separation body 100 is positioned on the upper end, the most separated from the shell loading plates 18, on the output shaft 69a of the lower frame driving cylinder 69. The output shaft 69a of the lower frame driving cylinder 69 positions on the advanced forward (extended) advanced forward end (upper part). The tip of the suction member 101, i.e., the suction member 101B at the separation state of the upper surface of the shell suppresser ring 116 is positioned at the most raised end separated from the shell loading plates 18 by the output shaft 83a of the upper frame driving cylinder 83.

Figure 67:
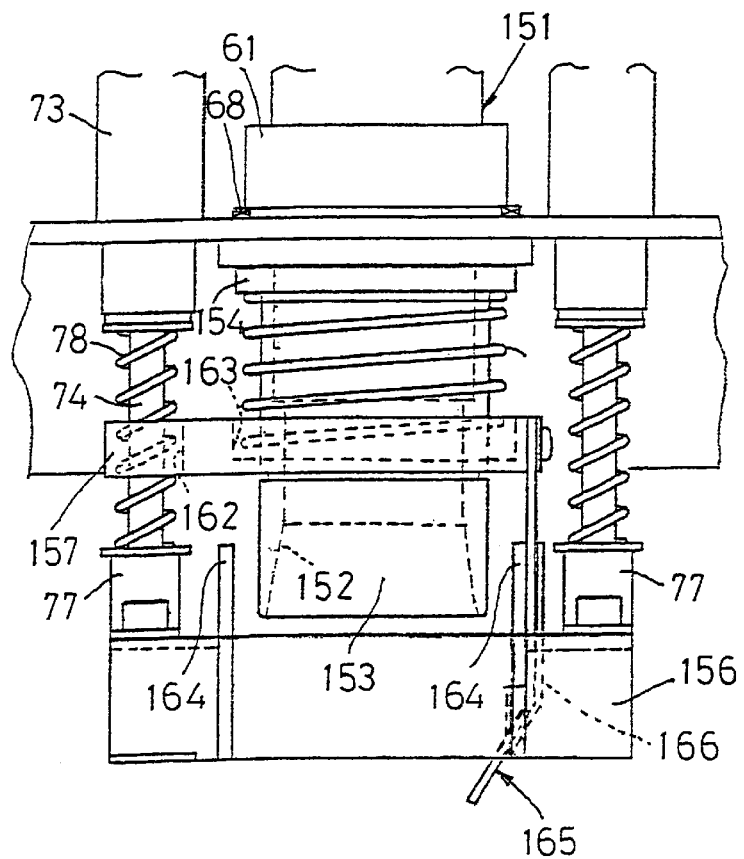
FIG. 67 is an expanded side view of the near side of the separator plate in FIG. 62.

The shell loading plates 18 stop at the established position of the internal organ separation means 9, the lower frame driving cylinder 69 drives at a fixed timing, the output shaft 69a of the lower frame driving cylinder 69 extends and advances forward and falls in a downward direction on the lower frame 67 as shown in FIG. 67. The lower frame 67 is lowered on the entire body of the separation body 100.

The shell suppresser ring 116 (in detail, the damage prevention plate mounted to the shell suppresser ring 116) actually contacts the rim of the lower shells 2AB before the advanced forward end of the output shaft 69a of the lower frame driving cylinder 69, i.e., the separation body 100 arrives at the falling end. The falling shell suppresser ring 116 and inner lining 111 stops the shell suppresser ring 116 at the actual contact position of the rim of the lower shells 2AB.

The shell suppresser ring 116 suppresses the rim of the lower shells 2AB by a force of the compression coil spring 78 fitted on the outer periphery of the inner diametric part of the rod 123, and the advanced forward end of the output shaft 69a of the lower frame driving cylinder 69, i.e., the separation body 100 arrives at the falling end. The result is the lower shells 2AB are squeezed by the force of the compression coil spring 78 and fixed between shell suppresser ring 116 and the shell loading plates 18. Since the shell suppresser ring 116 is in actual contact with the lower shells 2AB by a force of a compression coil spring 78 in exchange for excessive force on the lower shells 2AB, it can reliably prevent damage to the lower shells 2AB.

The lower frame driving cylinder 69 of the present embodiment contacts and separates the separation body 100 opposite the lower shells 2AB, and has a composition to fix the lower shells 2AB between the shell loading plates 18 and the shell suppresser ring 116 when the output shaft 69a of the lower frame driving cylinder 69 arrives at the advanced forward tip.

The output shaft 69a of the lower frame driving cylinder 69 arrives at the advanced forward tip, and, by a sensor not shown, the arrival of the output shaft 69a of the lower frame driving cylinder 69 arrives at the advanced forward tip is detected. Based on the detection signal, the upper frame driving cylinder 83 drives, the output shaft 83a of the upper frame driving cylinder 83 contracts and retreats, and falls in a downward direction on the upper frame as shown in FIG. 35. The falling of the upper frame 79 lowers the plate 62 via the suction member 101.

Figure 38:
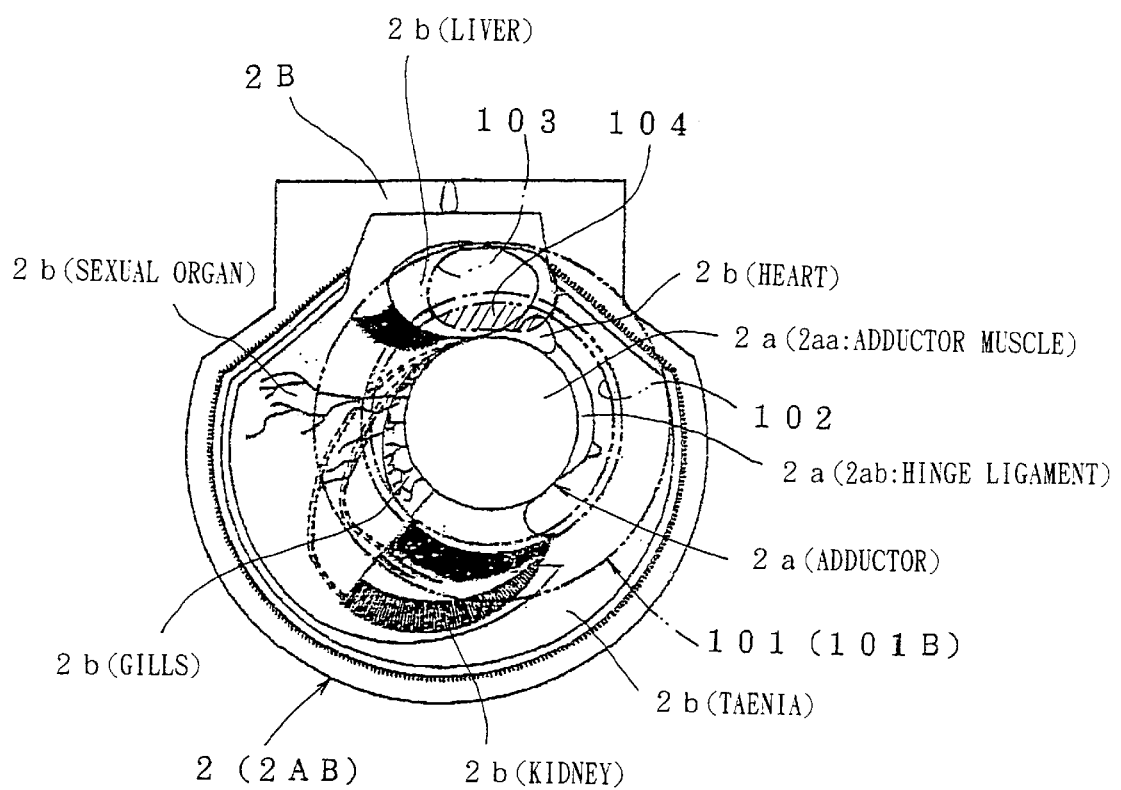
FIG. 38 is an explanatory view that shows the ligaments positioned in the lower shell of the scallop and the suction plate of the internal organ separation means in FIG. 32 and the position relationship with the internal organs.
Figure 39:
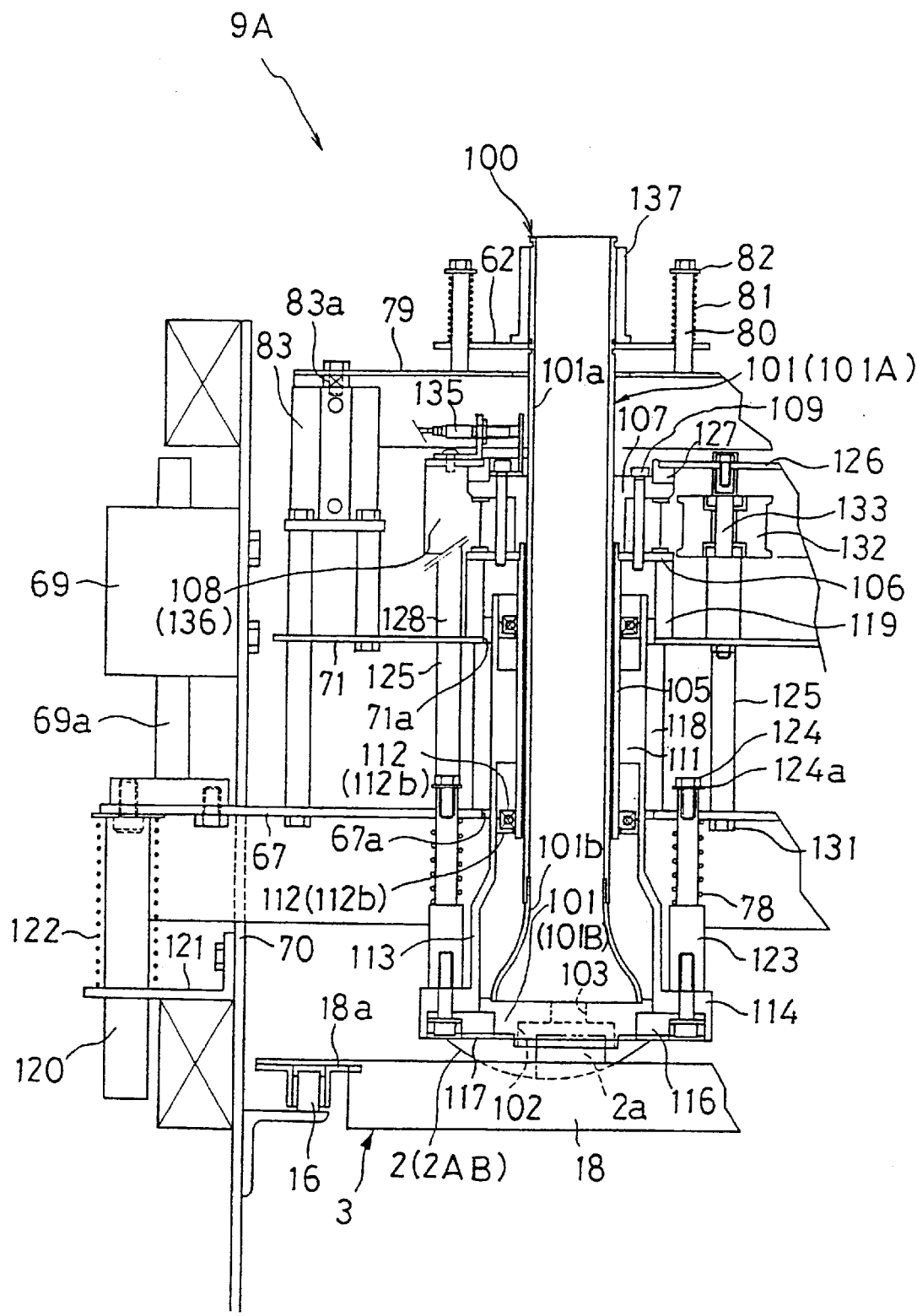
FIG. 39 shows in the same way as FIG. 34, a part of the separated state of the internal organ separation means in FIG. 32.
Figure 40:
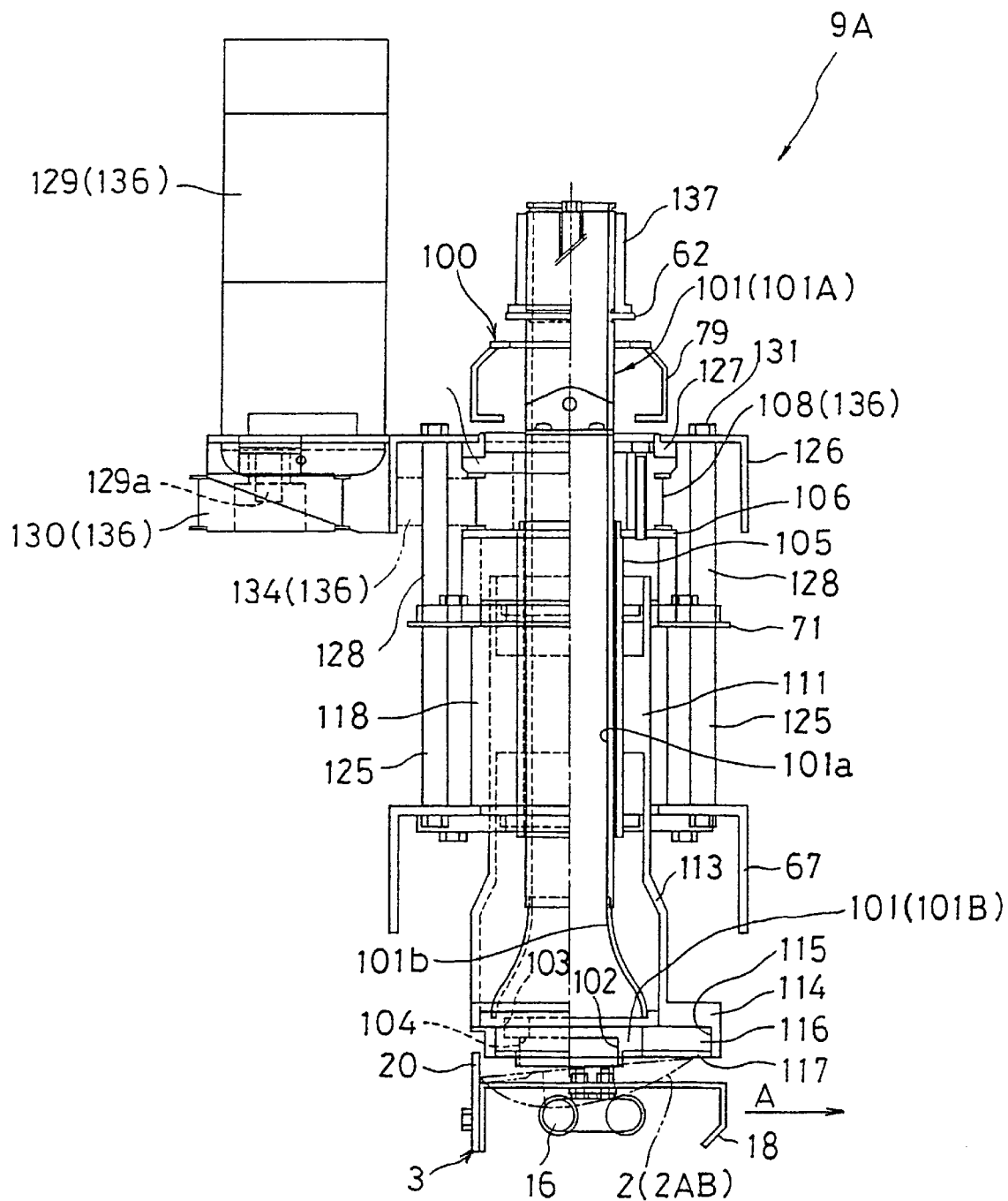
FIG. 40 shows in the same way as FIG. 35, a part of the separated state of the internal organ separation means in FIG. 32.

Before the advanced forward end of the output shaft 83a of the lower frame driving cylinder 83, i.e., the upper frame 79 arrives at the falling end, and after entering the inner periphery of the shell suppresser ring 116 with a middle diametric surface on the outer periphery of the suction plate 101B disposed on the tip of the suction member 101, the upper frame 79 actually contacts the upper surface of the inner periphery side of the shell suppresser ring 116 with stepped parts on the large diametric surface and middle diametric surface on the outer periphery of the suction plate 101B. At the position of actual contact with the shell suppresser ring 116, the separation of the upper frame 79 and the plate 62 commences, and stops the lowering down of the suction nozzle 101A of the suction member 101. The cavity 102 of the suction plate 101B of the suction member 101 fits over the ligaments 2a, i.e., the cavity 102 surrounds by covering and not contacting the ligaments 2a. At this time it is desirable to efficiently separate the abdominal appendage of the internal organs 2b from the suction bore 104 of the suction plate 101B opposite the internal organs 2b, i.e., since other parts are attached to the abdominal appendage in the internal organs 2b, first separate the abdominal appendage from the ligaments 2a, then it is possible to separate the complete internal organs 2b. The position relationship of the suction plate 101B opposite the ligaments 2a and the internal organs 2b positioned in the inner surface of the lower shells 2AB is shown in FIG. 38.

The advanced forward end of the output shaft 83a of the upper frame driving cylinder 83 arrives at the lowered end of the upper frame 79, the upper frame 79 and plate 62 separates, and the suction plate 101B, comprising the suction member 101, actually contacts the shell suppresser ring 116 by the force from a compression coil spring 81 fitted to the outer periphery of the supporting pin 80. During this time, the suction plate 101B is in actual contact with the shell suppresser ring 116 by the force from a compression coil spring 81, and when rotating the suction member 101, in exchange for excessive force on the actual contact surface of the tip of the suction plate 101B and the upper surface of the shell suppresser ring 116, and the opposite pulley drive motor 129 can reliably prevent an increase in load and friction or heat generation on the actual contact surface.

The upper frame driving cylinder 83 has a composition that contacts and separates the suction member 101 opposite the inner surface of the lower shells 2AB, when the output shaft 83a of the upper frame driving cylinder 83 arrives at the advanced forward end the cavity 102 of the suction plate 101B opposite the ligaments 2a to surround the upper part of the ligaments 2a and the internal organs 2b.

It is desirable to establish a common sliding member to the actual contact surface of the suction plate 101B and the upper part of the shell suppressor ring 116.

The advanced forward end of the output shaft 83a of the lower frame driving cylinder 83 arrives, and by a sensor not shown, the arrived advanced forward end of the output shaft 83a of the lower frame driving cylinder 83 makes a detection, and based on the detection signal, the pulley drive motor 129 of the rotation drive means 136 drives, the suction member 101 commences rotating, and negative pressure is supplied to the inner part of the suction nozzle 101A via the internal organ transporting hose 64. The suction plate 101B rotates around the center of the ligaments 2a, the suction bore 104 of the suction plate 101B rotates along the circumference of the ligaments 2a on the outer side of the circumference of the ligaments 2a attached to the lower shells 2AB, yielding suction power downward on the suction bore 104 in a direction parallel to the axis of the ligaments 2a, and air surrounding the ligaments 2a positioned in the lower part of the suction bore 104 is suctioned to the inner part of the suction nozzle 101A moving in parallel with the axis (separation direction) of the ligaments 2a. The result is the internal organs 2b attached to the inner surface of the lower shells 2AB in actual contact around the circumference of the ligaments 2a are suctioned in order to the inner part of the suction nozzle 101A passing through the suction bore 104 starting from the abdominal appendage.

The suction member 101 is rotated, for example 3 to 5 times per second, by the rotation driving means 136. The suction member 101 rotates one time and the sensor detects the the rotating position and rotation amount of the suction nozzle 101A of the suction member 101. Based on the detection result the the rotation of the suction member 101 is stopped with the suction bore 104 opposite the adductor appendage of the internal organs 2b, and completes the separation of the internal organs 2b.

When the lower part of the cavity 102 of the suction plate 101B is positioned on the upper part of the ligaments 2a, the suction bore 104 is positioned to the outer periphery of the adductor muscle 2aa and positioned opposite the abdominal appendage of the internal organs 2b. The suction bore 104 can allow rotation along the circumference of the ligaments 2a on the outer periphery of the adductor muscle 2aa in parallel shaft-wise (fiber-wise) with the ligaments 2a by the suction power of the negative pressure while supplying negative pressure to the inner part of the suction nozzle 101A. The result is to prevent damage (The ligaments 2a in a fiber-wise direction, or omitting suction to one part of the yielded ligaments 2a attributed to being not actually connected to the actual connected part of the lower shells 2AB with the ligaments 2a.) to the ligaments 2a by reliably reducing the effect of applying negative pressure to the ligaments 2a, and can efficiently and reliably separate the internal organs 2b from the ligaments 2a attached to the circumference of the ligaments 2a.

The rotation limits and rotation amount of the suction member 101 can be increased or decreased as necessary.

The internal organs 2b suctioned to the inner part of the suction nozzle 101A comprised on the suction member 101, is transported to the chamber 65 via the internal organ transporting hose 64.

The rotation of the suction member 101 stops and the supply of negative pressure to the internal organ transporting hose 64 to complete the separation of the internal organs 2b. The upper frame driving cylinder 83 and the lower frame driving cylinder 69 return to the stand-by state with a reverse movement, in order, of the separation body 100 and the suction member 101. The separation body 100 and the suction member 101 return to the stand-by state and the transporting/handling means 3 operates, and the shell loading plates 18 with loaded lower shells 2AB to separate the internal organs 2b are transported to the disposed position of the separation body 100 in the stand-by state. The loaded shell loading plates 18, with lower shells 2AB with attached adductor muscles 2b separated from the internal organs 2b, are transported to separate from the separation body 100.

The composition of the raw bivalve peeling-off apparatus 1E of the present embodiment, can be as successful as the above-mentioned raw bivalve peeling-off apparatus 1 in the first embodiment.

According to the internal organ separating means 9 means 140 of the raw bivalve peeling-off apparatus 1A of the present embodiment, it is possible to separate (suction and remove), in this case efficiently and reliably, the internal organs 2b outside of the ligaments 2a from the lower shells 2AB without damaging the ligaments 2a.

The internal organ separation means 9 of the present embodiment, using the internal organ separating means of the raw bivalve peeling-off apparatus of the present invention, can use the simple process of the internal organ separation apparatus to separate the internal organs 2b.

The raw bivalve peeling-off apparatus 1F of the present embodiment has a means to improve the separation efficiency of the internal organs 2b, and is comprised in the same manner as the internal organ separating means 9A of the above-mentioned raw bivalve peeling-off apparatus 1 in the sixth embodiment. Only the internal organ separating means 9B part of the raw bivalve peeling-off apparatus 1F of the present embodiment will be explained, explanations of the other compositions will be omitted. Also, a detailed explanation of similar reference characters in the drawings of similar and corresponding compositions in the above-mentioned embodiment will be omitted.

Figure 41:
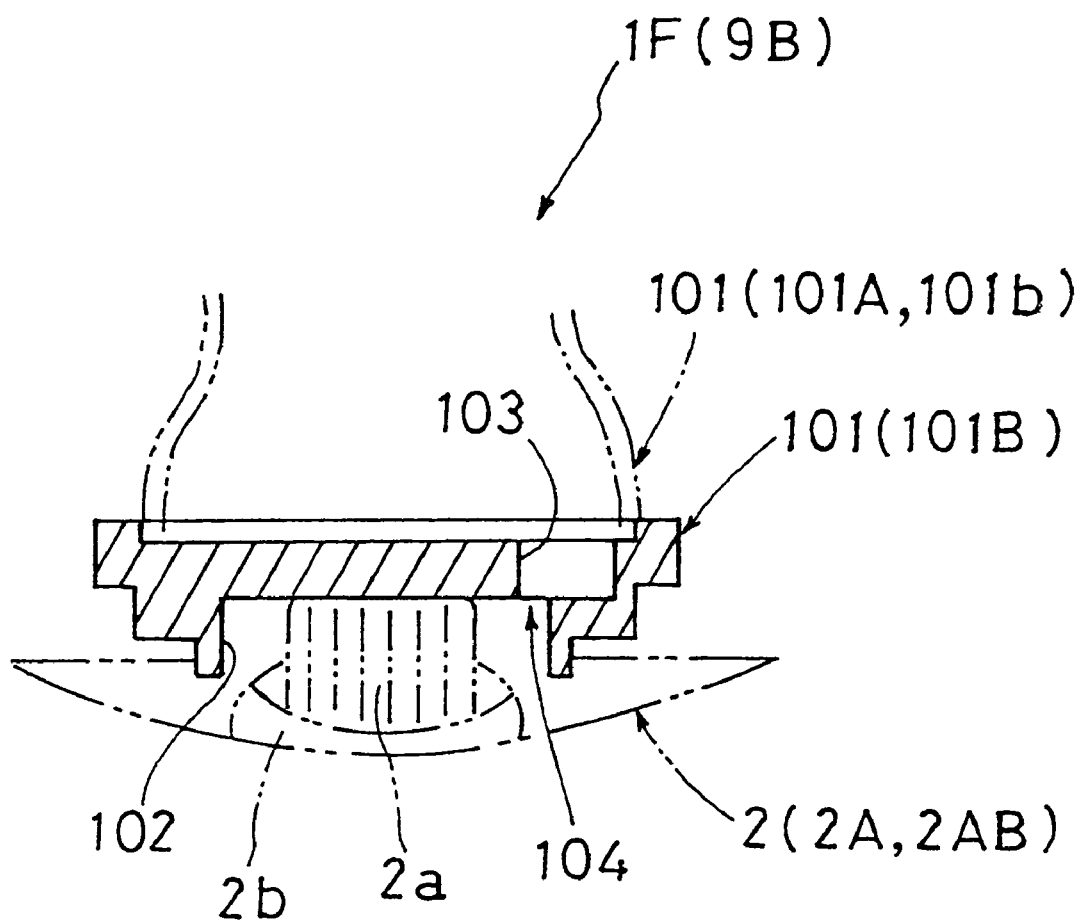
FIG. 41 is a partially expanded sectional view of a part of the separated state of the internal organ separating means for removing the non-edible parts from the present embodiment of the raw bivalve peeling-off apparatus of the present invention as it is used to separate raw bivalves.

As shown in FIG. 41, the internal organ separating means 9B of the raw bivalve peeling-off apparatus 1F of the present embodiment has a separation function by suctioning the internal organs 2b, i.e., the lower wall of the cavity 102 of the suction plate 101B is comprised to actually contact the upper surface of the ligaments 2a when separating only the internal organs 2b from the lower shell 2AB.

I.e., the stroke of the suction nozzle 101A on the upper frame driving cylinder 83 arrives at the advanced forward end of the output shaft 83a of the upper frame driving cylinder 83, and the lower wall of the cavity 102 actually contacts the upper surface of the ligaments 2a. When the lower wall of the cavity 102 actually contacts the upper surface of the ligaments 2a, it is desirable the lower end of the suction plate 101B, shown in the lower part of FIG. 41, approaching the inner surface of the lower shell 2AB, to not actually contact the inner surface of the lower shells 2AB.

The composition of the internal organ separating means 9B of the raw bivalve peeling-off apparatus 1F of the present embodiment, can be as successful as the above-mentioned internal organ separating means 9A raw of the bivalve peeling-off apparatus 1E in the sixth embodiment.

The internal organ separating means 9B of the raw bivalve peeling-off apparatus IF of the present embodiment, with a separation function to separate the internal organs 2b, can press on the upper surface of the ligaments 2a when suctioning the internal organs 2b, can reliably prevent damage to the ligaments 2a, attributable to the part of actual contact between the lower shell 2AB and the ligaments 2a and not actually contacting the lower shells 2AB, and can improve the yield of the high commercial priced ligaments 2a.

When suctioning the internal organs 2b, the place of actual contact on the upper surface of the ligaments 2a on the lower wall of the cavity 102 can slide on the upper surface of the ligaments, and for sliding resistance to twist the ligaments 2a and to prevent damage to the ligaments 2a with a sliding resistance to twist the ligaments 2a, it is desirable to fix a low coefficient of friction food-sanitary safe resin or the like sheet or film resin or apply a resin coating in order to reduce the sliding resistance.

FIGS. 42 through 55 explain the eight embodiment of the raw bivalve peeling-off apparatus of the present invention using the raw bivalve peeling-off method of the present invention.

The raw bivalve peeling-off apparatus 1G of the present embodiment has a means to improve the separation efficiency of the internal organs 2b of the internal organ separating means 9 of the above-mentioned raw bivalve peeling-off apparatus 1 in the first embodiment. The other compositions are comprised in the same manner as the above-mentioned raw bivalve peeling-off apparatus 1 in the first embodiment. Only the internal organ separating means 9C part of the raw bivalve peeling-off apparatus 1G of the present embodiment will be explained, explanations of the other compositions will be omitted. Also, a detailed explanation of similar reference characters in the drawings of similar and corresponding compositions in the above-mentioned embodiment will be omitted.

Figure 42:
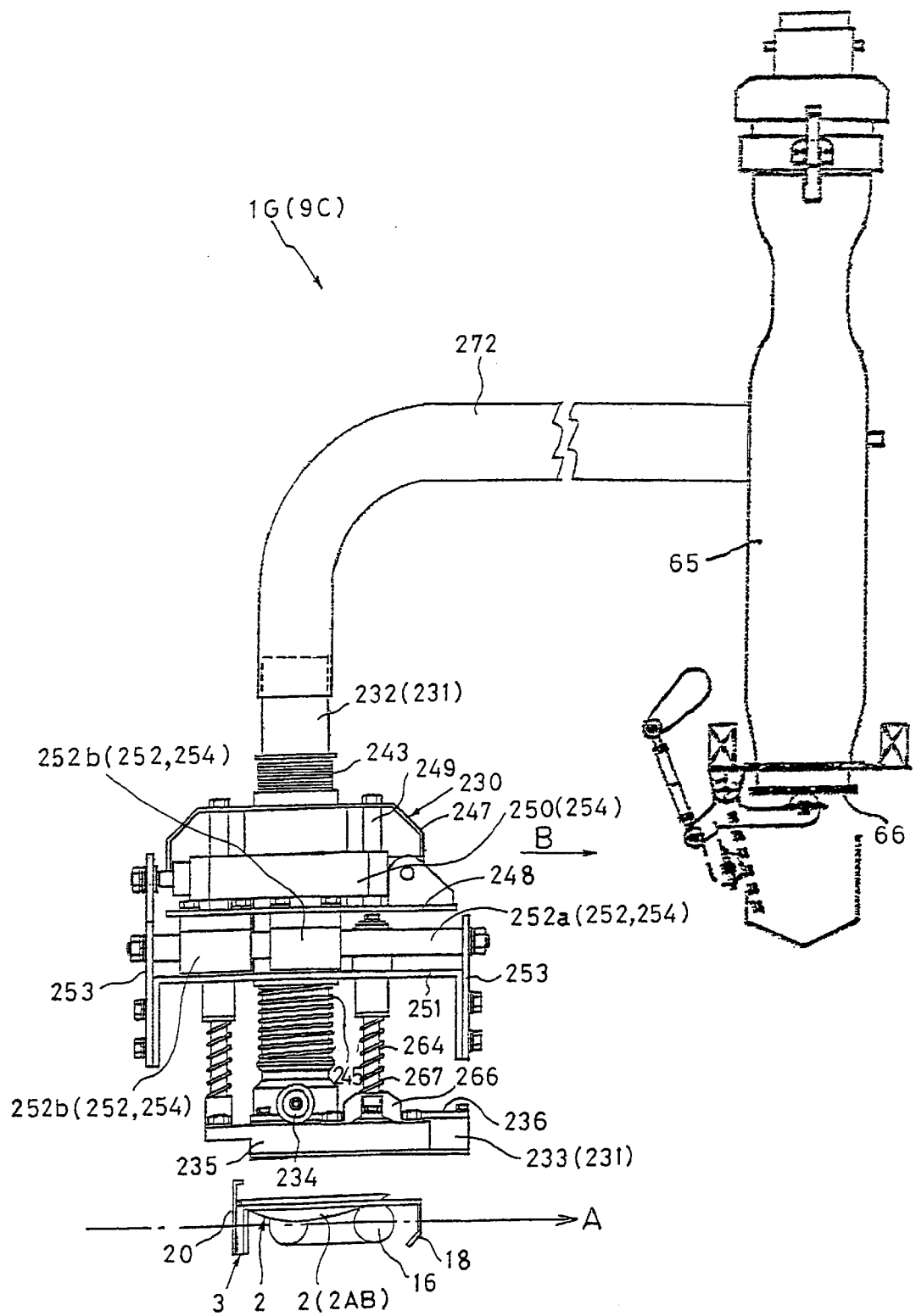
FIG. 42 is a front elevation of a part of the internal organ separating means for removing the non-edible parts form in the eighth embodiment of the bivalve peeling-off apparatus of the present invention as it is used to separate raw bivalves.

As shown in FIG. 42, the internal organ separating means 9C of the raw bivalve peeling-off apparatus 1G of the present embodiment has a separation body 230 to separate the non-edible internal organs 2b away from the ligaments 2a from the lower shells 2AB. The separation body 230, mounted to the inner surface of the lower shells 2AB of the scallops 2, has a suction means 231 to separate (remove by suction), in detail, the adductor appendages and strings and the like internal organs 2b in actual contact circularly around the outer periphery of the ligaments 2a, by suctioning with negative pressure. The suction means 231 has a plurality of, for example, six suction nozzles 232 (only one part is shown) disposed opposite the inner surface of the lower shells 2AB of the scallops 2,. and possesses a substantially box-like suction member 233 fitted, by welding or the like, to the tips of the suction nozzle 232, shown in FIG. 43. The suction nozzles 232 and suction member 233 constituting the suction means 231 in the present embodiment, after being formed individually, are integrally formed by welding, coupling or the like.

Figure 45:
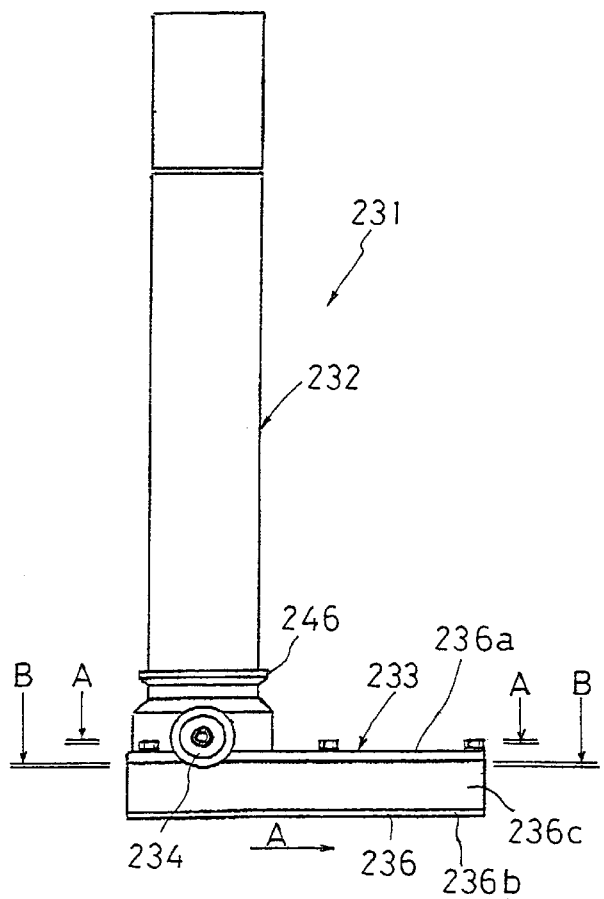
FIG. 45 is a front elevation showing a part of the suction means of the internal organ separation means in FIG. 42.
Figure 46:
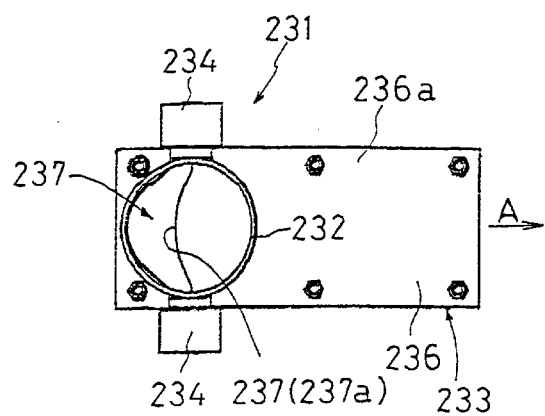
FIG. 46 is a top plan view along the A—A line in FIG. 45.

A shaft with a pair of rollers 234, 234 is disposed to rotate freely on the outer periphery of the lower part of the suction nozzle 232, in a direction perpendicular to the shell transporting direction shown by arrow A in FIGS. 45 and 46. The rollers 234, 234 are in continuous actual contact with the upper surface of the above-mentioned shell suppresser 235.

Figure 47:
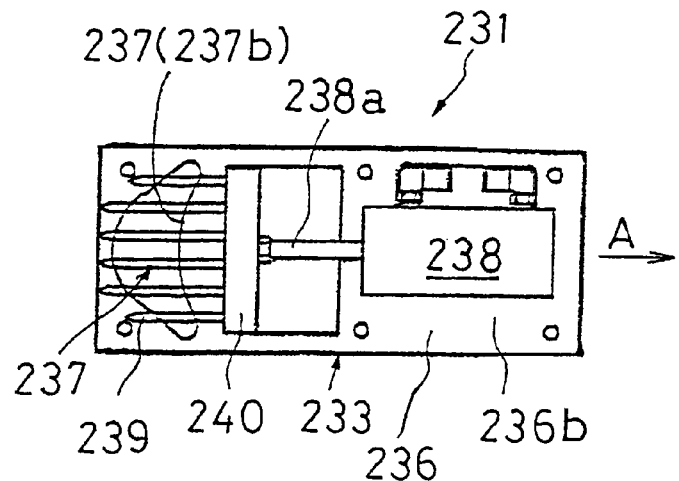
FIG. 47 is a top plan view along the B—B line in FIG. 45.
Figure 48:
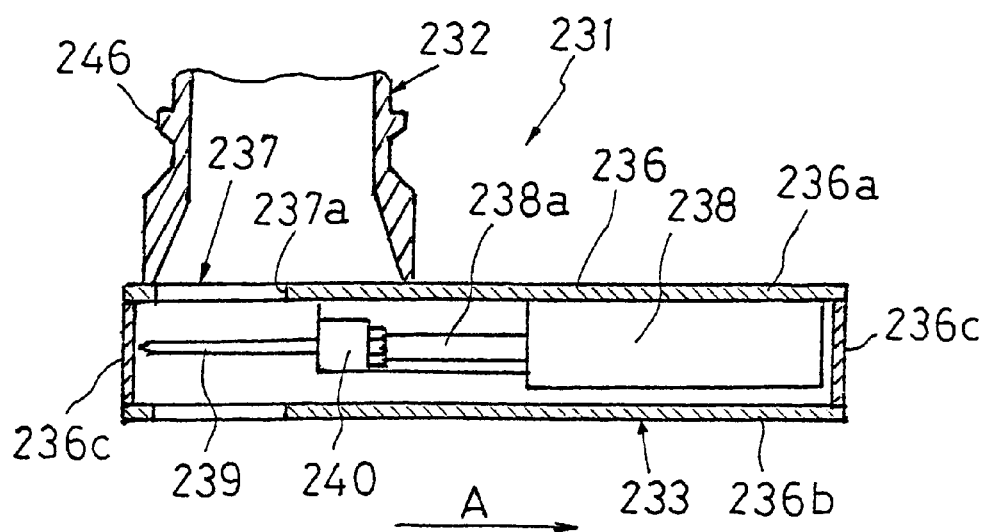
FIG. 48 is an expanded longitudinal section of a part of FIG. 45.

The suction member 233, as shown in FIG. 46, has a case 236 formed into a hollow box-like shape to cover, by a side plate 236c, the circumference of a rectangular ceiling plate 236a and a floor plate 236b that are disposed in an opposed relation to each other at a desired distance. The case 236 is disposed to extend with its longitudinal direction parallel to the shell transporting direction shown by arrow A, as shown in FIGS. 46 through 48, and a portion of the case 236 in the vicinity of the left end of the top plate 236a is secured to the tip end of the suction nozzle 232. A suction bore 237 penetrating in thickness-wise direction shown in a vertical direction in FIG. 48 is made at a location at which the case body 236 is secured to the suction nozzle 232. The suction bore, as shown in FIGS. 46 and 47, is defined by a pair of upper and lower right side-broken substantially crescent-shaped openings 237a and 237b formed mutually opposite each other on the top plate 236a and floor plate 236b of the case 236. The suction bore 237 gives passage to the inner side of the suction nozzle 232. The suction bore 237 is disposed opposite the abdominal appendage inside the internal organs 2b in actual contact around the outer periphery of the ligaments 2a of the scallops 2. The suction bore 237 is formed to be able to suck the abdominal appendages of the internal organs 2b positioned below the suction bore 237 when negative pressure is applied to the suction nozzle 232.

The output shaft 238a of the reciprocating drive cylinder 238 is disposed upstream to the shell transporting direction on the inner part of the case body 236, as shown in FIGS. 47 and 48. A plurality of pins 239 possessing forks 240 arranged in a comb-like fashion in a direction perpendicular to the axis of the suction bore 237 are disposed with the tips of each pin 239 in a position upstream to the shell transporting direction on the output shaft 238a of the reciprocating drive cylinder 238. The reciprocating drive cylinder 238 positions the advanced forward output shaft 238a continuously to close and obstruct the suction bore 237 with each pin 239 of the fork body 240, and each pin 239 of the fork body 240, retreating back on the output shaft 238a of the reciprocating drive cylinder 238, moves upstream to the shell traveling direction and can release the upwards and downwards parts of the suction bore 237.

When negative pressure from the suction nozzle 232 is utilized on the output shaft 238a of the reciprocating drive cylinder 238, the suctioned internal organs 2b undamaged by the negative pressure on the suction bore 237 are put in a passing through state to pass through the suction bore 237, and a suction bore opening/closing means 241 is comprised to open/close the suction bore selectively and repeatedly on the suctioned internal organs 2b stopped in the impassable state at the suction bore 237.

Reverting to FIG. 3, a supporting sleeve 242 is fitted to allow sliding movement of the suction nozzle 232 in an upwards and downwards direction on the outer periphery in the substantially central portion of the axis of the suction nozzle 232. The upper end of the sleeve 242 is in actual contact with the lower end of an upper compression coil spring 243 fitted around the outer periphery of the suction nozzle 232 to position the sleeve 232 upwards. The upper end of the upper compression coil spring 243 is in actual contact with a stopping ring 244 mounted to the outer periphery of the upper part of the suction nozzle 232. The lower end surface of the sleeve 242 is in actual contact with the upper end of the lower compression coil spring 245 fitted around the outer periphery of the suction nozzle 232 to position the sleeve 232 downwards, and the lower end of the lower compression coil spring 245 is in actual contact with the spring bearing 246 protruding on the outer periphery of the lower part of the suction nozzle 232.

I.e., the suction nozzle 232 is fitted to move freely upwards and downwards on the sleeve 242 by the force from the upper compression coil spring 243 and the lower compression coil spring 245, and each roller 234, 234 of the suction nozzle 232 can be put into actual contact with the upper end of the shell suppresser 235 with the force from the upper compression coil spring 243 and the lower compression coil spring 245.

The above-mentioned sleeve 242 is formed cylindrically with a stepped small diameter on opposite ends on the outer periphery in the direction of the axis. The steps formed on the upper part of the sleeve 242 can support, secured from above, a bore 247a to penetrate the upper frame 247 in a plate thickness-wise direction at the upper most position. The steps formed on the lower part of the sleeve 242 are secured to the bore 248a to penetrate the middle frame 248 extruding parallel to the upper frame 247 in a plate thickness-wise direction downward on the upper frame 247.

Figure 44:
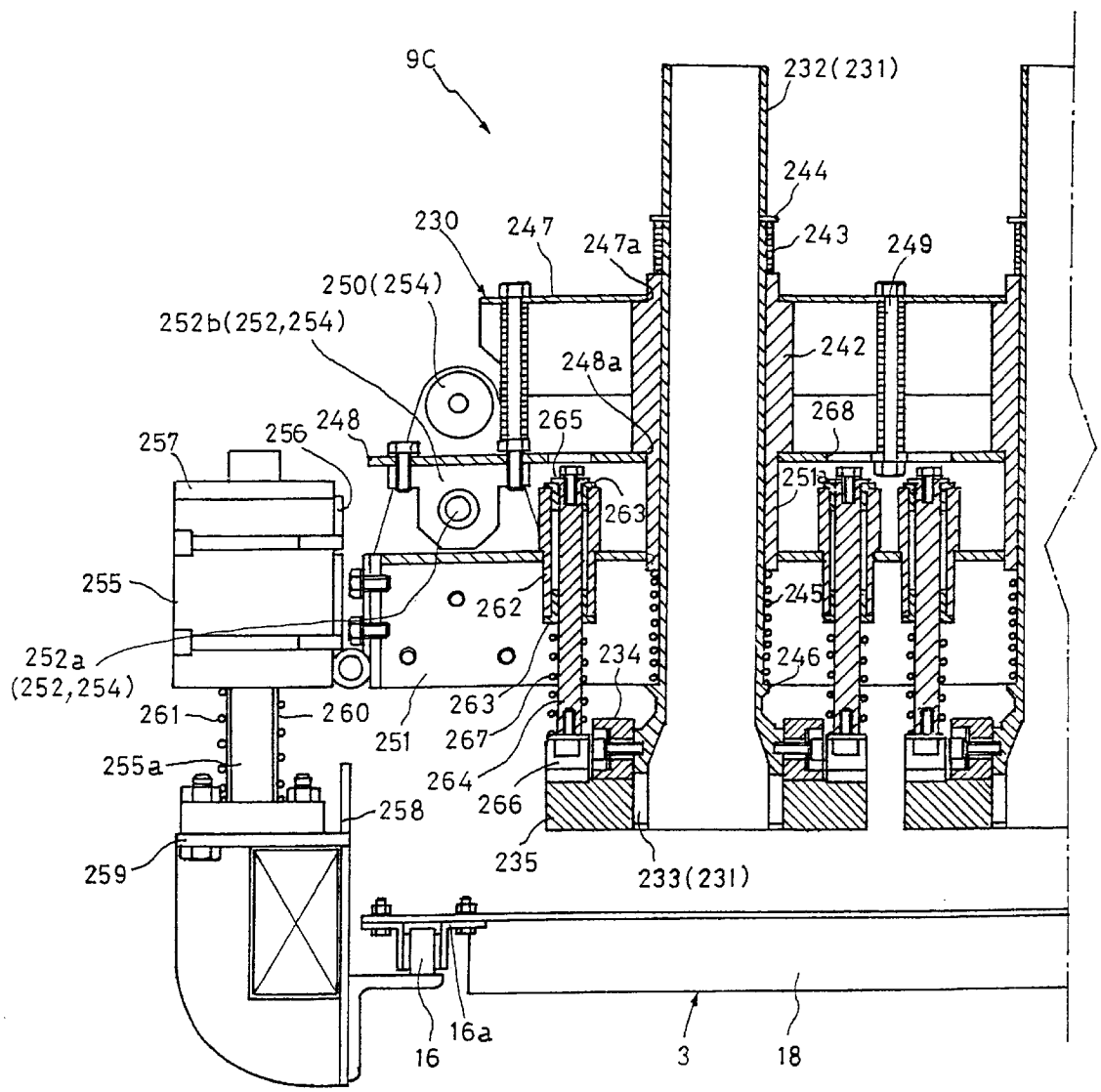
FIG. 44 is a longitudinal section of a part of FIG. 43.

The upper frame 247, as shown in FIG. 42 is formed in a substantially upside down U shape, and the middle frame 248 is formed substantially horizontally. The longitudinal direction of the upper frame 247 and middle frame 248, as shown in FIG. 44, are disposed perpendicular to the shell transporting direction. Also, the upper frame 247 and middle frame 248 are fixed in parallel to the opposite step parts on the outer periphery of the sleeve 242 by a contraction member 249 made up of a plurality of bolts, nuts or pipe shaped sleeves, to contract an slide freely on the upper frame 247 and middle frame 248.

I.e., the sleeve 242 is supported and contracted on the middle frame 248 disposed downward on the upper frame 247.

Figure 43:
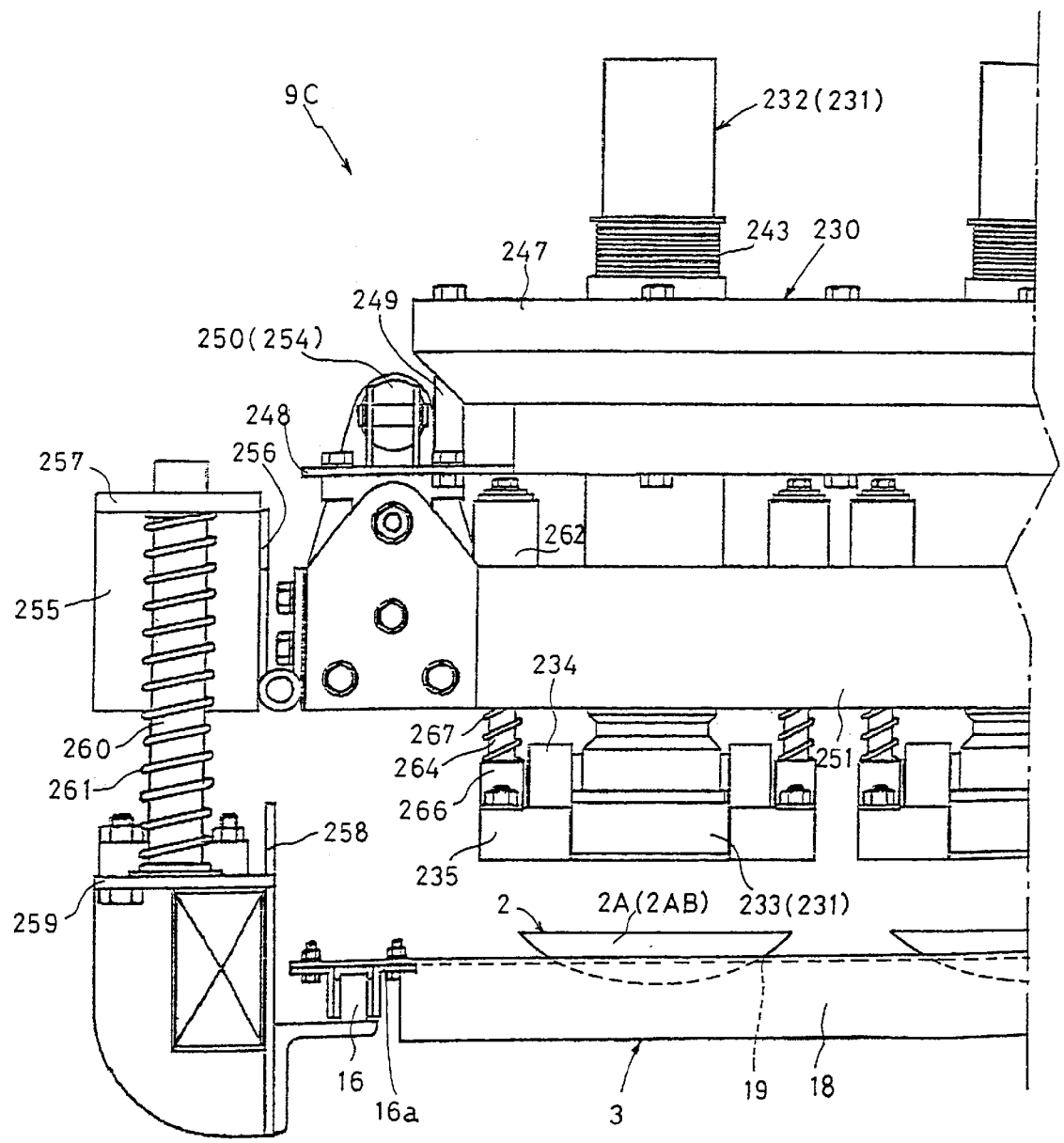
FIG. 43 is a partially expanded side view of the internal organ separating means in FIG. 42 as seen downstream of the shell transporting direction.

The tip of an output shaft 250a of a movement reciprocating drive cylinder 250 is disposed upstream to the shell transporting direction shown by arrow A in FIG. 1 as a driving source to parallely move, downstream to the shell transporting direction shown by arrow A the upper frame 247 and middle frame 248, shown by arrow B in FIG. 1, on the upper surface in the vicinity near the opposite ends of the longitudinal direction of the middle frame 248, as shown in FIGS. 42 through 44.

A bore 251a to penetrate in a thickness-wise direction formed to the lower frame 251 extending parallel downward on the middle frame 248, as shown in FIG. 44, is secured to the outer periphery in the vicinity near the lower end of the sleeve 242. The lower frame 251, as shown in FIG. 42, is formed in a substantially upside down U shape, with the longitudinal direction disposed parallel to the shell transporting direction. A left/right pair of common direct drive mechanisms 252 (only one part shown) is disposed on the middle frame 248 shown by arrow B in FIG. 42, to parallely move in the shell transporting direction shown by arrow A in FIG. 42, on the upper surface in the vicinity near the longitudinal direction of the lower frame 251, as shown in FIGS. 42 through 44 and the common direct drive mechanisms 252 possess a linear shaft 252a and two linear guides 252b disposed to move freely along the linear shaft 252a fitted to the linear shaft 252a.

As shown in FIG. 42, the opposite ends of the linear shaft 252a are mounted to a pair of front and back support plates 253, 253 established perpendicular to the shell transporting direction shown by arrow A in FIG. 42 on the opposite ends of the lower frame 251. The upper end of the support plate 253 positioned upstream to the shell transporting direction shown by arrow A in FIG. 42, is positioned upwards on the output shaft 250a of the movement reciprocating cylinder 250, and the tips of the output shaft 250a of the movement reciprocating cylinder 250 are mounted to the upper part of the support plate 253.

A movement means 254 is comprised of a movement reciprocating cylinder 250 and a direct drive mechanism 252 to move, on one hand, at least the scallops 2 of the bivalves to the suction nozzle 232 and suction member 233, and to move the suction nozzle 232 and suction member 233 along the ligaments 2a.

A lower frame driving cylinder (reciprocating cylinder) 255, to move the lower frame 251 in an upwards and downwards direction as shown in FIGS. 43 and 44, is mounted via a mounting member 256 to the opposite ends of the lower frame 251. The lower frame driving cylinder 255 is mounted to a mounting member 256 in a downward direction on the tip of the output shaft 255a, and the lower frame driving cylinder 255 has a flange 257 extruded on the upper part in the upstream side and downstream sides of the shell transporting direction. The lower frame driving cylinder 255 is mounted downward on the output shaft 255a of a support stay 259 that is mounted to the outer side of a sub-frame 258 disposed on the outer side of the chain conveyor 16, as shown in FIG. 44.

I.e., the lower frame driving cylinder 255 advances and retreats the output shaft 255a, the lower frame driving cylinder 255 upwards and downwards on itself, and can transport the lower frame 251 in an upwards and downwards direction. To explain in detail, in the present embodiment, the lower frame driving cylinder 255 drives, the output shaft 255a of the lower frame driving cylinder 255 rises and falls in an upwards and downwards direction, the rising and falling action of the lower frame driving cylinder 255 raises and lowers the entire separation body 230, and can separate the separation body 230 from the lower shells 2AB.

A front and back pair of pipes 260 (only one part shown) to control the movement path when moving the lower frame driving cylinder 255 in an upwards and downwards direction are disposed in a desired space from opposite sides of the lower frame driving cylinder 255 with a support stay 259, as shown in FIG. 43. The upper end of the pipe 260 is disposed to penetrate the flange 257 of the lower frame driving cylinder 255 in a thickness-wise direction. A compression coil spring 261 is fitted to the outer periphery between the flange 257 of the pipe body 260 and the support stay 259, and can smoothly move the lower frame 251 in an upwards and downwards direction to neutralize any sudden movements of the lower frame driving cylinder 255 with the force of the compression coil spring 261.

Three stepped sleeves 262 are mounted with each of their smaller diameter downwards around the disposed positions of each suction nozzle 232 of the lower frame 251. A sliding rod 264 that slides freely in an upwards and downwards direction via a substantially L-shaped upper and lower pair of shaft members 263, 263, shown in FIG. 44, is disposed on the inner part of each stepped sleeve 262. A positioning member 265 to control the maximum movement downwards on the sliding rod 264, is mounted to the upper end of the sliding rod 264. A shell suppresser 235, to press the rims of the lower shells 2AB from above, is mounted via a protective rubber or the like mounting member 266 to the lower end of the sliding rod 264. A compression coil spring 267 is fitted to the lower end of the outer periphery of sliding rod 264. One end (upper end) of the compression coil spring 267 is in actual contact with the lower end surface of the bearing member 263 fitted to the lower part of the stepped sleeve 262, and the opposite end (lower end) of the compression coil spring 267 is in actual contact with the upper end surface of the mounting member 266.

I.e., the sliding rod 264 is forced continuously downward by the force of the compression coil spring 264, and the shell suppresser 235 can actually contact the rim of the lower shells 2AB by the force of the compression coil spring 267.

The sliding rod 264 moves upward on the middle frame 248 positioned upwards on the sliding rod 264, and the positioning member 265 disposed on the upper end of the sliding rod 264 has a bore 268 that can prevent colliding and interfering with the middle frame 248.

Figure 49:
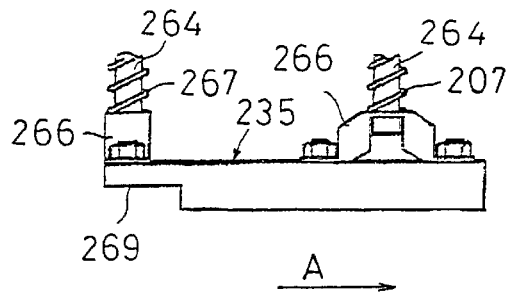
FIG. 49 is a front elevation showing a part of the shell suppresser in FIG. 42.
Figure 50:
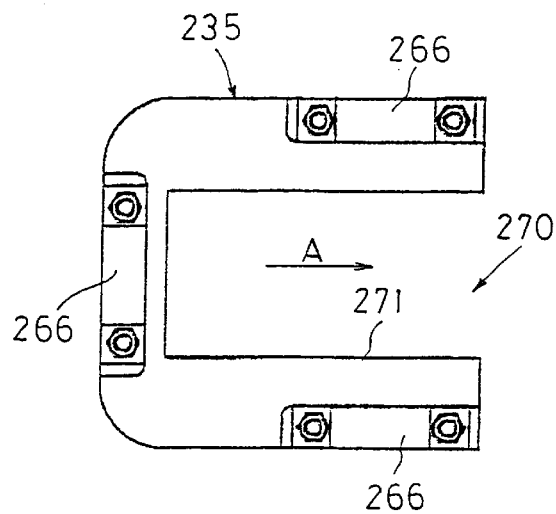
FIG. 50 is a top plan of FIG. 49.

As shown in FIGS. 49 and 50, the shell suppresser 235 has on the front a substantially square-shaped cavity construction 269 hollowed in a direction perpendicular to the shell transporting direction on the lower surface of the upstream side of the shell transporting direction shown by arrow A in FIG. 49. A flat, substantially 'sideways U' shaped securing member 271 is established on a flat, substantially 'sideways U' shaped body with an open mouth 270 on the downstream side of the shell transporting direction shown by arrow A in figure 270. The suction member 233 is secured to freely move in a direction parallel to the shell transporting direction on the inner part of the securing member 271 of the shell suppresser 235, as shown in FIGS. 42 through 51. The position relationship of the secured state of the suction member 233 to the inner part of the securing member 271 of the shell suppresser 235 positions the lower surface of both the shell suppresser 235 and the suction member 233 to the substantially same flat plane, and the right end of the suction member 233 can protrude on the downstream side of the shell transporting direction from the right end of the shell suppresser 235.

Reverting to FIG. 42, one end of an internal organ transporting hose 272, equipped with an elastic and flexible bellows or the like, is connected to the upper end of each suction nozzle 232. The opposite end of the internal organ transporting hose 272 is connected to a chamber 65. A vacuum pump (not shown), via a 3-way electromagnetic valve, is connected to the chamber 65, and can selectively supply the necessary positive pressure or negative pressure to the internal organ transporting hose 272. An open/close door 66 is disposed to open and close freely on the lower end of the chamber 65, and the open/close door 66 opens and closes to discharge the internal organs 2b that passed through the internal organ transporting hose 272 to a container or to a discharge conveyor (not shown).

The utilization of the present embodiment from the above-mentioned composition will be further discussed.

The shell loading plates 18 loaded with scallops 2 (lower shells with meat of the ligaments 2a and internal organs 2b attached) separated from the upper shells 2AA at the shell separating means 8, are transported in the shell transporting direction shown by arrow A in FIG. 1 and stop at the established position of the internal organ separating means 9C of the present embodiment, and while stopped, the non-edible part removing process 175B is performed.

According to the non-edible part removing process 175B of the internal organ suction means 9C of the present embodiment, the shell loading plates 18 stop at a position opposite the substantially united shafts of the suction nozzles 232 of the separation means 231 and the center of the ligaments 2a attached to actually contact the inner surface of the lower shells 2AB, i.e., the separation body 230 put in the stand-by state of the internal organ separation means 9C. The separation body 230 in the stand-by state, as shown in FIG. 44, positions the advanced forward end (lower part) advanced forward (extended) downward on the output shaft 255a of the lower frame driving cylinder 255. The lower frame driving cylinder 255, i.e., the separation body 230 is positioned at the raised up end, the most separated from the shell loading plates 18, on the output shaft 255a of the lower frame driving cylinder 255.

It is desirable to, at least, efficiently and reliably separate the abdominal appendage (shown in FIG. 38) inside the internal organs 2b of the internal organs 2b opposite the suction bore 237 of the suction member 233, when the lower shells 2AB are stopped at the disposed position of the suction body 230 in the stand-by state. In further detail, it is desirable to prevent damage to the ligaments 2a with a suction bore 237, not entirely opposite the ligaments 2a and the internal organs 2b, the widest portion of the suction member 237 is opposite the abdominal appendage of the internal organs 2b, positioned with the lower surface of the suction member 233 to cover the upper part of the ligaments 2a.

Figure 51:
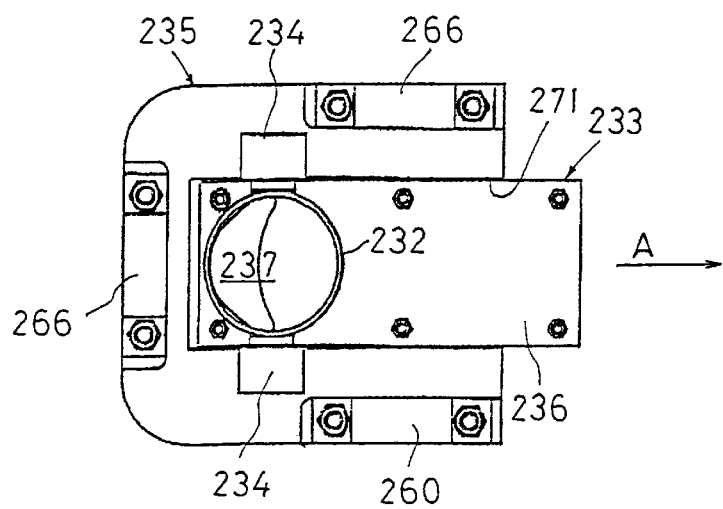
FIG. 51 is an explanatory drawing showing the position relationship of the shell suppressor and the suction member in the internal organ separation means in FIG. 42.
Figure 5:
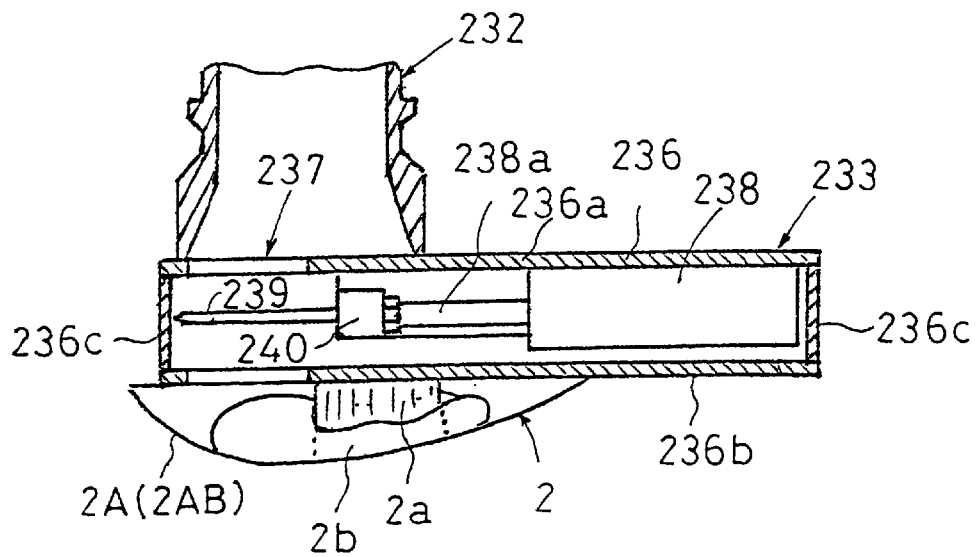
Figure 5:
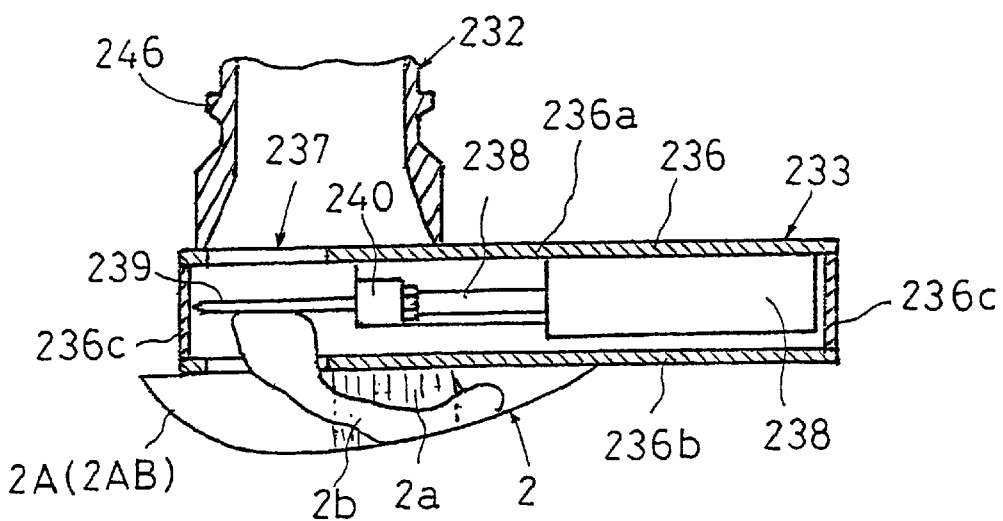

As shown in FIG. 42, the output shaft 250a of the movement reciprocating cylinder 250 comprising the movement means 254, is positioned in the retreated (contracted) retreated end (left side), the upper frame 247 and middle frame 248, i.e., as shown in FIG. 42, the suction means 231, positions the left side of the output shaft 250a of the movement reciprocating cylinder 250 and the direct drive mechanism 252, and the suction member 233 of the suction means 231 is positioned to the left of the securing mechanism 271 of the shell suppresser 235, as shown in FIG. 51.

As shown in FIGS. 47 and 48, the output shaft 238a of the reciprocating drive cylinder 238 comprising the suction bore open/close means 241 disposed on the inner part of the suction member 233, is positioned in the advanced forward (extended) end (left side), and each pin 230 of the fork body 240 is positioned to the left to maintain the impassable state, shutting the cover of the suction bore 237 of the suction member 233 by the output shaft 238a of the reciprocating drive cylinder 238.

The shell loading plates 18 stop at the established position of the separation body 230, the lower frame driving cylinder 255 drives at a fixed timing, the output shaft 238a of the lower frame driving cylinder 255 retreats and contracts, and the lower frame driving cylinder 255 lowers itself in a downward direction as shown in FIG. 44. The lowering of the lower frame driving cylinder 255 lowers the body of the separation body 230.

The lower surface of the shell suppressor 235 actually contacts the rim of the lower shells 2AB before the advanced forward end of the output shaft 255a of the lower frame driving cylinder 255, i.e., the separation body 7, arrives at the falling end. The falling suction means 231 and shell suppresser 235 stops the shell suppresser 235 at the actual contact position of the rim of the lower shells 2AB. The shell suppresser 235 also stops at the suction means 231 to stop at the actual contact position of the rim of the lower shells 2AB.

The advanced forward end of the output shaft 255a of the lower frame driving cylinder 255, i.e., the separation body 230, arrives at the falling end, and the shell suppresser 235 suppresses the rim of the lower shells 2AB by a force of the compression coil spring 267 fitted on the outer periphery of the lower part of the rod 264. The result is the lower shells 2AB are squeezed by the force of the compression coil spring 267 and fixed between shell suppresser 235 and the shell loading plates 18. Since the shell suppresser 235 is in actual contact with the lower shells 2AB by a force of a compression coil spring 267 in exchange for excessing force on the lower shells 2AB, it can reliably prevent damage to the lower shells 2AB.

The lower frame driving cylinder 255 of the present embodiment contacts and separates the separation body 230 opposite the lower shells 2AB, and has a composition to fix the lower shells 2AB between the shell loading plates 18 and the shell suppresser 235 when the output shaft 255a of the lower frame driving cylinder 255 has arrived at the advanced forward tip.

Since each roller 234, 234 of the suction body 233 comprising one part of the suction means 231 is in actual contact with the upper surface of the shell suppresser 235 by the force from the upper compression coil spring 243 and the lower compression coil spring 245 fitted, via the sleeve 242, upward and downwards the outer periphery of the suction nozzles 231, the actual contact state of each roller 234, 234 to the shell suppresser 235 can be reliably maintained.

The important part of the suction means 31 in the fixed state of the shell suppresser 235 pressed to the rim of the lower shells 2AB is shown in FIG. 52.

The advanced forward end of the output shaft 255a of the lower frame driving cylinder 255 arrives, and by a sensor not shown, the arrived advanced forward end of the output shaft 255a of the lower frame driving cylinder 255 makes a detection, and based on the detection signal, negative pressure is supplied to the inner part of the suction nozzle 232 via the internal organ transporting hose 272. Negative pressure is utilized, in the direction opposite the inner surface of the lower shells 2AB via the suction nozzle 237 of the suction member 233, to separate the internal organs 2b from the lower shells 2AB. The abdominal appendage inside the internal organs 2b in actual contact around the circumference of the ligaments 2a is separated from the lower shells 2AB and suctioned to the inner part of the suction bore 237. The abdominal appendage inside the internal organs 2b suctioned to the inner part of the suction bore 237 is maintained to the inner part of the suction bore 237 by a plurality of pins 239 of the fork body 240 comprising the suction open/close means 241 to maintain the closed state to cover the suction bore 237 without damage by utilizing negative pressure in the suction bore 237.

I.e., the portion of the abdominal appendage making one part of the internal organs 2b, with negative pressure utilized from the inner part of the suction nozzle 232, is raised up for separation from the lower shell 2AB and is maintained in the inner part of the suction bore 237. The portion of the abdominal appendage making one part of the internal organs 2b, with negative pressure utilized from the inner part of the suction nozzle 232, raised up for separation from the lower shell 2AB and in the maintained state, is shown in FIG. 53.

The movement reciprocating drive cylinder 250 comprising one part of the movement means 254, drives at the timing of the portion of the abdominal appendage inside the internal organs 2b raised up for separation from the lower shells 2AB with negative pressure utilized from the inner part of the suction nozzle 232, the output shaft 250a of the movement reciprocating drive cylinder 250 advances forward (extends), and moves in parallel to the right, from the downstream side of the shell transporting direction shown by arrow A in FIG. 42, of the middle frame 248 and the upper frame 247 supported upwards on the lower frame 251 via the direct drive mechanism 252, as shown by arrow B in FIG. 42. The movement of the upper frame 247 and the middle frame 248 moves in parallel to the right, from the downstream side of the shell transporting direction shown by arrow A in FIG. 42, of the suction means 231, as shown by arrow B in FIG. 42.

The movement of the suction means 231 is performed smoothly by each roller 234, 234 disposed on the outer periphery of the lower part of the suction nozzle 232 of the suction means 231 while rotating on the upper surface of the shell suppresser 235, and the movement of the suction means 231 performs at the maintained state of the abdominal appendage portion of the internal organs 2b in the inner part of the suction bore 237 of the suction member 233.

I.e., the movement of the movement means 254 moves the suction member 233 in a direction downstream to the shell transporting direction running along the upper surface of the ligaments 2a at the maintained state of the abdominal appendage portion of the internal organs 2b in the inner part of the suction bore 237.

Figure 54:
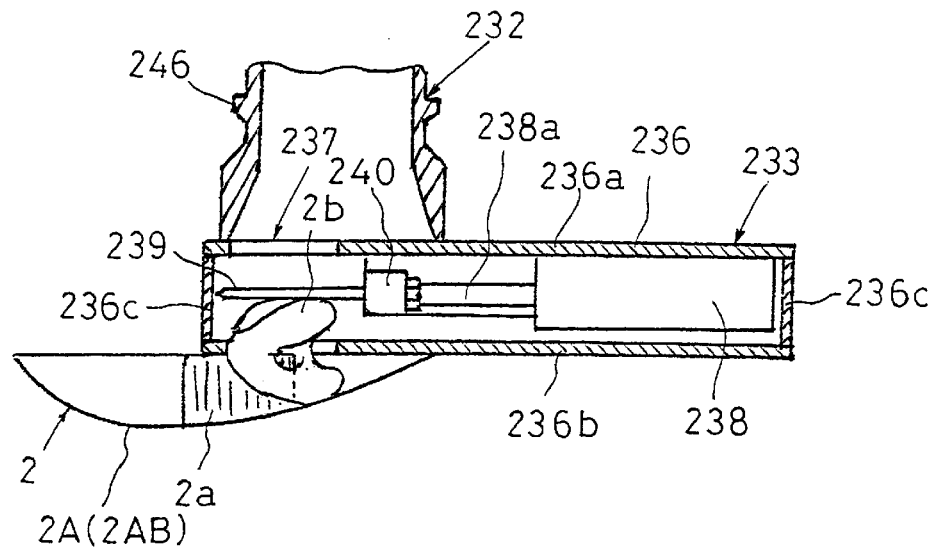
FIG. 54 is an expanded longitudinal section showing the progression of the separating state of the internal organs in the suction member of the internal organ separation means in FIG. 42.

The abdominal appendage portion of the internal organs 2b maintained in the inner part of the suction bore 237, en route to moving downstream to the shell transporting direction along the upper surface of the ligaments 2a, separates the anchored other portions of the internal organs 2b in order from the adjoining place of the abdominal appendage from the ligaments 2a, i.e., the other portions of the internal organs 2b in order from the adjoining place of the abdominal appendage can separate from the ligaments 2a by the moving the suction means 231 with the movement means 254. The en route progress of the separation state of the internal organs 2b en route to moving the suction means 231 by the movement means 254 is shown in FIG. 54.

Since the upper surface of the ligaments 2a can be covered by the lower surface of the suction member 233 and the inner part of the suction cavity 237 maintaining the abdominal appendage when moving downstream to the shell transporting direction along the upper surface of the ligaments 2a with the abdominal appendage part of the internal organs 2b maintained in the inner part of the suction bore 237, tearing of the ligaments 2a in the fiber-wise direction by utilizing a strong negative pressure on the ligaments 2a and damage to the ligaments 2a by separating the adductor muscle 2aa and shell hinge ligament 2ab comprising the ligaments 2a can be reliably prevented.

Figure 55:
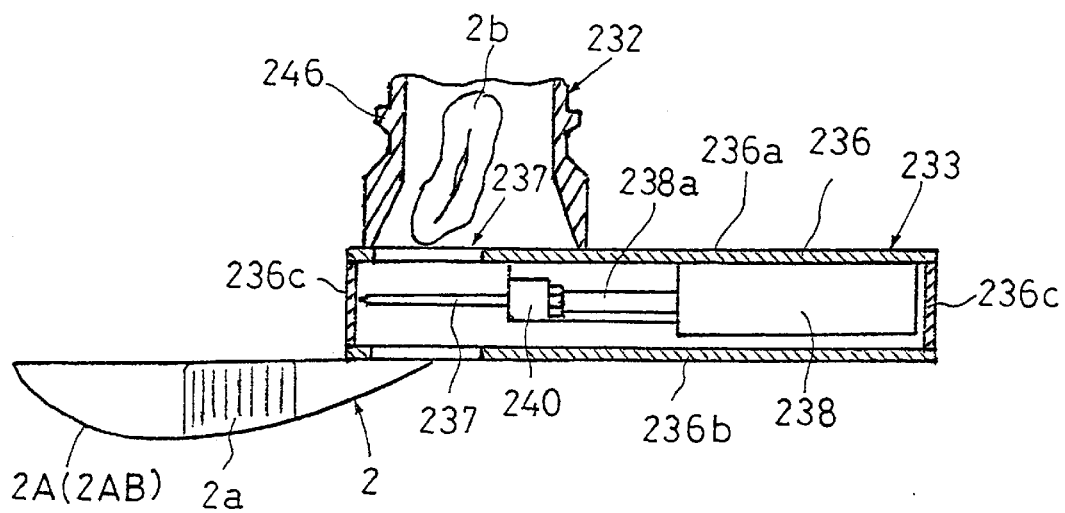
FIG. 55 is an expanded longitudinal section showing the passing through state of the internal organs in the suction member of the internal organ separation means in FIG. 42.

The advanced forward end of the output shaft 255a of the lower frame driving cylinder 255 arrives, and, by a sensor not shown, the arrived advanced forward end of the output shaft 255a of the lower frame driving cylinder 255 makes a detection, and based on the detection signal, the reciprocating drive cylinder comprising one part of the suction bore open/close means 22 drives, and the output shaft 238a of the lower frame driving cylinder 238 contracts and retreats. Each pin 239 of the fork body 240 positioned in the inside the suction bore 237 move to separate from the inner part of the suction bore 237 when the output shaft 238a of the lower frame driving cylinder 238 retreats. Each pin 239 of the fork body 240 is positioned to the right in the opened passing through state to allow the passage of the internal organs 2b separated in the suction bore 237 of the suction member 233. Each pin 239 of the fork body 240 comprising one part of the suction bore open/close means 241 opens to the passing through state of the suction bore 237 of the suction member 233, and the internal organs 2b maintained on the inner part of the suction bore 237 can be removed from the lower shells 2AB and suctioned to the inner part of the suction nozzle 232 via the suction bore 237. The passing through state of the internal organs 2b of the suction bore open/close means 241 allowing passage through the suction means 237 is shown in FIG. 55.

The internal organs 2b suctioned to the inner part of the suction nozzle 232 comprising the suction means 231 pass through the internal organ transporting hose 272 and are collected in the chamber 65.

The separation (removal) of the internal organs 2b from the inner surface of the lower shells 2AB (in detail, from the ligaments 2a) and the passing through state of the suction bore open/close means 241 is completed, the supply of negative pressure to the internal organ transporting hose 272 stops, the internal organs 2b collected in the chamber 65 are discharged by the opening and closing of the open/close door 66 to a container or a discharge conveyor (not shown), the reciprocating drive cylinder 238, movement reciprocating drive cylinder 250, the lower frame drive cylinder 255, in that order, reverse drives, and the suction bore open/close means 241, movement means 254, followed by the lower frame 251 and the like parts of the separation body 230 each return to the stand-by state.

The separation body returns to the stand-by state, the transporting/handling means 3 drives, the shell loading plates 13 with loaded lower shells 2AB to separate the internal organs 2b are transported to the established position of the separation body in the stand-by state, and then the shell loading plates 18 with loaded lower shells 2AB with only the ligaments 2a separated from the internal organs 2b attached are transported to separate from the separation body 230.

Accordingly, the raw bivalve peeling-off apparatus 1G of the present embodiment, can be as successful as the above-mentioned raw bivalve peeling-off apparatus 1 in the the first embodiment. The internal organ separatinging me of the raw bivalve peeling-off apparatus 1G of the present embodiment, to separate the internal organs 2b from the small hinge ligaments 2a, can cover the internal organs 2b maintained in the upper part and lower surface of the suction member 233 on the upper surface of the ligaments 2a, and in exchange for negative pressure on the ligaments 2a that can tear the ligaments 2a in a fiber-wise direction, can reliably prevent damage to the ligaments 2a when separating the adductor muscle 2aa and the shell hinge ligament 2ab comprising the ligaments 2a, can reliably improve the yield and quality of the ligaments 2a, and can efficiently and reliably separate the internal organs 2b and other parts from the ligaments 2a. Therefore, it is possible to manage a large volume of scallops in a short amount of time without using much labor.

It is desirable to use the internal organ separation means 9C of the present embodiment independently from the non-edible part removing apparatus. In the case of using the internal organ separation means 9C of the present embodiment independently from the non-edible part removing apparatus, not established on the transporting/handling means 3, a support member is established to support the lower shells 2AB from below to the lower part of the suction nozzle 232, and it is desirable to comprise to supply the ligaments 2a by hand or a robot arm to the support member.

It is also desirable to establish a grasping means, not shown, to grasp the abdominal appendage inside the internal organs 2b maintained in the inner part of the suction bore 237 and set between the left side plates, shown on the left part of FIG. 53, of the case body 236 to the inner part of the suction member 233 of the present embodiment. The grasping means is disposed in the same manner of the reciprocating cylinder in the movement reciprocating drive cylinder 250 in the same way the movement reciprocating drive cylinder 250 is disposed to the lower part of the movement reciprocating drive cylinder 250 of the inner part of the suction member 233. A composition mounting a plurality of rod bodies to the tips of the output shafts of the reciprocating cylinders are illustrated.

Figure 56:
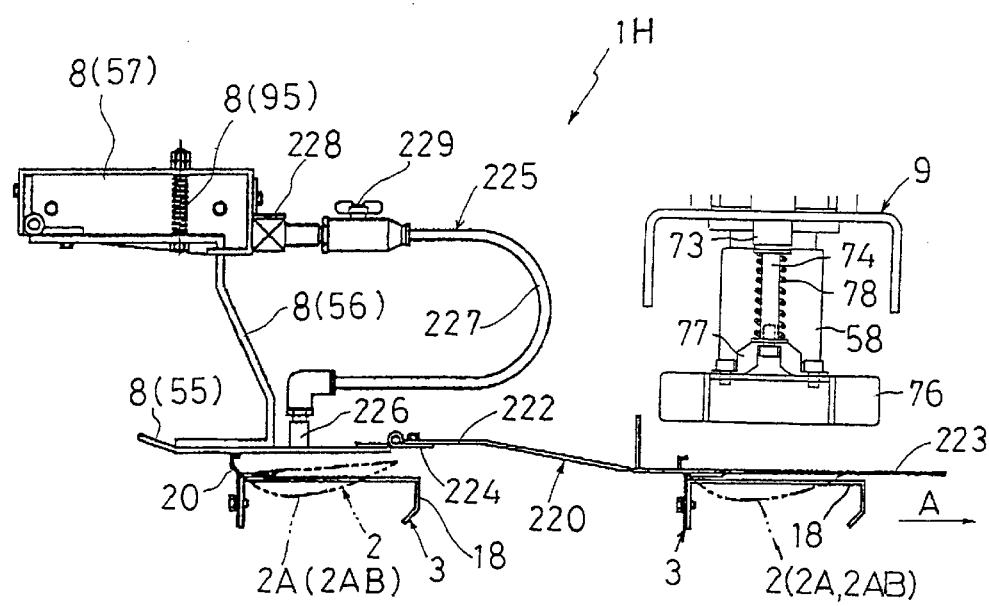
FIG. 56 is a front elevation of a part of the water supplying means and the floating away preventing means in the ninth embodiment of the raw bivalve peeling-off apparatus of the present invention as it is used to separate raw bivalves.
Figure 57:
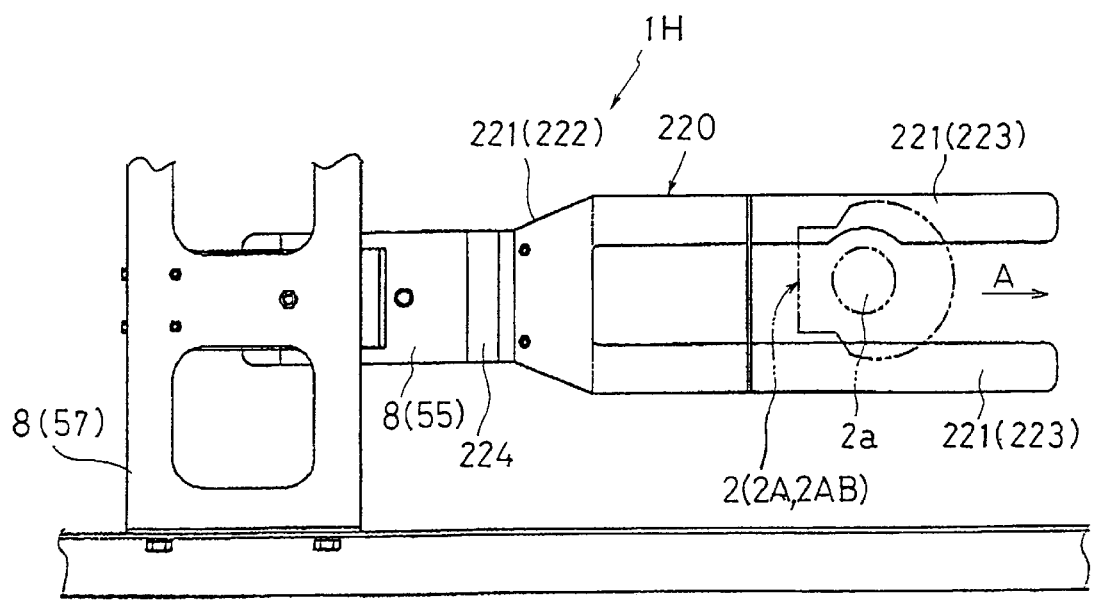
FIG. 57 is a top plan of a part of the floating away preventing means in FIG. 56.

FIGS. 56 and 57 explain the ninth embodiment of the raw bivalve peeling-off apparatus of the present invention using the raw bivalve peeling-off method of the present invention.

The raw bivalve peeling-off apparatus 1H of the present embodiment has a floating away preventing means 220 to prevent the floating away of the lower shells 2AB and smoothly perform the separation at the rim of the lower shells 2AB and the shell suppresser 76, and a water supplying means 225 to improve the separation efficiency of the internal organs 2b, when separating the non-edible parts of the internal organs 2b except the ligaments 2a from the lower shells 2AB of the scallop shells 2A attached to the ligaments 2a positioned in the raw bivalve peeling-off apparatus 1 in the first embodiment. The other compositions are comprised in the same manner as the above-mentioned raw bivalve peeling-off apparatus 1 in the first embodiment. Only the floating away preventing means 220 and the water supplying means 225 of the raw bivalve peeling-off apparatus 1G of the present embodiment will be explained, explanations of the other compositions will be omitted. Also, a detailed explanation of similar reference characters in the drawings of similar and corresponding compositions in the above-mentioned embodiment will be omitted.

As shown in FIGS. 56 and 57, the floating away preventing means 220 of the raw bivalve peeling-off apparatus 1G of the present embodiment has a means to smoothly perform the separation at the rim of the lower shells 2AB and the shell suppresser 76 when separating the internal organs 2b at the internal organ separating means 9. The floating away preventing means 220 has a substantially flat base plate 221 disposed substantially horizontal in the direction of the shell transporting direction shown by arrow A in FIGS. 56 and 57. The base plate 221, as shown in FIG. 57, possesses a base body 222 positioned upstream to the shell transporting direction shown by arrow A in FIG. 57, and a left/right pair of presser plates 223 extended parallel to each other, in a direction downstream to the shell transporting direction, from opposite ends, in a direction perpendicular to the shell transporting direction, of the rims positioned on the base body 222, downstream from the shell transporting direction.

The base main body 222 of the base plate 221, as shown in FIGS. 56 and 57, is mounted downstream to the shell transporting direction on the separation plate 55 of the shell separation means 8 via a hinge joint 224. The tip of the suppresser plate 223 of the base plate 221, as shown in FIG. 56, is extended downstream from the shell transporting direction towards the suction nozzle 58 of the internal organ separation means 9 and positioned on the lower part of the base main body 222. The vicinity of the tips of the suppresser plate 223 is positioned on the lower part of the shell suppresser 76 of the internal organ separation means 9. Both suppresser plates 223, as shown in FIG. 57, are forced in the direction of the shell loading plates 18 by a dead weight force from above the rim of the lower shells 2AB shown by the imaginary line in FIG. 57.

As shown in FIG. 56, the water supplying means 225 of the raw bivalve peeling-off apparatus 1G of the present embodiment has a means to supply food hygienically safe water (drinkable water) to the inner surface of the lower shells 2AB of the bivalves actually attached to the ligaments 2a used for eating raw scallops 2 from the bivalves, with a supply nozzle 226 mounted to the separation plate 55 of the shell separation means 8. The tips of the supply nozzle 226 are disposed in a direction opposite the inner surface of the lower shells 2AB. The supply nozzle 226 is connected to a desired hose 227 and the hose 227 is connected to a water supplying pipe 228, disposed perpendicular to the shell transporting direction shown by arrow A in FIG. 56, via a control valve 229 that opens and closes freely at a fixed timing. A fixed pressure of water W is supplied via a control valve (not shown) to a water supplying pipe 228 from a pump (not shown).

The composition of the raw bivalve peeling-off apparatus 1H of the present embodiment, can be as successful as the above-mentioned raw bivalve peeling-off apparatus 1 in the the first embodiment.

The floating away preventing means 220 of the raw bivalve peeling-off apparatus 1H of the present embodiment, at the separation state to separate the internal organs 2b, since the shell suppresser 76 of the internal organ separation means 9 can press the rim of the lower shells 2AB via the presser plate 223 of the floating away preventing means 220, returns the shell suppresser 76 of the internal organ separation means 9 to the stand-by state, and the lower shells 2AB put between the shell suppresser 19 and the shell loading plates 18 are attached to the shell presser 235 to prevent the lower shells 2AB from rising off the shell loading plates 18. The lower shells 2AB are reliably prevented from rising up by the suction to the shell suppresser 76, and can reliably prevent the misalignment of the lower shells 2AB loaded in the shell loading plates 18.

The lower shells 2AB separated from the upper shells 2AA at the shell separation means 8 are transported to the internal organ separating means 9 from the shell separating means 8 by the transporting/handling means 3, and since the rims can be forced from above from the supresser plate 223 in a direction perpendicular the shell transporting direction of the lower shells 2AB, posture control of the lower shells 2AB after separating from the upper shells 2AA can be performed.

The water supplying means 225 of the raw bivalve peeling-off apparatus 1H of the present invention opens and closes at a fixed timing of a control valve 229, and since it can supply water to the inner surface of the lower shells 2AB, the ligaments 2a, internal organs 2b, sand and the like foreign matter attached to the inner surface of the lower shells 2AB can be adequately soaked (accumulate with water in the inner surface of the lower shells 2AB) when separating the internal organs 2b at the internal organ separating means 9, can easily suction the water with the internal organs 2b and sand and the like foreign matter, and can improve the separation efficiency of the internal organs 2b. When suctioning and separating the internal organs 2b at the internal organ separating means 9, the ligaments 2a in actual contact with the inner surface of the lower shells 2AB and the internal organs 2 and sand and the like foreign matter attached to the ligaments 2a are dried, the internal organs 2b and sand and the like foreign matter become stuck in the inner surface of the lower shells 2AB and ligaments 2a, making it hard to separate the internal organs 2b and foreign matter from the ligaments 2a. With water adequately soaking the ligaments 2a, internal organs 2b, sand and the like foreign matter, it becomes easy to suction and separate the internal organs 2b with the sand and the like foreign matter from the ligaments 2a.

It is desirable to use a low temperature cold water when supplying water to the inner surface of the lower shells 2AB.

FIGS. 58 through 61 explain the tenth embodiment of the raw bivalve peeling-off apparatus of the present invention using the raw bivalve peeling-off method of the present invention.

The raw bivalve peeling-off apparatus 1I of the present embodiment has means to improve the heat transfer efficiency on the back surface of the lower shells 2AB at the before-separation heating means 10 of the raw bivalve peeling-off apparatus 1 in the first embodiment. The other compositions are comprised in the same manner as the above-mentioned raw bivalve peeling-off apparatus 1 in the first embodiment. Only the before-separation heating means 10A will be explained, explanations of the other compositions will be omitted. Also, a detailed explanation of similar reference characters in the drawings of similar and corresponding compositions in the above-mentioned embodiment will be omitted. The before-separation heating means 10 of the present embodiment was shown in the second embodiment of the raw bivalve peeling-off apparatus of the present invention, therefore an explanation of the raw bivalve peeling-off apparatus will be omitted.

Figure 58:
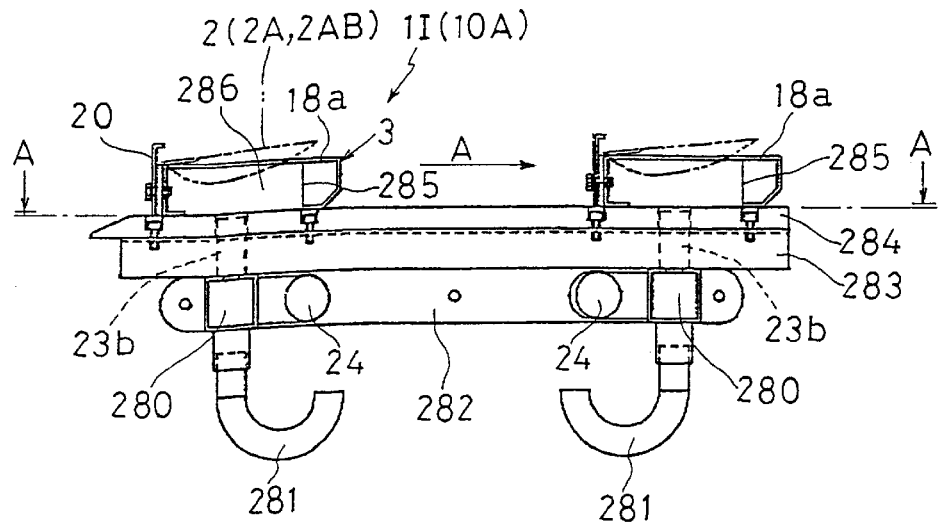
FIG. 58 is a front elevation of a part of second embodiment of the raw bivalve peeling-off apparatus of the present invention and the before-separation heating means in the tenth embodiment of the raw bivalve peeling-off apparatus of the present invention as it is used to separate raw bivalves.
Figure 59:
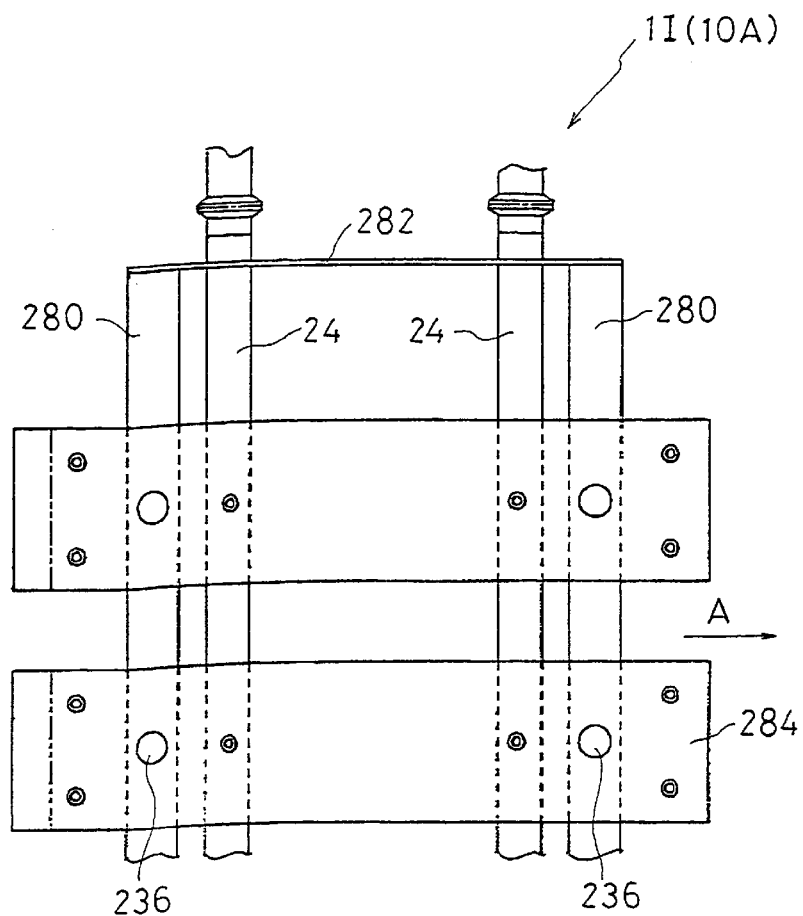
FIG. 59 is a top plan view along the A—A line in FIG. 58.
Figure 60:
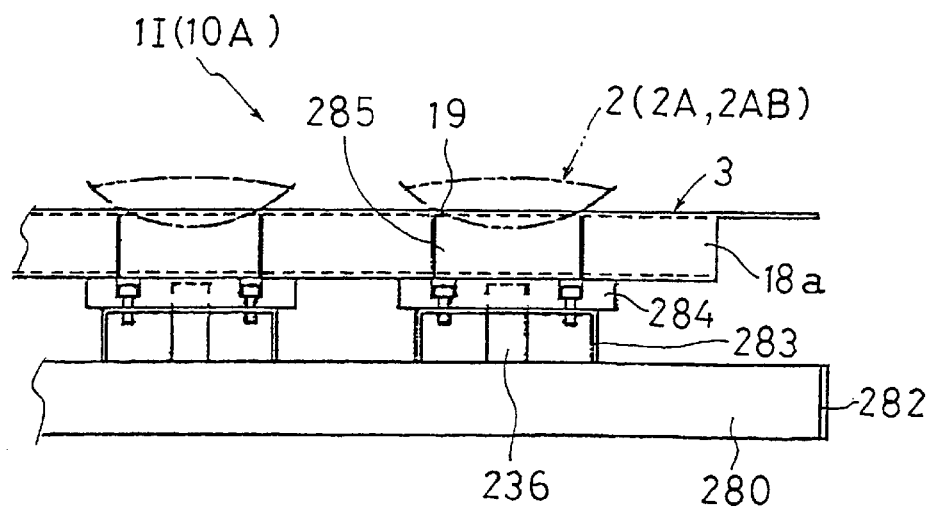
FIG. 60 is a side view of a part of the before-separation heating means in FIG. 58 as seen downstream of the shell transporting direction.

As shown in FIGS. 58 through 60, the before-separation heating means 10A of the raw bivalve peeling-off apparatus 1I of the present embodiment has tube-shaped steam ejection nozzles 23b as heat nozzles to eject steam H as a heating source in the direction of the back surface of the lower shells 2AB loaded and supported downwards in the shell loading plates 18. The steam ejection nozzles 23b are disposed suitably spaced two at a time for a total of 12 (only one part is shown in the figure) in a direction running along the shell transporting direction in parallel to the shell transporting direction shown by arrow A in FIG. 58, with the 6 pairs in a direction perpendicular to the shell transporting direction shown by arrow A in FIG. 58. Each steam ejection nozzle 23b, in rows perpendicular to the shell transporting direction shown by arrow A in FIG. 58, is established on a steam distribution pipe 280 disposed perpendicular to the shell transporting direction shown by arrow A in FIG. 58. The steam distribution tube 280 is connected to each steam supplying pipe 24 disposed in parallel with the steam distribution tube 280 perpendicular to the shell transporting direction shown by arrow A in FIG. 58. A drain 281 to discharge water accumulated in the inner part of the steam distribution tube 280 as required, is disposed in an appropriate position.

The steam distribution pipe 280 and steam supplying pipe 24, as shown in FIG. 59, are disposed with a pair of connection stays 282 to opposite ends in a direction perpendicular to the shell transporting direction shown by arrow A in FIG. 59. Steam H, via a control valve (not shown), is supplied by a pump (not shown) or the like at only fixed intervals.

As shown in FIGS. 58 through 60, the longitudinal part of the suction member 283 formed in an upside down U shape is mounted parallel to the shell transporting direction above the stean distribution pipe 280 and the steam supplying pipe 24. A sliding plate 284 formed, for example with a resin, in order to control the operating path of the shell loading plates 18 moving in the shell transporting direction, is mounted to the upper surface of the suction member 283, i.e., the shell loading plates 18 of the present embodiment can be moved while in actual contact with the upper surface of the sliding plate 284. A bevel to smoothly guide the upper part of the sliding plate 284 of the sliding plate 284 moving in the shell transporting direction is applied to the upper edge of the sliding plate 284 upstream to the shell traveling direction shown by arrow A in FIG. 59.

The steam ejection nozzles 23b to penetrate in a plate thickness-wise direction are each secured to the mounting plate 283 and the sliding plate 284. The tips of the steam ejection nozzles 23b are positioned in a number of low positions on the upper surface of the sliding plate 284 or otherwise positioned equally to the upper surface of the sliding plate 284.

Figure 61:
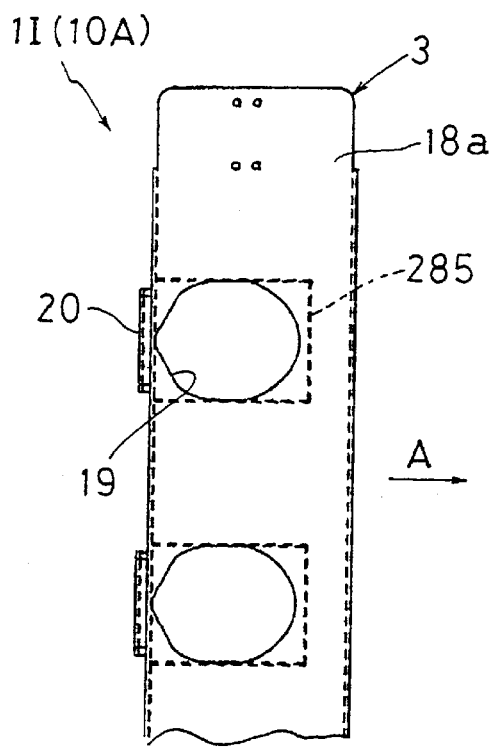
FIG. 61 is a side view showing a part of the shell loading plate used in the before-separation heating means in FIG. 58.

As shown in FIGS. 58, 60 and 61, the flat, sideways U shaped partitioning plates 285, in order to divide the shell loading plates 18a into flat square shapes to surround each shell securing bore 19 (FIG. 61) from below, are disposed on the shell loading plates 18a of the present embodiment.

I.e., as shown in FIG. 58, the shell loading plates 18a stop at the established position of the before-separation heating means 10A, and when heating the back surface of the lower shells 2AB on the shell loading plates 18a, partitioning plates 285 and sliding plates 282, can form a closed compartment 286 to at the least surround the back surface of the actual contact position of the ligaments 2a of the lower shells 2AB.

The raw bivalve peeling-off apparatus 1I of the present embodiment, can be as successful as the above-mentioned raw bivalve peeling-off apparatus 1 in the the first embodiment.

The before-separation heating means 10A of the raw bivalve peeling-off apparatus 1I of the present embodiment ejects a high temperature steam H as a heating source to the back surface of the lower shells 2AB, and since it can soak (maintain) the inner part of the closed compartment 286 with steam H, the heat transfering efficiency to the back surface of the lower shells 2AB can be improved. Steam H circulates to the inner surface from the back surface of the lower shells 2AB to soak the inner part of the closed compartment 286 with steam, and can prevent direct contact to the ligaments 2a actually contacting the inner surface of the lower shells 2AB.

A plurality (two) of steam ejection nozzles 23b of heating nozzles running along the shell transporting direction are established for multi-step heating, i.e., two steam ejection nozzles 23B of heat nozzles are established in appropriate spaces at the position of the stopped shell loading plates 18 along the shell transporting direction, a heating process 172 is comprised to repeat twice, for example, a heating process 172 to eject four seconds worth of 100° C. steam H is comprised to repeat a heating process 172 by ejecting 2 seconds worth of 100° C. steam H, and it is desirable to establish only 1 steam ejection nozzle 23b of heat nozzles along the shell transporting direction. Whether to have only 1 or a plurality of steam ejection nozzles 23b of heating nozzles along the shell transporting direction is best to be decided by considering the production area, the different body temperatures of the scallops 2 in different seasons, and the manufacturing tact. However, the composition of the before-separation heating means 10A of the present embodiment is not fixed. The composition to dispose steam ejection nozzles 23b in 2 locations along the shell transporting direction is done by lengthening the transporting/handling means 3 in the shell transporting direction, in detail, lengthen the distance between the starting position SP and the discharge position OP.

FIGS. 62 through 68 explain the eleventh embodiment of the raw bivalve peeling-off apparatus of the present invention using the raw bivalve peeling-off method of the present invention.

The raw bivalve peeling-off apparatus 1J of the present embodiment has a means to improve the separation efficiency of the ligaments 2a by an adductor muscle separation means 1I of the raw bivalve peeling-off apparatus 1 of the first embodiment. The other compositions are comprised in the same manner as the above-mentioned raw bivalve peeling-off apparatus 1 in the first embodiment. Only the adductor muscle separation means 11A of the raw bivalve peeling-off apparatus 1J of the present embodiment will be explained, explanations of the other compositions will be omitted. Also, a detailed explanation of similar reference characters in the drawings of similar and corresponding compositions in the above-mentioned embodiment will be omitted.

Figure 62:
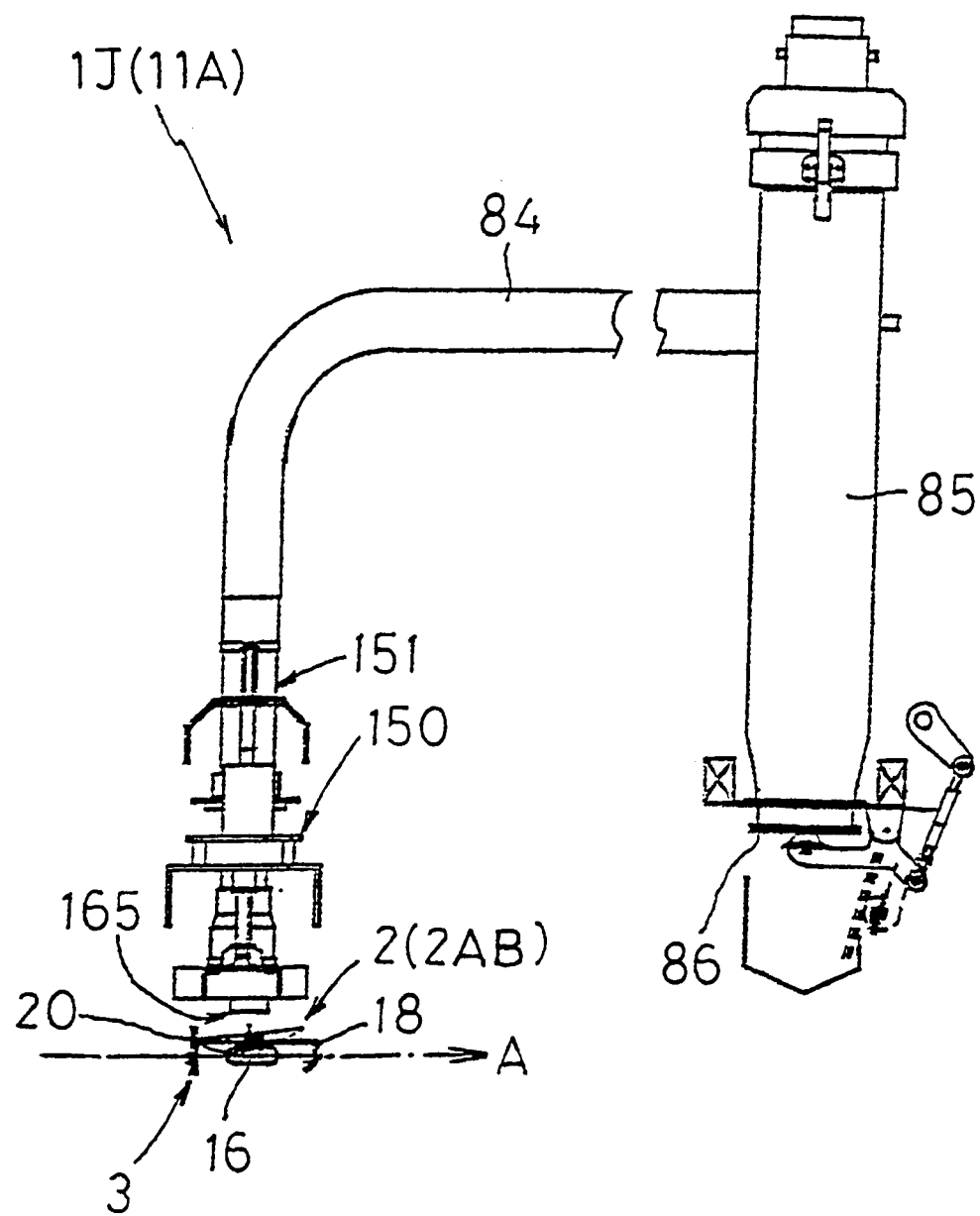
FIG. 62 is a front elevation of a part of the stand-by state of the adductor muscle separation means to separate the edible parts in the eleventh embodiment of the raw bivalve peeling-off apparatus of the present invention as it is used to separate raw bivalves.
Figure 63:
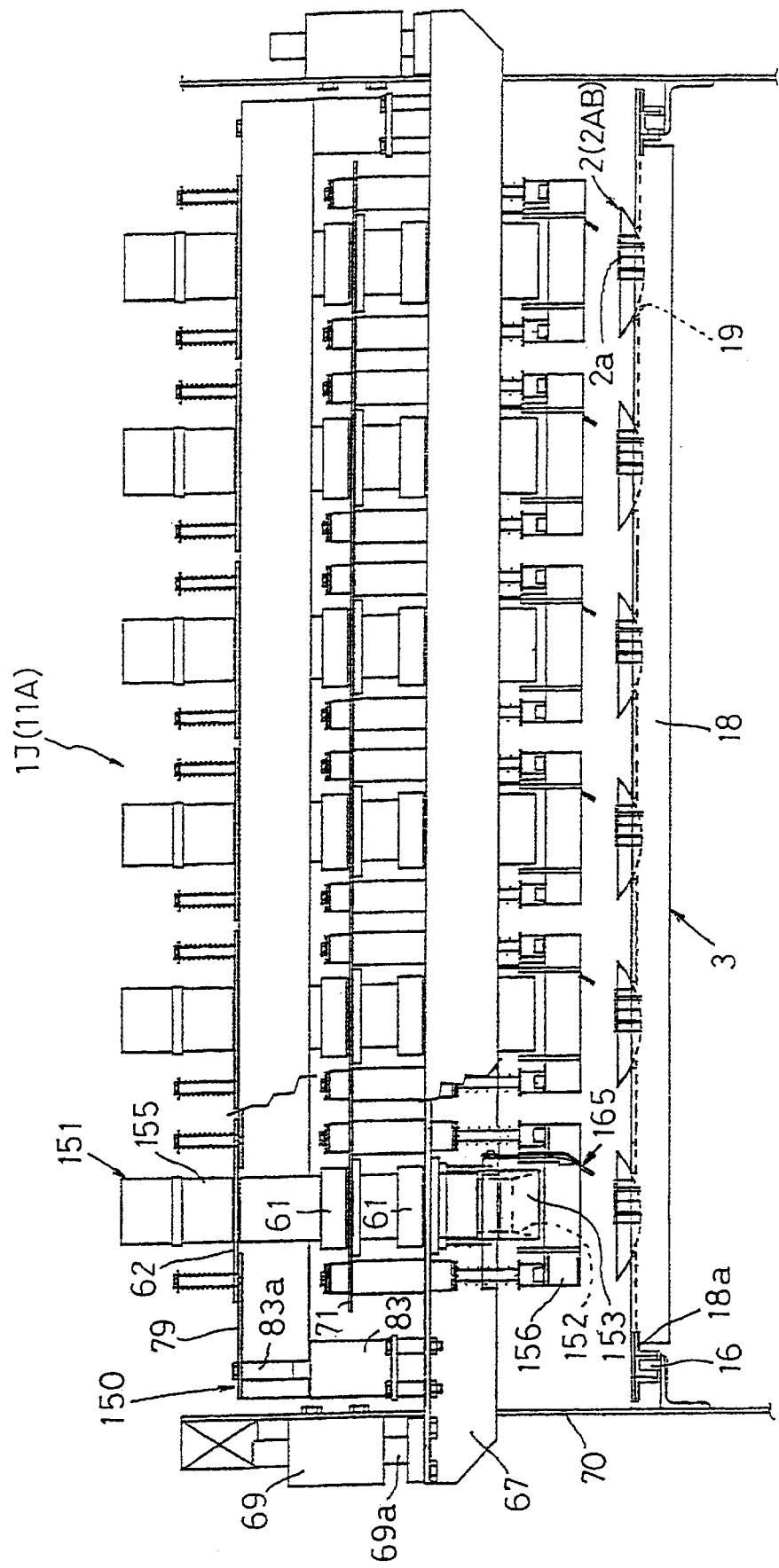
FIG. 63 is a side view of a part of the shell separation means in FIG. 62 as seen downstream of the shell transporting direction.

As shown in FIG. 62, adductor muscle separation means 11A as an edible part separation means of the raw bivalve peeling-off apparatus 1J of the present invention has a separation body 150 to separate (suction and remove) and peel-off to suction by using negative pressure on the ligaments 2a attached to the lower shells 2AB of the scallops 2. The separation body 150 has suction nozzles 151 to separate (suction and remove) and peel-off the ligaments 2a attached to the lower shells 2AB of the scallops 2 from the lower shells 2AB using by suction using negative pressure. The suction nozzles 151, as shown in FIG. 63, are disposed in an array in a direction perpendicular to the shell transporting direction shown by arrow A in FIG. 62, opposite the inner surface of the lower shells 2AB of each scallop 2.

Figure 64:
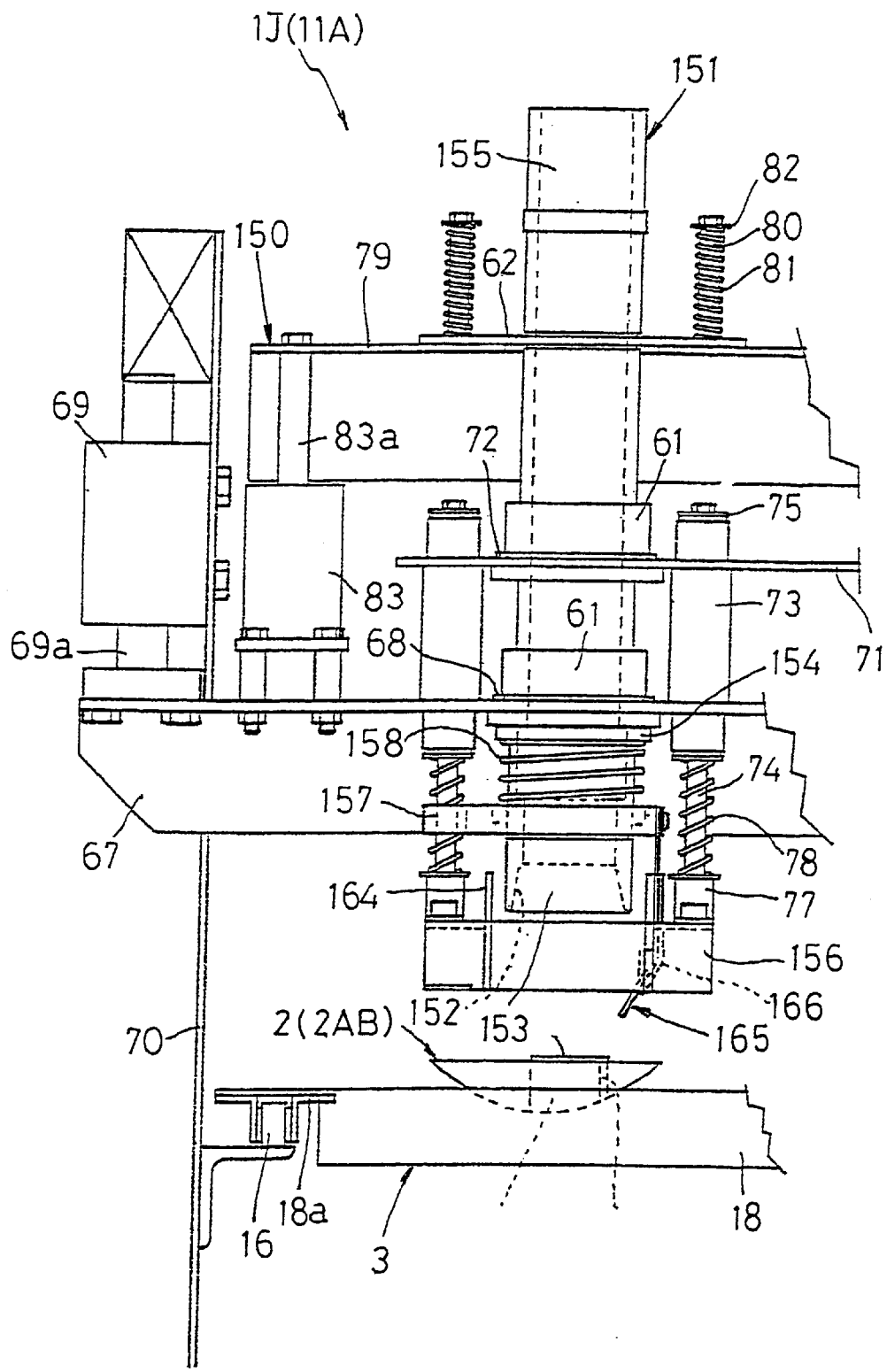
FIG. 64 is a partially expanded side view of the shell separating means in FIG. 63.
Figure 65:
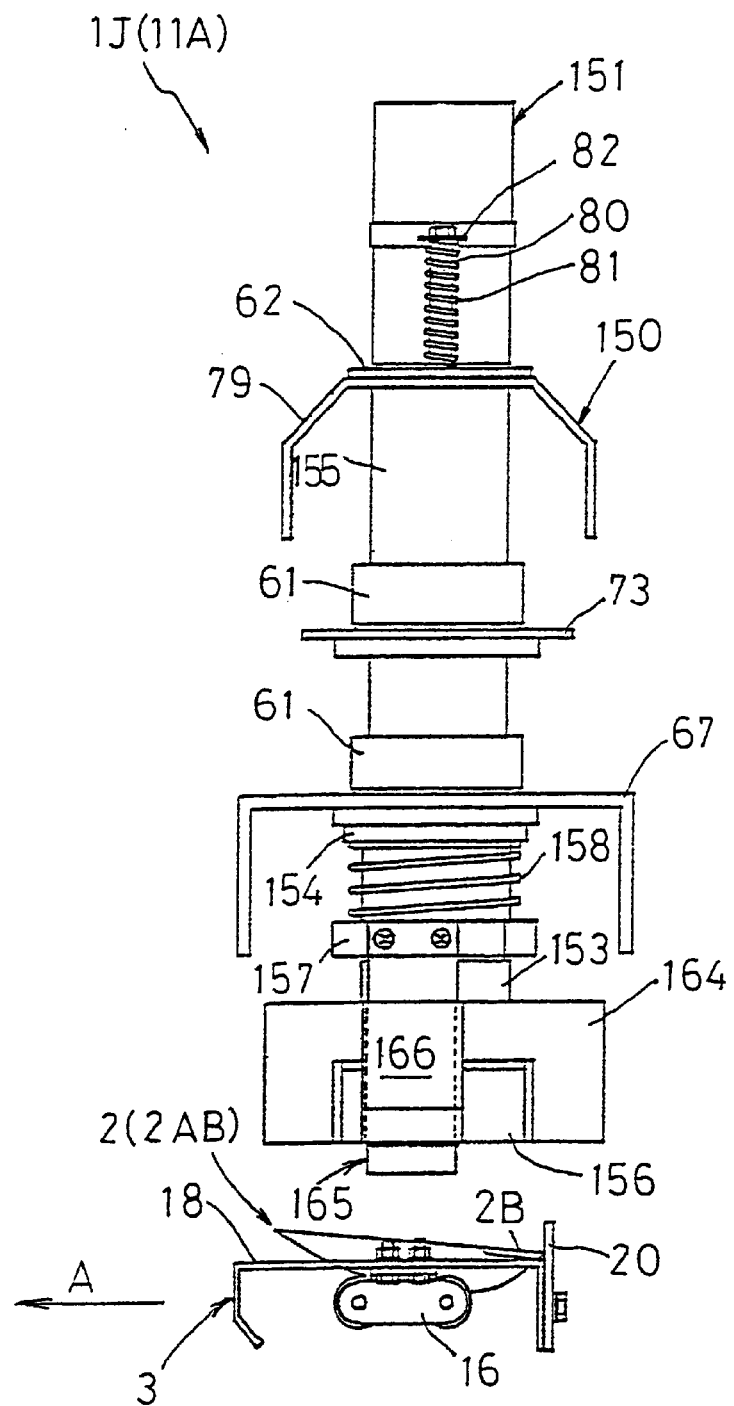
FIG. 65 is a partially expanded rear view of a part of the shell separation means in FIG. 62.

As shown in FIGS. 64 and 65, each suction nozzle 151, are formed substantially cylindrically. The lower end with tips opposite the inner surface of the lower shells 2AB shown in the lower part of FIGS. 64 and 65, contact and separate opposite the lower shells with a nozzle part 153 formed by the suction bore 152 with an inner diameter larger than the outer diameter of the ligaments 2a of the scallops 2. A flange 154 is mounted to the outer periphery of the upper part of the nozzle part 153. The upper part of the suction nozzles 151 are secured to slide freely in the axis direction of each cylindrically formed sliding ring 61, in two locations on the substantially central portion of the axis and on the lower part of the outer periphery of the base main body 155, to the base main body 155 formed substantially cylindrically. A stop ring 63 (not shown) of a flat plate 62 is mounted to the upper part of the outer periphery of the base main body 155. One end of an adductor muscle transporting hose 84, as shown in FIG. 62, is connected to the upper end of the base main body 155.

It is desirable to comprise to continuously supply negative pressure to the adductor muscle transporting hose 84 when driving the apparatus.

Also, the size of the suction bore 152 of the suction nozzles 151 are based on the large and small sizes of the ligaments 2a of the scallops 2 selected by the scallop selecting machine (not shown).

As shown in FIGS. 63 and 64, the tips of the output shaft 69a of the lower frame driving cylinder 69 (reciprocating cylinder) are mounted to the tip of the lower frame 67. The output shaft 69*a* of the lower frame driving cylinder 69 is mounted downwards on the outer side of the side frame 70 disposed on the outer side of the chain conveyor 16.

The shell suppressers 156 formed substantially well-shaped to press the rims of the lower shells 2AB from above, are mounted via a mounting member 77 to a pair of sliding rods 74 adjoining each suction nozzle 151. The central portion of the shell suppressers 156 are formed larger than the outer diameter of the nozzle part 153 of the suction nozzles 151. The sliding rods 74 are forced continuously downwards by the force from the compression coil spring 78, and the shell suppressers 156 are made to actually contact the rim of the lower shells 2AB by the force of the compression coil spring 78.

It is desirable to form a material, for example, a resin or a rubber or the like elastic at the actual contact portion with the lower shells 2AB and at the least the shell suppressers 156 to not damage the lower shells 2AB in the case of actual contact with the lower shells 2AB.

Figure 66:
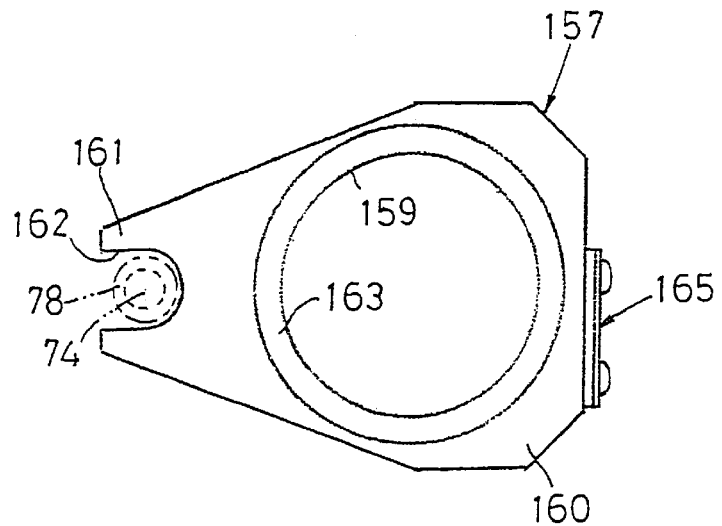
FIG. 66 is an expanded side view showing the mounting state of the separator plate in FIG. 62.

As shown in FIGS. 64 and 65, a bracket 157 is disposed to slide freely on the outer periphery of the nozzle part 153 of the suction nozzles 151. The bracket 157 is supported by the compression coil spring 158 disposed on the upper part of the outer periphery of the nozzle part 153 of the suction nozzles 151. The bracket 157, as shown in detail in FIG. 66, has a base 160 with an inner bore 159 penetrating a substantially flat plate in a thickness-wise direction fits over the outer periphery of the nozzle part 153 of the suction nozzles 151, and a tip 161 extended to the felt of the base 160 as shown in FIG. 66. A flat substantially U-shaped groove 162 penetrating and fitting over in a plate thickness-wise direction on the outer periphery of the compression coil spring 78 fitted to the outer periphery of the sliding rods 74 positioned to the left, as in FIG. 64, to stop the rotation of the bracket 157, is mounted to the tip 161.

As shown in FIG. 67, the lower end of the compression coil spring 158 fitted to the outer periphery of the nozzle part 153 of the suction nozzles 151 is mounted to the upper part of the inner bore 159 of the base body 160 of the bracket 157. A receivable grooved cavity 163 is formed to the contracted compression coil spring 158, the most contracted direction of the compression coil spring 158, i.e., in the case of actual contact to the lower surface of the flange 154 of the suction nozzles 151 to the upper surface of the bracket 157. The upper end of the compression coil spring 158 is mounted to the lower surface of the flange 154 of the nozzle part 153 of the suction nozzles 151, and the lower end of the compression coil spring 158 is mounted to the low end of the grooved cavity 163 formed to the base body 160 of the bracket 157. The bracket 157 is forced to near contact with the lower shells 2AB by the force of the compression coil spring 158 on the outer periphery of the nozzle part 153 of the suction nozzles 151, and can rise and fall to drive the suction nozzles 151. The most lowered position of the bracket 157 is restricted by the positioning plate 164 disposed on the shell suppressers 156 shown in detail in FIG. 67.

As shown in FIGS. 64 through 67, A peeling-off plate 165, with a flexibly formed knife, edged tool or a spatula-shaped tool to forcibly peel-off (separate) at the least one part of the attached portion of the ligaments 2*a* and the lower shells 2AB heated by the before-separation heating means 10, is mounted to the side of the base body 160 of the bracket 157. The peeling-off plate 165, for example a stainless steel made one, is disposed downwards on the rim tips opposite the inner surface of the lower shells 2AB. The peeling-off plate 165 is disposed in a substantially sideways V shape pointing left on the guide plate 166 disposed on the shell suppressers 156, drives the rising and falling operation of the bracket 157, and can contact and separate with the lower shells 2AB. The established position of the tips of the peeling-off plate 165, as shown in FIG. 64, at the outer side of the circumference of the adductor muscle 2*aa* and the shell hinge ligament 2*ab* making up the ligaments 2*a*, can be positioned upwards on the outer side of the shell hinge ligaments 2*ab*.

As shown in FIGS. 63 and 64, the tips of the output shaft 83*a* of the upper frame driving cylinder 83 (reciprocating cylinder) are mounted to the opposite ends of the upper frame 79. The output shaft 83*a* of the upper frame driving cylinder 83, as shown in FIG. 64, is mounted upwards in the vicinity of the opposite ends of the upper frame 79.

I.e., the output shaft 69*a* of the lower frame driving cylinder 69 rises and falls on the lower frame 67 in an upwards and downwards direction, as in FIGS. 64 and 65, to drive the lower frame driving cylinder 69. The rising and falling action of the lower frame 67 raises and lowers the entire separation body 150 in an upwards and downwards direction, which raises and lowers the shell suppressers 156 to contact and separate from opposite the lower shells 2AB.

The output shaft 83*a* of the upper frame driving cylinder 83 raises and lowers the upper frame 79 in an upwards and downwards direction, as shown in FIGS. 64 and 65, to drive the upper frame driving cylinder 83. The rising and falling action of the upper frame 79 is transfered to the suction nozzles 151 via the plate 62, and raises and lowers the suction bores 152 of the suction nozzles 151 to contact and separate opposite the ligaments 2*a*, and can rise and fall to contact and separate the rim of the peeling-off plate 165 opposite the inner surface of the lower shells 2AB. At this time, the peeling-off plate can have a rising and falling action to drive the rising and falling operation of the suction nozzles 151.

The utilization of the adductor muscle separation means 11A of the present embodiment from the above-mentioned composition will be further discussed.

The shell loading plates 18,. loaded with lower shells 2AB with the edible parts of ligaments 2*a* on the heated inner surface of lower shells 2AB from the before-separation heating means 10, are transported in the shell transporting direction shown by arrow A in FIG. 1 by the transporting/handling means 3 and stop at the established position of the adductor muscle separation means 11A of the present embodiment. Within the period of being stopped the edible part separating process 177A is performed.

In the above-mentioned supply process 170, scallops 2 are secured and supported by the lower shells 2AB to the shell securing bores 19 of the shell loading plates 18. The hinge joint 2B of the scallops 2 are loaded in the shell loading plates 18 in actual contact with the stopper 20. The hinge joint 2B in actual contact with the stopper 20 can be reliably positioned to the peeling-off plate 165 of the shell hinge ligament 2*ab* of the ligaments 2*a*.

Then, according to the edible part separating process 177A of the adductor muscle separation means 11A of the present embodiment, the shell loading plates 18 stop the ligaments 2*a* attached to the inner surface of the lower shells 2AB at the separation body 150 in the stand-by state of the adductor muscle separation means 11A, i.e., at a position opposite the suction bore 152 of the suction nozzles 151. The separation body 150, in the stand-by state, as shown in FIG. 64, positions the output shaft 69*a* of the lower frame driving cylinder 69 at the retreating (contracted) retreated end (upper end), each part of the separation body 150 is positioned at the raided up end, the most separated from the shell loading plates 18, on the output shaft 83a of the upper frame driving cylinder 83. The output shaft 83a of the upper frame driving cylinder 83 positions the advanced forward (extended) advanced forward end (upper part), and the suction bore 152 of the suction nozzles 151 are positioned with the rising end the most separated from the shell loading plates 18, at the separated state upwards on the shell suppresser 152, on the output shaft 83a of the upper frame driving cylinder 83.

The shell loading plates 18 stop at the established position of the separation body 150, the lower frame driving cylinder 69 drives at a fixed timing, the output shaft 69a of the lower frame driving cylinder 69 extends and advances forward, and lowers in a downwards direction on the lower frame 67 as shown in FIG. 64. The lowering of the lower frame 67 lowers the separation body 150.

The shell suppressor 156 actually contacts the rim of the lower shells 2AB before the advanced forward end of the output shaft 69a of the lower frame driving cylinder 69, i.e., the separation body 150 arrives at the falling end. The falling shell suppressor ring 116 stops at the actual contact position of the rim of the lower shells 2AB. The tips of the rim of the peeling-off plate 165 actually contacts the inner surface of the lower shells 2AB. The lowering peeling-off plate 165 stops at the position in actual contact with the inner surface of the lower shells 2AB.

The shell suppressor ring 116 suppresses the rim of the lower shells 2AB by a force of the compression coil spring 78 fitted on the outer periphery of the lower part of the sliding rod 74, and the advanced forward end of the output shaft 69a of the lower frame driving cylinder 69, i.e., the separation body 150 arrives at the falling end. The result is the lower shells 2AB are squeezed by the force of the compression coil spring 78 and fixed between shell suppresser 156 and the shell loading plates 18. Since the shell suppresser 156 is in actual contact with the lower shells 2AB by a force of a compression coil spring 78 in exchange for excessive force on the lower shells 2AB, it can reliably prevent damage to the lower shells 2AB.

I.e., the lower frame driving cylinder 69 of the present embodiment contacts and separates the separation body 150 opposite the lower shells 2AB, and has a function to fix the lower shells 2AB between the shell loading plates 18 and the shell suppressor 156 when the output shaft 69a of the lower frame driving cylinder 69 arrives at the advanced forward tip.

The output shaft 69a of the lower frame driving cylinder 69 arrives at the advanced forward tip, and, by a sensor (not shown), the arrival of the output shaft 69a of the lower frame driving cylinder 69 arrives at the advanced forward tip is detected. Based on the detection signal, the upper frame driving cylinder 83 drives, the output shaft 83a of the upper frame driving cylinder 83 contracts and retreats, and falls in a downward direction on the upper frame as shown in FIG. 64. The falling of the upper frame 79 lowers the suction nozzle 151 via the plate 62.

The bracket 157 driving the lowering of the suction nozzles 151 lowers, and the lowering of the bracket 157 lowers the peeling-off plate 165. The tips of the rim of the peeling-off plate 165 drive towards the center along the inner surface of the lower shells 2AB, with one part in actual contact with the ligaments 2a and the lower shells 2AB, i.e., it can apply pressure in a direction substantially perpendicular (the inner side to the outer side of the circumference of the ligaments 2a) to the direction of actual contact from the outer side of the actual contact position of the shell hinge ligament 2ab and the lower shells 2AB.

Figure 68:
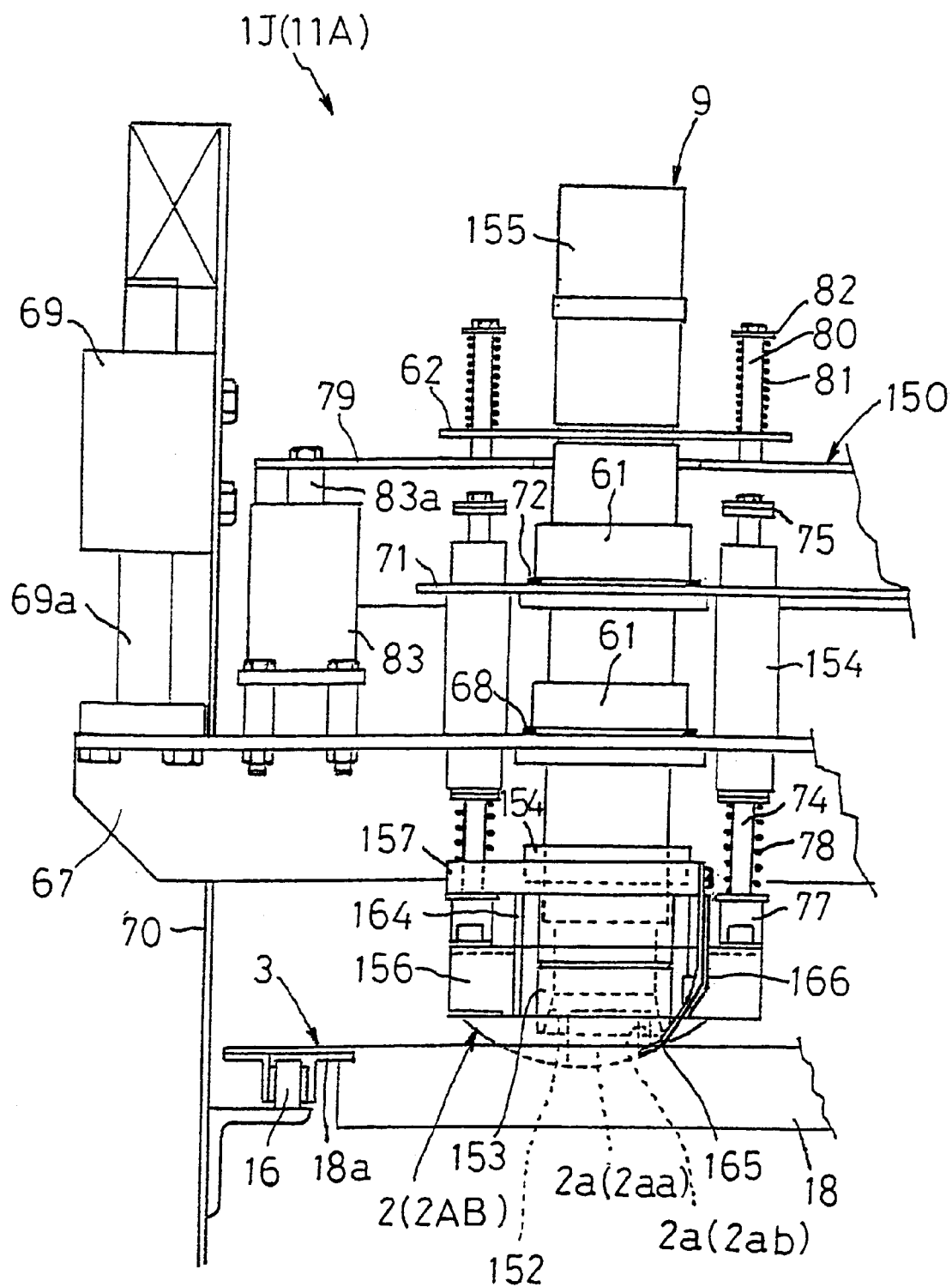
FIG. 68 shows in the same way as FIG. 64, the removal ending state when removal has ended in the separator plate in FIG. 62.

Before the advanced forward end of the output shaft 83a of the lower frame driving cylinder 83, i.e., the upper frame 79, arrives at the falling end, the bracket 157 for driving and lowering the suction nozzles 151 actually contacts the upper end of the positioning plate 164 disposed on the shell suppresser 156. The lowering of the bracket 157 stops at the position of actual contact with the upper end of the positioning plate 164 disposed on the shell suppresser 156, and the movement of the tips of the rim of the peeling-off plate 165 also stops. The movement of the peeling-off plate 165 completes the movement completion state as shown in FIG. 68.

Since the fitting together force between the ligaments 2a and the lower shells 2AB is in a simple adhesive state and weakened by the heating on the back surface of the lower shells 2AB at the before-separation heating means 10 to maintain the raw state of the ligaments 2a, the peeling-off plate 165 on the end of the ligaments 2a moves (presses) in actual contact with the actual contact portion of the shell hinge ligament 2ab (the lower part of the lining of the shell hinge ligament 2ab) attached to the lower shells 2AB, and the entire ligament 2a can be simply peeled-off (separated) from the lower shells 2AB.

I.e., the easy to peel-off actual contact portion in the adhesion state of the lower shells 2AB and the ligaments 2a remaining in the lower shells 2AB heated by the before-separation heating means 10, in exchange for a force on the shell hinge ligament 2ab in a perpendicular direction, and before the movement of the peeling-off plate 164 is completed, the peeling-off plate 165 can simply peel-off the ligaments 2a from the lower shells 2AB. The lower part of the side surface of the surrounding lining of the shell hinge ligament 2ab is pressed on one part of the ligaments 2a, and can simply separate the entire ligament 2a from the lower shells 2AB.

The action of the peeling-off plate 165 is to forcibly peel-off the actual contact portion of the ligaments 2a and the lower shells 2AB when separating the ligaments 2a. It is desirable to comprise the peeling-off plate 165 of the present embodiment to press the side surface (sideways) of the surrounding lining of the shell hinge ligament 2ab of the ligaments 2a.

The output shaft 83a of the upper frame driving cylinder 83 lowers, and actually contacts the upper surface of the bracket 157 with the lower surface of the flange 154 of the suction nozzles 151, the lowering of the suction nozzles 151 commencing the separation of the upper frame 79 and the plate 62 stops, and the suction bore 152 of the suction nozzles 151 fitting over the ligaments 2a, i.e., to surround and cover the ligaments 2a without actually contacting the lower shells 2AB.

The advanced forward end of the output shaft 83a of the upper frame driving cylinder 83, i.e., the upper frame 67, arrives at the falling end, and by a sensor not shown, the arrival of the advanced forward end of the output shaft 83a of the upper frame driving cylinder 83 is detected, and based on the detection signal negative pressure is supplied to the suction nozzles 151 via the adductor muscle transporting hose 84. The suction nozzles 151 suction air positioned on the lower part of the tip of the suction bore 152 to the inner part of the suction nozzle 151 via the suction bore 152. The result is the ligaments 2a are peeled-of from the lower shells 2AB by the peeling-off plate 165 to the inner part of the suction nozzles 151 passing through the suction bore 152.

I.e., at the least pressing the shell hinge ligaments 2ab that are hard to peel-off from the lower shells 2AB with the peeling-off plate 165, peels-off and separates the entire ligaments 2a from the lower shells 2AB, suctions the ligaments 2a with negative pressure by the suction nozzles 151, and when simply suctioning and separating the ligaments 2a from the lower shells 2AB by the suction nozzles 151, the adhesive force of the adhering portion of the ligaments 2a and the lower shells 2AB attributed to variances in position reliably prevents damage to the yielded ligaments 2a previously suctioned at the weakened adhesive force, and can efficiently and reliably separate the ligaments 2a from the lower shells 2AB.

The ligaments suctioned to the inner part of the suction nozzles 151 pass through the adductor muscle transporting hose 84 and are transported to the chamber 85.

The separation of the ligaments 2a is completed, supply of negative pressure to the adductor muscle transporting hose 84 stops, the upper frame driving cylinder 83 and the lower frame driving cylinder 69 reverse operation in that order, and the separation body 150 returns to the stand-by state. The separation body 150 returns to the stand-by state and, the transporting/handling means 3 drives, and next the shell loading plates 18 loaded with lower shells 2AB to separate the ligaments 2a are transported to the established position of the separation body 150 in the stand-by state, and then the shell loading plates 18 loaded with lower shells 2AB to separate the ligaments 2a are transported in the direction of the discharge position OP to separate from the adductor muscle separation means 11A.

Accordingly, the raw bivalve peeling-off apparatus 1J of the present embodiment, can be as successful as the above-mentioned raw bivalve peeling-off apparatus 1 in the the first embodiment.

According to the adductor muscle separation means 11A of the raw bivalve peeling-off apparatus 1J of the present embodiment, can improve the separation efficiency of the ligaments 2a, and can reliably improve the yield of high commercially priced ligaments 2a.

Although it is not necessary to comprise to continuously supply negative pressure to the adductor muscle transporting hose 84 when driving the apparatus, comprise to selectively supply negative pressure or positive pressure to the adductor muscle transporting hose 84 or control the supply timing, they are simply to do on this apparatus.

The adductor muscle separation means 11A of the present embodiment uses the adductor muscle separation means of the existing raw bivalve peeling-off apparatus, and has a function to be used as an adductor muscle separating apparatus to simply separate the ligaments 2a.

The present invention is not limited to the compositions of the above-mentioned embodiments, but it is desirable to use the compositions of each part of each embodiment together as a whole.

The present invention is not limited to the compositions of the above-mentioned embodiments, and it is possible to make changes as necessary.

According to the bivalve peeling-off method and apparatus, as well as the before-separation heating apparatus, of the present invention, it is successful in the effect with the advantages of efficiently separating a high yield and maintaining the quality from the high quality and high commercially priced adductor muscles from bivalves to be used for raw eating.

What is claimed is:

1. A bivalve peeling-off method, comprising heating a starting bivalve enough to gel a connecting portion of an edible part to the shell, but limiting the degree and duration of heat application so that the edible part is maintained in a raw state, and the bivalve remains closed.

2. A bivalve peeling-off method according to claim 1, wherein the surface of the shell having the edible part adhered thereto is heated before separation of said edible part from said starting bivalve, so that said edible part of the starting bivalve is maintained in the raw state, and so that said connected portion of said edible part to the shell is gelled.

3. A bivalve peeling-off method comprising heating a starting bivalve enough to gel a connecting portion of an edible part to the shell, but limiting the degree and duration of heat application so that the edible part is maintained in a raw state, and the bivalve remains closed, forcibly opening each of shells of the heated bivalve, and separating said edible part from the shells of said bivalve.

4. A bivalve peeling-off method, comprising heating a starting bivalve enough to gel a connecting portion of an edible part to the shell, but limiting the decree and duration of heat application so that the edible part is maintained in a raw state, and the bivalve remains closed; forcibly opening each of shells of the heated bivalve; separating said one heated shell; separating a non-edible part other than the edible part from the other shell after separation of said one shell, thereby leaving said edible part in the other shell; heating the surface of the other shell, so that said edible part in the other shell is maintained in the raw state, and so that the connected portion of said edible part to the shell is gelled; and separating said edible part from the other heated shell.

5. A bivalve peeling-off apparatus, comprising a means for steam heating a starting bivalve enough to gel a connecting portion of an edible part to the shell, but limiting the degree and duration of heat application so that the edible part is maintained in a raw state.

6. A bivalve peeling-off apparatus according to claim 5, wherein said heating means heats said starting bivalve enough to gel a connecting portion of said edible part to said shell, but limits the degree and duration of heat application so that the bivalve remains closed.

7. A bivalve peeling-off apparatus according to claim 6, wherein said heating means heats the surface of said one shell of said starting bivalve, so that said edible part in said starting bivalve is not discolored.

8. A bivalve peeling-off apparatus according to claim 7, wherein said heating means uses steam as a heating source.

9. A bivalve peeling-off apparatus according to claim 7, wherein said heating means uses warmed water as a heating source.

10. A bivalve peeling-off apparatus according to claim 9, wherein said heating means has a heating nozzle for heating the surface of said one shell of said starting bivalve.

11. A bivalve peeling-off apparatus according to claim 10, wherein said heating means has a plurality of nozzles for heating the surface of said one shell of said starting bivalve in a multi-stage manner.

12. A bivalve peeling-off apparatus according to claim 11, wherein said heating means is provided at its tip end with a cap which is capable of abutting against the surface of said one shell of said starting bivalve to surround said surface at a location in which said edible part is connected.

13. A bivalve peeling-off apparatus according to claim 12, further including a transporting/handling means for transporting the starting bivalves in a supporting manner, and a bivalve positioning means for positioning the starting bivalves supported by said transporting/handling means.

14. A bivalve peeling-off apparatus according to claim 13, further including a forcibly opening means for forcibly opening the shells of said bivalve.

15. A bivalve peeling-off apparatus according to claim 14, wherein said forcibly opening means includes a pair of suction pads formed to suck the shells of the starting bivalve with a negative pressure, and a pad driving means for operating the pair of pads so that the mouth of the starting bivalve is opened.

16. A bivalve peeling-off apparatus according to claim 15, wherein at least a portion of said suction pad which is adapted to abut against the shell is formed from a styrene-based thermoplastic resin.

17. A bivalve peeling-off apparatus according to claim 16, wherein said forcibly opening means is provided with a water removing means.

18. A bivalve peeling-off apparatus comprising,
a. means for heating one shell surface of a starting bivalve, so that an edible part in said bivalve remains raw, is not discolored, and the mouth of said bivalve remains closed,
   said heating means, using warm water as a heating source, has at least one nozzle with a tip end, having a cap, capable of abutting against the half-shell surface to surround the half-shell surface at a location where said edible Part is connected,
b. a means for transporting and handling the bivalves in a supporting manner,
c. a means for positioning the bivalves supported by said transporting and handling means,
d. a means for forcibly opening the shells of said bivalve, said forcibly opening means includes a pair of suction pads formed to suck the shells of the bivalve with a negative pressure, a pad driving means for operating the pair of pads so that the mouth of the starting bivalve is opened, and a water removing means,
   wherein at least a portion of said suction pad is adapted to abut against the shell and is formed from a styrene-based thermoplastic resin,
   wherein said water removing means includes a switching valve for selectively switching any one of the negative and positive pressures for the suction pads to apply the switched pressure to the suction pads, and an air filter having a discharge valve disposed between said switching valve and said suction pads to capture liquid flowing from said suction pads toward said switching valve, and to discharge the captured liquid to the outside, when a positive pressure is applied.

19. A bivalve peeling-off apparatus according to claim 18, further including a shell separating means for removing one of the shells from the opened bivalve in such a manner that the shell with the edible part bonded thereto is left.

20. A bivalve peeling-off apparatus according to claim 19, further including a water supply means for supplying water to the inner surface of the shell of the starting bivalve having said edible part bonded thereto.

21. A bivalve peeling-off apparatus according to claim 20, further including a non-edible part separating means for separating a non-edible part other than said edible part from the shell of the opened bivalve.

22. A bivalve peeling-off apparatus according to claim 21, wherein said non-edible part separating means includes a suction nozzle which has a suction bore having an inside diameter larger than the outside diameter of said edible part and to which a negative pressure can be applied, and a nozzle-moving means for moving the tip end of the suction nozzle to and from the inner surface of the shell having the edible part adhered thereto.

23. A bivalve peeling-off apparatus according to claim 22, further including a nozzle-vibrating means for vibrating the suction nozzle, so that said suction nozzle is moved to and from the inner surface of the shell having the edible part adhered thereto.

24. A bivalve peeling-off apparatus according to claim 21, wherein said non-edible part separating means includes a suction member that has a suction plate for separating the non-edible part, said suction plate being mounted to the tip end of said suction nozzle to which a negative pressure can be applied, a recess into which said edible part is loosely fitted, and a suction bore defined in a bottom wall of said recess adjacent its outer periphery for permitting the communication between said recess and said suction nozzle; and a rotating means for rotating at least one of said suction member and said shell having the edible part adhered thereto, so that said suction bore in said suction member is rotated in a circumferential direction of said edible part outside the outer periphery of the edible part adhered to the shell.

25. A bivalve peeling-off apparatus according to claim 21, wherein said non-edible part separating means is constructed so that the bottom wall of said recess in said suction plate is capable of abutting against the upper surface of said edible part in separating said non-edible part.

26. A bivalve peeling-off apparatus according to claim 21, wherein said non-edible part separating means includes
   a suction nozzle to which a negative pressure is applied;
   a suction member including a suction nozzle a case secured to the tip end of said suction nozzle, a suction bore provided in said case to communicate with the inside of said suction nozzle for sucking a portion of the non-edible part other than the edible part in a direction to move said non-edible part from the inner surface of the shell having the edible part bonded thereto, when a negative pressure is applied to the inside of said suction nozzle, and a suction bore opening/closing means disposed within the case for opening and closing the suction bore, so as to selectively switch a passable state in which the sucked non-edible part can pass through the suction bore without damaging the negative pressure applied to the suction bore when the negative pressure is applied to the suction nozzle, and a non-passable state in which the sucked non-edible part is stopped at the suction bore; and
   a moving means for moving said suction nozzle and at least one of said suction member and said shell, so that said suction nozzle and said suction member are moved along the surface of said edible part.

27. A bivalve peeling-off apparatus according to claim 26 further including a floatation preventing means for preventing the floatation of the shell when the non-edible part other than said edible part is separated from the shell having said edible part bonded thereto.

28. A bivalve peeling-off apparatus according to claim 27, further including a before-separation heating means for heating the surface of the shell of the opened starting bivalve having the edible part bonded thereto, so that said edible part in said starting bivalve is maintained in a raw state.

29. A bivalve peeling-off apparatus according to claim 28, wherein said before-separation heating means is a before-separation heating device according to one of claims 28 to 34.

30. A bivalve peeling-off apparatus according to claim 28 further including an edible part separating means for separating an edible part from the shells of the starting bivalve opened.

31. A bivalve peeling-off apparatus according to claim 30, wherein said edible part separating means includes a suction nozzle, to which a negative pressure can be applied, for sucking the edible part adhered to shells, and a peeling-off plate for forcibly peeling off at least a portion of the edible part adhered to the shells.

32. A bivalve peeling-off apparatus according to claim 31, wherein said edible part separating means includes a damage-preventing member for preventing the edible part separated from the shells from being damaged.

33. A bivalve peeling-off apparatus comprising
  a. a heating means for heating the surface of one of the shells so that the connecting part of the bivalve is gelled but the edible part remains raw,
  b. a shell cleansing means for cleansing the surface of the shell of a starting bivalve,
  c. a transporting/handling means and a starting bivalve positioning means, transporting the bivalve through the apparatus, handling and positioning it as required,
  d. a forcible shell-opening means to open the shell,
  e. a shell separating means to remove one of the shells, leaving the other shell and contents in place,
  f. a water supplying means for supplying water to the inner surface of the shell having the edible part still bonded thereto,
  g. a non-edible part separating means to separate the non-edible part so that it can be disposed of,
  h. a flotation preventing means, preventing the floating of the shell when the non-edible part is removed,
  i. a before-separation heating means to heat the surface of the shell in such a way that the edible part remains in a raw state, and
  j. an edible part separating means for separating the edible part from the open shell to which it is attached.

34. A bivalve peeling-off apparatus comprising,
  a. means for heating a starting bivalve, so that an edible part in said bivalve remains raw, is not discolored, and the mouth of said bivalve remains closed,
    said heating means, using steam as a heating source, has at least one nozzle with a tip end, having a cap, capable of abutting against the half-shell surface to surround the half-shell surface at a location where said edible part is connected,
  b. a means for transporting and handling the bivalves in a supporting manner,
  c. a means for positioning the bivalves supported by said transporting and handling means,
  d. a means for forcibly opening the shells of said bivalve, said forcibly opening means includes a pair of suction pads formed to suck the shells of the bivalve with a negative pressure, a pad driving means for operating the pair of pads so that the mouth of the starting bivalve is opened, and a water removing means,
    wherein at least a portion of said suction pad is adapted to abut against the shell and is formed from a styrene-based thermoplastic resin,
    wherein said water removing means includes a switching valve for selectively switching any one of the negative and positive pressures for the suction pads to apply the switched pressure to the suction pads, and an air filter having a discharge valve disposed between said switching valve and said suction pads to capture liquid flowing from said suction pads toward said switching valve, and to discharge the captured liquid to the outside, when a positive pressure is applied.

* * * * *